(12) United States Patent
Shi et al.

(10) Patent No.: US 10,849,145 B2
(45) Date of Patent: Nov. 24, 2020

(54) UPLINK-DOWNLINK DATA PROCESSING METHOD AND DEVICE, AND COMPUTER STORAGE MEDIUM

(71) Applicant: ZTE CORPORATION, Shenzhen (CN)

(72) Inventors: Jing Shi, Shenzhen (CN); Shuqiang Xia, Shenzhen (CN); Zhisong Zuo, Shenzhen (CN); Donglei Chen, Shenzhen (CN); Wen Zhang, Shenzhen (CN); Xianghui Han, Shenzhen (CN); Chunli Liang, Shenzhen (CN); Min Ren, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 1 day.

(21) Appl. No.: 16/320,258

(22) PCT Filed: Nov. 4, 2016

(86) PCT No.: PCT/CN2016/104766
§ 371 (c)(1),
(2) Date: Jan. 24, 2019

(87) PCT Pub. No.: WO2018/018776
PCT Pub. Date: Feb. 1, 2018

(65) Prior Publication Data
US 2019/0274154 A1 Sep. 5, 2019

(30) Foreign Application Priority Data
Jul. 28, 2016 (CN) .......................... 2016 1 0613543

(51) Int. Cl.
*H04W 72/12* (2009.01)
*H04L 5/00* (2006.01)
*H04L 27/26* (2006.01)
*H04L 5/14* (2006.01)

(52) U.S. Cl.
CPC ........... *H04W 72/1268* (2013.01); *H04L 5/00* (2013.01); *H04L 27/26* (2013.01)

(58) Field of Classification Search
None
See application file for complete search history.

(56) References Cited

U.S. PATENT DOCUMENTS 10,455,610 B2 * 10/2019 Sun ................... H04W 72/0446
2007/0245201 A1 * 10/2007 Sammour ............. H04L 1/1628
714/748

FOREIGN PATENT DOCUMENTS

| CN | 101286971 A | 10/2008 |
|---|---|---|
| CN | 101547059 A | 9/2009 |

(Continued)

OTHER PUBLICATIONS

International Search Report in international application No. PCT/CN2016/104766, dated Apr. 24, 2017, 2 pgs.

(Continued)

*Primary Examiner* — Hong S Cho
(74) *Attorney, Agent, or Firm* — Cantor Colburn LLP

(57) ABSTRACT

Provided in the present invention are an uplink-downlink data processing method and device, and computer storage medium. The method comprises: determining a timing interval, wherein the timing interval comprises an uplink scheduling time interval or a downlink data feedback timing interval, if a single timing interval is determined, then the timing interval is configured to be a non-integer multiple of the transmission time interval (TTI), and if a group of timing intervals is determined, then the determined group of timing intervals is configured to have at least one timing interval being a non-integer multiple of the TTI; and performing, according to the determined timing interval, uplink scheduling or downlink data feedback.

14 Claims, 7 Drawing Sheets

(56) References Cited

FOREIGN PATENT DOCUMENTS

| | | | |
|---|---|---|---|
| CN | 101588188 A | 11/2009 |
| CN | 101588337 A | 11/2009 |
| CN | 102232323 A | 11/2011 |
| CN | 103200599 A | 7/2013 |
| CN | 103825671 A | 5/2014 |
| CN | 103841603 A | 6/2014 |
| CN | 104349483 A | 2/2015 |
| WO | 2012037381 A1 | 3/2012 |
| WO | 2015035910 A1 | 3/2015 |

OTHER PUBLICATIONS

English Translation of the Written Opinion of the International Search Authority in international application No. PCT/CN2016/104766, dated Apr. 24, 2017, 3 pgs.

3GPP TSG RAN WG1 Meeting #85, Nanjing, P. R. China May 23-27, 2016, R1-165214 NTT Docomo, Inc., "Views on processing time reduction and related procedures" for Discussion and Decision, 3 pgs.

3GPP TSG RAN WG1 Meeting #85, Nanjing, China May 23-27, 2016, R1-164064, "Discussion on UL scheduling timing for short TTI" for Discussion and Decision, 3 pgs.

3GPP TSG-RAN WG1 #85, Nanjing, P.R. China, May 23-27, 2016, R1-165300, "On reduced processing time for short TTI", for Discussion, Decision, 3 pgs.

3GPP TS 36.213 V12.1.0 (Mar. 2014), 3rd Generation Partnership Project;Technical Specification Group Radio Access Network; Evolved Universal Terrestrial Radio Access (E-UTRA); Physical layer procedures (Release 12), 186 pgs.

\* cited by examiner

UPLINK-DOWNLINK DATA PROCESSING METHOD AND DEVICE, AND COMPUTER STORAGE MEDIUM

TECHNICAL FIELD

The disclosure relates to the technical field of mobile communication, and particularly to an Uplink (UL) and Downlink (DL) data processing method and device and a computer storage medium.

BACKGROUND

Along with constant improvement of commercial 4th Generation mobile Communication technology (4G) Long-Term Evolution (LTE)/Long-Term Evolution Advance (LTE-Advance/LTE-A) systems, requirements on technical indexes of the 5th Generation mobile communication technology (5G) also increase. It is widely believed in the industry that a next-generation mobile communication system should have the characteristics of ultrahigh rate, ultrahigh capacity, ultrahigh reliability, ultralow delay transmission characteristic and the like. For an ultralow delay index in a 5G system, it is presently recognized that an air interface delay is at the order of magnitude of 1 ms.

A method for effectively achieving an ultralow delay is to reduce a Transmission Time Interval (TTI) of an LTE system and fully shorten a processing delay unit to support a requirement on the characteristic of 1 ms air interface delay. At present, there are two methods for shortening a TTI. One is to expand a subcarrier spacing of an Orthogonal Frequency Division Multiplexing (OFDM) system to shorten a duration of a single OFDM symbol, and this method is involved in both of a 5G-based high-frequency communication system and ultra-dense network. The other method, presently discussed by the 3rd Generation Partnership Project (3GPP), is to reduce the number of OFDM symbols of a single TTI to reduce a length of the TTI, and this method has the advantage of complete compatibility with an existing LTE system.

In an existing LTE system, a fixed scheduling timing relationship is adopted for scheduling timing, and a Physical Downlink Control Channel (PDCCH) bears a DL grant to schedule a Physical Downlink Shared Channel (PDSCH) in the same subframe. A PDCCH located in a subframe n bears a UL grant to schedule a PUSCH located on a subframe n+k. In case of a Frequency Division Duplex (FDD) system, k=4. In case of Time Division Duplex (TDD), k≥4 and depends on a UL/DL subframe configuration.

Correspondingly, for feedback timing of the PDSCH, a synchronous timing relationship is adopted. That is, for the PDSCH in the subframe n, an Acknowledgement (ACK)/Negative Acknowledgement (NACK) is fed back in the subframe n+k. In case of FDD, k=4. In case of TDD, k≥4 and depends on the UL/DL subframe configuration.

Compared with an existing subframe with a 1 ms TTI length, a shortened TTI with relatively few OFDM symbols is a new-granularity short TTI (sTTI), and various sTTIs with different lengths may be supported in a UL and a DL. In such case, original scheduling timing and feedback timing methods are not applicable any more when UL and DL sTTIs are not aligned.

An existing manner n+k*sTTI has the following problems.

(1) DL sTTIs and UL sTTIs are unequal, and in such case, n and k correspond to different time units, which causes an ambiguity.

(2) Since sTTIs in a subframe may be unequal in length or a legacy PDCCH region which is not divided into an sTTI exists, actual time intervals are unequal.

(3) When DL sTTIs are equal to UL sTTIs, UL pilot sharing makes timing not aligned. For example, sTTIs with two OFDM symbols are adopted for both of a UL and a DL, and when UL pilot sharing is adopted, UL sTTIs are more than DL sTTIs and timing of the UL and DL sTTIs is not aligned.

It is necessary to consider scheduling timing and feedback timing methods applied to the condition that DL sTTIs are not aligned with UL sTTIs.

For the technical problems in a related art, there is yet no effective solution at present.

SUMMARY

In view of this, embodiments of the disclosure provide a UL and DL data processing method and device and a computer storage medium.

According to an embodiment of the disclosure, a UL and DL data processing method is provided, which may include that: a timing interval is determined, the timing interval including a UL scheduling time interval or a DL data feedback timing interval, in response to determining one timing interval, the timing interval being a non-integral multiple of a TTI, and in response to determining a group of timing intervals, the determined group of timing intervals including at least one timing interval which is a non-integral multiple of the TTI; and UL scheduling or DL data feedback is performed according to the determined timing interval.

In an embodiment, the TTI may include at least one of: an sTTI, a DL sTTI, a UL sTTI, a subframe, a DL transmission part or a UL transmission part.

In an embodiment, when the timing interval is fixed timing, the timing interval may be determined in at least one of the following manners: a first manner: when a minimum interval between a UL grant and a short PUSCH (sPUSCH) in an sTTI or between a DL sTTI where the UL grant is located and the sPUSCH is a number p of UL sTTIs or a number q of OFDM symbols, a timing reference starting point of the timing interval is an ending position of a complete DL sTTI, with a minimum interval from a timing reference ending point of the timing interval, among one or more DL sTTIs that enable the timing interval to be more than or equal to the minimum interval or the timing reference starting point is an ending position of the UL grant, and the timing reference ending point is a starting position of a UL sTTI where the sPUSCH is located; a second manner: when the minimum interval between the UL grant and the sPUSCH or between the DL sTTI where the UL grant is located and the sPUSCH is a number p of UL sTTIs, the timing reference starting point of the timing interval is an ending position of a complete DL sTTI that enables the timing interval to be more than or equal to the minimum interval, and the timing reference ending point of the timing interval is the UL sTTI where the sPUSCH is located, each timing reference starting point in the determined group of timing intervals being uniformly distributed in a subframe; a third manner: when the minimum interval between the UL grant and the sPUSCH or between the DL sTTI where the UL grant is located and the sPUSCH is a number p of UL sTTIs, the timing reference starting point of the timing interval is the ending position of the complete DL sTTI that enables the timing interval to be more than or equal to the minimum interval, and the timing reference ending point of the timing interval is the UL sTTI where the sPUSCH is located, each timing reference starting point in the determined group of timing intervals being continuously distributed in the subframe; a fourth manner: when the minimum interval between the UL grant and the sPUSCH or between the DL sTTI where the UL grant is located and the sPUSCH is a number p of UL sTTIs or a number q of OFDM symbols, the timing reference starting point of the timing interval is an ending position of multiple complete DL sTTIs, at the minimum interval with the timing reference ending point of the timing interval, among the one or more DL sTTIs that enable the timing interval to be more than or equal to the minimum interval or the ending position of the UL grant, and the timing reference ending point is the starting position of the UL sTTI where the sPUSCH is located; a fifth manner: when a minimum interval between a short PDSCH (sPDSCH) in the sTTI and a channel bearing an ACK/NACK fed back for the sPDSCH is a number p of DL sTTIs, the timing reference ending point of the timing interval is a complete UL sTTI, with a minimum interval from the timing reference starting point of the timing interval, among one or more UL sTTIs that enable the timing interval to be more than or equal to the minimum interval, and the timing reference starting point is a DL sTTI where the sPDSCH is located; a sixth manner: when the minimum interval between the sPDSCH and the channel bearing the ACK/NACK fed back for the sPDSCH is a number p of DL sTTIs, the timing reference ending point of the timing interval is a complete UL sTTI that enables the timing interval to be more than or equal to the minimum interval, and the timing reference starting point of the timing interval is the DL sTTI where the sPDSCH is located, the timing reference ending points in the determined group of timing intervals being uniformly distributed or distributed at equal intervals in the subframe; or a seventh manner: when the minimum interval between the sPDSCH and the channel bearing the ACK/NACK fed back for the sPDSCH is a number p of DL sTTIs, the timing reference ending point of the timing interval is the complete UL sTTI that enables the timing interval to be more than or equal to the minimum interval, and the timing reference starting point of the timing interval is the DL sTTI where the sPDSCH is located, the timing reference ending points in the determined group of timing intervals being continuously distributed in the subframe and p and q being natural numbers.

In an embodiment, the group of timing intervals may be determined when the following condition is met: a boundary of a DL subframe n is aligned with a boundary of a UL subframe n, n being a natural number.

In an embodiment, the timing reference ending point of the timing interval may be determined in at least one of the following manners: a first determination manner: the timing reference ending point is determined according to a corresponding relationship table of (n, i) to (m, j); a second determination manner: the timing reference ending point (n+floor(j/x), j mod x) is determined according to a corresponding relationship between (n, i) and a UL sTTI (n, i') in the same subframe and to an expression j=i'+k, the UL sTTI (n, i') representing a UL sTTI having a UL sTTI sequence number of i' in the subframe n; a third determination manner: after a DL sTTI r meeting the minimum interval is determined according to an expression r=i+k, the timing reference ending point (m, j) is determined according to a correspondence between (m, r) and a UL sTTI (m, j) in the same subframe, the DL sTTI r representing a DL sTTI of which a sequence number is r, i being a DL sTTI sequence number of the timing reference starting point, (m, r) representing a DL sTTI of which a DL sTTI sequence number is r in a subframe m and the UL sTTI (m, j) being a UL sTTI having a UL sTTI sequence number of j in the subframe m; or a fourth determination manner: the timing reference ending point (n+floor(j/x), j mod x) is determined according to a function j=f(i) or j=f(k, i), (n, i) representing that the timing reference starting point is a DL sTTI of which a DL sTTI sequence number is i in the subframe n, (m, j) representing that the timing reference ending point is a UL sTTI having a UL sTTI sequence number of j in the subframe m, (n+floor(j/x), j mod x) representing that the timing reference ending point is a UL sTTI having a UL sTTI sequence number of 'j mod x' in a subframe n+floor (j/x), x being the number of UL sTTIs in each subframe, floor( ) being a rounding function, mod being a remainder calculation function and i, j, n, m, i' and r being natural numbers.

In an embodiment, when the timing interval is dynamic timing, the timing interval may be determined in the following manners: the timing interval is determined by k1 subframes and/or k2 DL sTTIs and/or k3 UL sTTIs; and the timing interval is determined by a minimum interval and the k1 subframes and/or the k2 DL sTTIs and/or the k3 UL sTTIs, the minimum interval being at least one of a minimum interval between the UL grant and the sPUSCH or between the DL sTTI where the UL grant is located and the sPUSCH, or a minimum interval between an sPDSCH and a channel bearing the ACK/NACK fed back for the sPDSCH, where at least one of k1, k2 and k3 may be indicated by physical-layer signaling or high-layer signaling and k1, k2 and k3 may all be natural numbers.

In an embodiment, the timing reference starting point of the timing interval may be at least one of: an ending position of a subframe where the UL grant or the sPDSCH is located; a starting position of subframe where the UL grant or the sPDSCH is located; the DL sTTI where the UL grant or the sPDSCH is located; or a UL sTTI corresponding to the DL sTTI where the UL grant or the sPDSCH is located.

In an embodiment, the UL sTTI corresponding to the DL sTTI may be determined in at least one of the following manners: a UL sTTI where a starting symbol or ending symbol of a DL sTTI m is located is determined as the UL sTTI corresponding to the DL sTTI; or a next UL sTTI of the UL sTTI where the starting symbol or ending symbol of the DL sTTI m is located is determined as the UL sTTI corresponding to the DL sTTI, the DL sTTI m being a DL sTTI of which a DL sTTI sequence number is m and m being a natural number.

In an embodiment, when there are multiple UL sTTIs where the starting symbol or ending symbol of the DL sTTI is located, the UL sTTI corresponding to the DL sTTI may be determined in at least one of the following manners: the UL sTTI aligned with the DL sTTI m in the multiple UL sTTIs where the ending symbol or starting symbol of the DL sTTI m is located or a next UL sTTI of the UL sTTI aligned with the DL sTTI m is determined as the UL sTTI corresponding to the DL sTTI; the UL sTTI including all OFDM symbols of the DL sTTI m in the multiple UL sTTIs where the ending symbol or starting symbol of the DL sTTI m is located or a next UL sTTI of the UL sTTI including all the OFDM symbols of the DL sTTI m is determined as the UL sTTI corresponding to the DL sTTI; the UL sTTI including a largest number of OFDM symbols of the DL sTTI m in the multiple UL sTTIs where the ending symbol or starting symbol of the DL sTTI m is located or a next UL sTTI of the UL sTTI including the largest number of OFDM symbols of the DL sTTI m is determined as the UL sTTI corresponding to the DL sTTI; the first UL sTTI in the multiple UL sTTIs where the ending symbol or starting symbol of the DL sTTI m is located or a next UL sTTI of the first UL sTTI is determined as the UL sTTI corresponding to the DL sTTI; and the last UL sTTI in the multiple UL sTTIs where the ending symbol or starting symbol of the DL sTTI m is located or a next-to-last UL sTTI is determined as the UL sTTI corresponding to the DL sTTI.

In an embodiment, when the minimum interval includes a legacy PDCCH region which is not divided into a DL sTTI, a determination manner for the minimum interval may include at least one of the following manners: the minimum interval is k DL sTTIs excluding the legacy PDCCH region; and the minimum interval includes the legacy PDCCH region and k-h DL sTTIs, h being a natural number smaller than k.

In an embodiment, a value of h may be determined according to a size of the legacy PDCCH region and a size of the DL sTTI.

In an embodiment, when the size of the DL sTTI is 2, a magnitude of h may be positively proportional to the size of the legacy PDCCH region; when the size of the DL sTTI is 2, h may be a fixed value, h being 0, 1 or 2; and when the size of the DL sTTI is 7, h may be a fixed value, h being 0 or 1.

In an embodiment, during UL scheduling, the minimum interval may be determined to be a number p of UL sTTIs in at least one of the following manners.

when the number p of UL sTTIs only include one of previous and next UL sTTIs of a shared Reference Signal (RS) symbol, the shared RS symbol is not counted in the number p of UL sTTIs.

when the number p of UL sTTIs only include one of previous and next UL sTTIs of the shared RS symbol, the shared RS symbol is counted in the number p of UL sTTIs.

In an embodiment, during DL data feedback, the complete UL sTTI that enables the timing interval to be more than or equal to the minimum interval may be determined in at least one of the following manners.

When the complete UL sTTI that enables the timing interval to be more than or equal to the minimum interval is determined, the shared RS symbol of the UL sTTI is included in the minimum interval.

When the complete UL sTTI that enables the timing interval to be more than or equal to the minimum interval is determined, the shared RS symbol of the UL sTTI is not included in the minimum interval.

According to another embodiment of the disclosure, a UL and DL data processing device is provided, which may include: a determination module, configured to determine a timing interval, the timing interval including a UL scheduling time interval or a DL data feedback timing interval, in response to determining one timing interval, the timing interval being a TTI of a non-integral multiple, and in response to determining a group of timing intervals, the determined group of timing interval including at least one timing interval which is a non-integral multiple of the TTI; and a processing module, configured to perform UL scheduling or DL data feedback according to the determined timing interval.

In an embodiment, the TTI may include at least one of: an sTTI, a DL sTTI, a UL sTTI, a subframe, a DL transmission part or a UL transmission part.

According to another embodiment of the disclosure, a computer storage medium is also provided. The computer storage medium is configured to store a program code configured to execute the following steps: a timing interval is determined, the timing interval including a UL scheduling time interval or a DL data feedback timing interval, in response to determining one timing interval, the timing interval being a non-integral multiple of a TTI, and in response to determining a group of timing intervals, the determined group of timing intervals including at least one timing interval which is a non-integral multiple of the TTI; and UL scheduling or DL data feedback is performed according to the determined timing interval. That is, the embodiments of the disclosure also provide a computer storage medium, which may include a set of instructions, the instructions being executed to cause at least one processor to execute the abovementioned UL and DL data processing method.

Through the embodiments of the disclosure, when one timing interval is determined, the timing interval is a non-integral multiple of the TTI, when the group of timing intervals is determined, there is at least one timing interval which is a non-integral multiple of the TTI in the determined group of timing intervals, and UL scheduling or DL data feedback is performed according to the determined timing interval, so that problems about determination of a timing relationship when divided UL and DL sTTIs in sTTIs including relatively few OFDM symbols are not aligned may be solved.

BRIEF DESCRIPTION OF DRAWINGS

The drawings described herein are adopted to provide a further understanding to the disclosure and form a part of the application. Schematic embodiments of the disclosure and descriptions thereof are adopted to explain the disclosure and not intended to form improper limits to the disclosure. In the drawings.

DETAILED DESCRIPTION

The disclosure will be described below with reference to the drawings and in combination with the embodiments in detail. It is to be noted that the embodiments in the application and characteristics in the embodiments may be combined without conflicts.

It is to be noted that terms "first", "second" and the like in the specification, claims and drawings of the disclosure are adopted not to describe a specific sequence or order but to distinguish similar objects.

Embodiment 1

Figure 1:
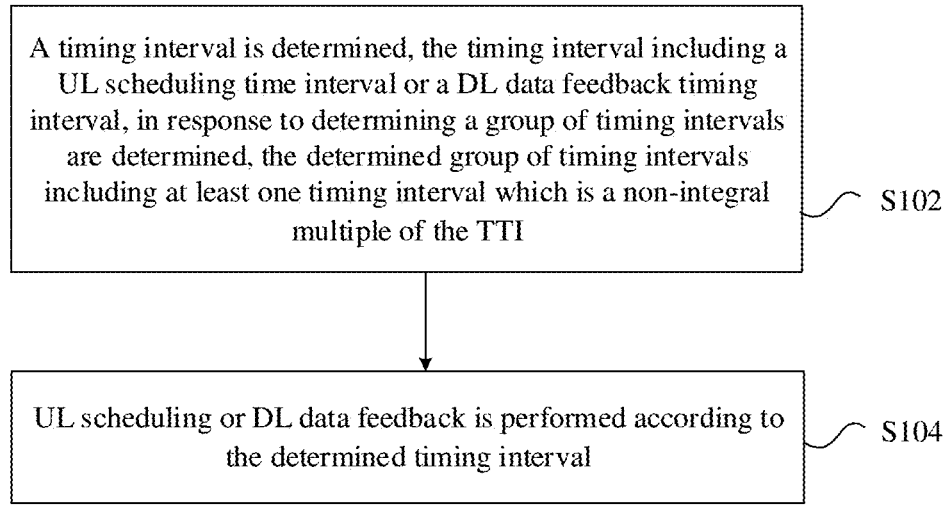
FIG. 1 is a flowchart of a UL and DL data processing method according to an embodiment of the disclosure.

The embodiment provides a UL and DL data processing method. FIG. 1 is a flowchart of a UL and DL data processing method according to an embodiment of the disclosure. As shown in FIG. 1, the flow includes the following steps.

In S102, a timing interval is determined, the timing interval including a UL scheduling time interval or a DL data feedback timing interval, in response to determining one timing interval, the timing interval being a non-integral multiple of a TTI, and in response to determining a group of timing intervals, the determined group of timing intervals including at least one timing interval which is a non-integral multiple of the TTI.

In S104, UL scheduling or DL data feedback is performed according to the determined timing interval.

Through the steps, when one timing interval is determined, the timing interval is a non-integral multiple of the TTI, when the group of timing intervals is determined, there is at least one timing interval which is a non-integral multiple of the TTI in the determined group of timing intervals, and UL scheduling or DL data feedback is performed according to the determined timing interval, so that problems about determination of a timing relationship when divided UL and DL sTTIs in sTTIs including relatively few OFDM symbols are not aligned may be solved.

It is to be noted that the TTI includes at least one of: an sTTI, a DL sTTI, a UL sTTI, a subframe, a DL transmission part or a UL transmission part.

It is to be noted that, for example, for UL scheduling, the group of timing intervals may be a timing interval set of multiple sTTIs divided in a subframe. For example, four OFDM symbols are divided into an sTTI, a subframe is divided into four sTTIs, each sTTI in the four sTTIs corresponds to a time interval, and then a set of the time interval corresponding to each sTTI in the four sTTIs is the group of timing intervals. However, the disclosure is not limited thereto.

It is to be noted that, when the timing interval is fixed timing, the timing interval is determined in at least one of the following manners: a first manner: when a minimum interval between a UL grant and an sPUSCH in an sTTI or between a DL sTTI where the UL grant is located and the sPUSCH is a number p of UL sTTIs or a number q of OFDM symbols, a timing reference starting point of the timing interval is an ending position of a complete DL sTTI, with a minimum interval from a timing reference ending point of the timing interval, among one or more DL sTTIs that enable the timing interval to be more than or equal to the minimum interval or the timing reference starting point is an ending position of the UL grant, and the timing reference ending point is a starting position of a UL sTTI where the sPUSCH is located; a second manner: when the minimum interval between the UL grant and the sPUSCH or between the DL sTTI where the UL grant is located and the sPUSCH is a number p of UL sTTIs, the timing reference starting point of the timing interval is an ending position of a complete DL sTTI that enables the timing interval to be more than or equal to the minimum interval, and the timing reference ending point of the timing interval is the UL sTTI where the sPUSCH is located, each timing reference starting point in the determined group of timing intervals being uniformly distributed in a subframe; a third manner: when the minimum interval between the UL grant and the sPUSCH or between the DL sTTI where the UL grant is located and the sPUSCH is a number p of UL sTTIs, the timing reference starting point of the timing interval is the ending position of the complete DL sTTI that enables the timing interval to be more than or equal to the minimum interval, and the timing reference ending point of the timing interval is the UL sTTI where the sPUSCH is located, each timing reference starting point in the determined group of timing intervals being continuously distributed in the subframe; a fourth manner: when the minimum interval between the UL grant and the sPUSCH or between the DL sTTI where the UL grant is located and the sPUSCH is a number p of UL sTTIs or a number q of OFDM symbols, the timing reference starting point of the timing interval is an ending position of multiple complete DL sTTIs, at the minimum interval with the timing reference ending point of the timing interval, among the one or more DL sTTIs that enable the timing interval to be more than or equal to the minimum interval or the ending position of the UL grant; a fifth manner: when a minimum interval between an sPDSCH in the sTTI and a channel bearing an ACK/NACK fed back for the sPDSCH is a number p of DL sTTIs, the timing reference ending point of the timing interval is a complete UL sTTI, with a minimum interval from the timing reference starting point of the timing interval, among one or more UL sTTIs that enable the timing interval to be more than or equal to the minimum interval, and the timing reference starting point is a DL sTTI where the sPDSCH is located; a sixth manner: when the minimum interval between the sPDSCH and the channel bearing the ACK/NACK fed back for the sPDSCH is a number p of DL sTTIs, the timing reference ending point of the timing interval is a complete UL sTTI that enables the timing interval to be more than or equal to the minimum interval, and the timing reference starting point of the timing interval is the DL sTTI where the sPDSCH is located, the timing reference ending points in the determined group of timing intervals being uniformly distributed or distributed at equal intervals in the subframe; and a seventh manner: when the minimum interval between the sPDSCH and the channel bearing the ACK/NACK fed back for the sPDSCH is a number p of DL sTTIs, the timing reference ending point of the timing interval is the complete UL sTTI that enables the timing interval to be more than or equal to the minimum interval, and the timing reference starting point of the timing interval is the DL sTTI where the sPDSCH is located, the timing reference ending points in the determined group of timing intervals being continuously distributed in the subframe and p and q being natural numbers.

In a preferred embodiment of the disclosure, a value of p may be a positive integer larger than 0, may preferably be any integer in 2 to 30 and may preferably be 1, 3, 5 or 7. However, the disclosure is not limited thereto. q may be a positive integer larger than 0 and may specifically be an even number larger than 0. In an embodiment of the disclosure, q may be twice p, that is, q=2p. However, the disclosure is not limited thereto.

Herein, during UL scheduling, the minimum interval is determined to be a number p of UL sTTIs in at least one of the following manners.

when the number p of UL sTTIs only include one of previous and next UL sTTIs of the shared RS symbol, the shared RS symbol may not be counted in the number p of UL sTTIs.

when the number p of UL sTTIs only include one of previous and next UL sTTIs of the shared RS symbol, the shared RS symbol is required to be counted in the number p of UL sTTIs.

Herein, during DL data feedback, the complete UL sTTI that enables the timing interval to be more than or equal to the minimum interval is determined in at least one of the following manners.

When the complete UL sTTI that enables the timing interval to be more than or equal to the minimum interval is determined, the shared RS symbol of the UL sTTI may be included in the minimum interval.

When the complete UL sTTI that enables the timing interval to be more than or equal to the minimum interval is determined, the shared RS symbol of the UL sTTI is not included in the minimum interval.

It is to be noted that the ending position of the DL sTTI refers to a position of a last OFDM symbol of the DL sTTI and the ending position of the UL grant may be a position of a last OFDM symbol corresponding to a resource occupied by the UL grant. However, the disclosure is not limited thereto.

It is to be noted that the channel bearing the ACK/NACK may be a short Physical Uplink Control Channel (sPUCCH), an sPUSCH, a PUCCH or a PUSCH. However, the disclosure is not limited thereto.

In an embodiment of the disclosure, the group of timing intervals is determined when the following condition is met: a boundary of a DL subframe n is aligned with a boundary of a UL subframe n, n being a natural number.

It is to be noted that the timing reference ending point of the timing interval may be determined in at least one of the following manners: a first determination manner: the timing reference ending point is determined according to a corresponding relationship table of (n, i) to (m, j); a second determination manner: the timing reference ending point (n+floor(j/x), j mod x) is determined according to a corresponding relationship between (n, i) and a UL sTTI (n, i') in the same subframe and to an expression j=i'+k, the UL sTTI (n, i') representing a UL sTTI having a UL sTTI sequence number of i' in the subframe n; a third determination manner: after a DL sTTI r meeting the minimum interval is determined according to an expression r=i+k, the timing reference ending point (m, j) is determined according to a correspondence between (m, r) and a UL sTTI (m, j) in the same subframe, the DL sTTI r representing a DL sTTI of which a sequence number is r, i being a DL sTTI sequence number of the timing reference starting point, (m, r) representing a DL sTTI of which a DL sTTI sequence number is r in a subframe m and the UL sTTI (m, j) being a UL sTTI having a UL sTTI sequence number of j in the subframe m; and a fourth determination manner: the timing reference ending point (n+floor(j/x), j mod x) is determined according to a function j=f(i) or j=f(k, i), (n, i) representing that the timing reference starting point is a DL sTTI of which a DL sTTI sequence number is i in the subframe n, (m, j) representing that the timing reference ending point is a UL sTTI having a UL sTTI sequence number of j in the subframe m, (n+floor(j/x), j mod x) representing that the timing reference ending point is a UL sTTI having a UL sTTI sequence number of 'j mod x' in a subframe n+floor (j/x), x being the number of UL sTTIs in each subframe, floor( ) being a rounding function, mod being a remainder calculation function and i, j, n, m, i' and r being natural numbers.

It is to be noted that a value of k may be a sum of the time interval and 1, that is, k=p+1. Or, the preferably, k=2, 3, 4, 5, 6, 7, 8. However, the disclosure is not limited thereto.

It is to be noted that, for the second manner and the fourth manner, a value of j is only required to be determined and may not be required to correspond to the subframe. For example, the UL sTTIs are sequenced with sequence numbers 0 to 30, and when j is calculated to be 5, it may directly be determined that the timing reference ending point is a UL sTTI of which the UL sTTI sequence number is 5. If a corresponding relationship with the subframe is considered, there is made such a hypothesis that a subframe is divided into four UL sTTIs and sequence numbers of the four UL sTTIs are sequentially 0, 1, 2 and 3, the determined timing reference ending point should be a second UL sTTI in a subframe n+1 and namely should be a UL sTTI having a UL sTTI sequence number of 1 in the subframe n+1.

It is to be noted that the function j=f(i) or j=f(k, i) may specifically be set according to a practical condition. However, the disclosure is not limited thereto.

In an embodiment of the disclosure, when the timing interval is dynamic timing, the timing interval is determined in the following manners: the timing interval is determined by k1 subframes and/or k2 DL sTTIs and/or k3 UL sTTIs; and the timing interval is determined by a minimum interval and the k1 subframes and/or the k2 DL sTTIs and/or the k3 UL sTTIs, the minimum interval being at least one of the minimum interval between the UL grant and the sPUSCH or between the DL sTTI where the UL grant is located and the sPUSCH and the minimum interval between the sPDSCH and the channel bearing the ACK/NACK fed back for it, where at least one of k1, k2 and k3 may be indicated by physical-layer signaling or high-layer signaling and k1, k2 and k3 may all be natural numbers.

It is to be noted that the timing reference starting point of the timing interval is at least one of: an ending position of a subframe where the UL grant or the sPDSCH is located; a starting position of the subframe where the UL grant or the sPDSCH is located; the DL sTTI where the UL grant or the sPDSCH is located; and a UL sTTI corresponding to the DL sTTI where the UL grant or the sPDSCH is located.

It is to be noted that the UL sTTI corresponding to the DL sTTI may be determined in at least one of the following manners: a UL sTTI where a starting symbol or ending symbol of a DL sTTI m is located is determined as the UL sTTI corresponding to the DL sTTI; and a next UL sTTI of the UL sTTI where the starting symbol or ending symbol of the DL sTTI m is located is determined as the UL sTTI corresponding to the DL sTTI, the DL sTTI m being a DL sTTI of which a DL sTTI sequence number is m and m being a natural number.

It is to be noted that, when there are multiple UL sTTIs where the starting symbol or ending symbol of the DL sTTI is located, the UL sTTI corresponding to the DL sTTI is determined in at least one of the following manners: the UL sTTI aligned with the DL sTTI m in the multiple UL sTTIs where the ending symbol or starting symbol of the DL sTTI m is located or a next UL sTTI of the UL sTTI aligned with the DL sTTI m is determined as the UL sTTI corresponding to the DL sTTI; the UL sTTI including all OFDM symbols of the DL sTTI m in the multiple UL sTTIs where the ending symbol or starting symbol of the DL sTTI m is located or a next UL sTTI of the UL sTTI including all the OFDM symbols of the DL sTTI m is determined as the UL sTTI corresponding to the DL sTTI; the UL sTTI including a largest number of OFDM symbols of the DL sTTI m in the multiple UL sTTIs where the ending symbol or starting symbol of the DL sTTI m is located or a next UL sTTI of the UL sTTI including the largest number of OFDM symbols of the DL sTTI m is determined as the UL sTTI corresponding to the DL sTTI; the first UL sTTI in the multiple UL sTTIs where the ending symbol or starting symbol of the DL sTTI m is located or a next UL sTTI of the first UL sTTI is determined as the UL sTTI corresponding to the DL sTTI; and the last UL sTTI in the multiple UL sTTIs where the ending symbol or starting symbol of the DL sTTI m is located or a next-to-last UL sTTI is determined as the UL sTTI corresponding to the DL sTTI.

It is to be noted that, when the minimum interval includes a legacy PDCCH region which is not divided into a DL sTTI, a determination manner for the minimum interval includes at least one of the following manners: the minimum interval is k DL sTTIs excluding the legacy PDCCH region; and the minimum interval includes the legacy PDCCH region and k-h DL sTTIs, h being a natural number smaller than k.

It is to be noted that a value of h is determined according to a size of the legacy PDCCH region and a size of the DL sTTI.

It is to be noted that, when the size of the DL sTTI is 2, a magnitude of h is positively proportional to the size of the legacy PDCCH region; when the size of the DL sTTI is 2, h is a fixed value, h being 0, 1 or 2; and when the size of the DL sTTI is 7, h is a fixed value, h being 0 or 1.

From the above descriptions about the implementation modes, those skilled in the art may clearly know that the method according to the abovementioned embodiments may be implemented in a manner of combining software and a necessary universal hardware platform, and of course, may also be implemented through hardware, but the former is a preferred implementation mode under many circumstances. Based on such an understanding, the technical solutions of the disclosure substantially or parts making contributions to the conventional art may be embodied in form of software product, and the computer software product is stored in a storage medium (for example, a Read-Only Memory (ROM)/Random Access Memory (RAM), a magnetic disk and an optical disk), including a plurality of instructions configured to enable a computer device (which may be a personal computer, a server, a network device or the like) to execute the method in each embodiment of the disclosure.

Embodiment 2

The embodiment also provides a UL and DL data processing device, which is configured to implement the abovementioned embodiments and preferred implementation modes. What has been described will not be elaborated. For example, term "module", used below, may be a combination of software and/or hardware capable of realizing a preset function. Although the device described in the following embodiment is preferably implemented with software, implementation with hardware or a combination of the software and the hardware is also possible and conceivable.

Figure 2:
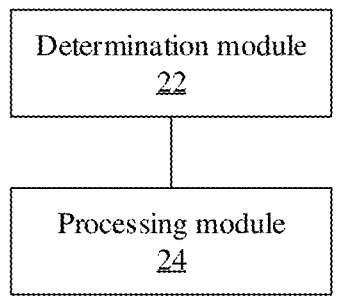
FIG. 2 is a structure block diagram of a UL and DL data processing device according to an embodiment of the disclosure.

FIG. 2 is a structure block diagram of a UL and DL data processing device according to an embodiment of the disclosure. As shown in FIG. 2, the device includes a determination module 22 and a processing module 24.

The determination module 22 is configured to determine a timing interval, the timing interval including a UL scheduling time interval or a DL data feedback timing interval, in response to determining one timing interval, the timing interval being a non-integral multiple of a TTI, and in response to determining a group of timing intervals, the determined group of timing intervals including at least one timing interval which is a non-integral multiple of the TTI.

The processing module 24 is configured to perform UL scheduling or DL data feedback according to the determined timing interval.

Through the device, when the determination module 22 determines one timing interval, the timing interval is a non-integral multiple of the TTI, when the group of timing intervals is determined, there is at least one timing interval which is a non-integral multiple of the TTI in the determined group of timing intervals, and the processing module 24 performs UL scheduling or DL data feedback by use of the determined timing interval, so that problems about determination of a timing relationship when divided UL and DL sTTIs in sTTIs including relatively few OFDM symbols are not aligned may be solved.

It is to be noted that the TTI includes at least one of: an sTTI, a DL sTTI, a UL sTTI, a subframe, a DL transmission part or a UL transmission part.

It is to be noted that, when the timing interval is fixed timing, the timing interval is determined in at least one of the following manners: a first manner: when a minimum interval between a UL grant and an sPUSCH in an sTTI or between a DL sTTI where the UL grant is located and the sPUSCH is a number p of UL sTTIs or a number q of OFDM symbols, a timing reference starting point of the timing interval is an ending position of a complete DL sTTI, with a minimum interval from a timing reference ending point of the timing interval, among one or more DL sTTIs that enable the timing interval to be more than or equal to the minimum interval or the timing reference starting point is an ending position of the UL grant, and the timing reference ending point is a starting position of a UL sTTI where the sPUSCH is located; a second manner: when the minimum interval between the UL grant and the sPUSCH or between the DL sTTI where the UL grant is located and the sPUSCH is a number p of UL sTTIs, the timing reference starting point of the timing interval is an ending position of a complete DL sTTI that enables the timing interval to be more than or equal to the minimum interval, and the timing reference ending point of the timing interval is the UL sTTI where the sPUSCH is located, each timing reference starting point in the determined group of timing intervals being uniformly distributed or distributed at equal intervals in a subframe; a third manner: when the minimum interval between the UL grant and the sPUSCH or between the DL sTTI where the UL grant is located and the sPUSCH is a number p of UL sTTIs, the timing reference starting point of the timing interval is the ending position of the complete DL sTTI that enables the timing interval to be more than or equal to the minimum interval, and the timing reference ending point of the timing interval is the UL sTTI where the sPUSCH is located, each timing reference starting point in the determined group of timing intervals being continuously distributed in the subframe; a fourth manner: when the minimum interval between the UL grant and the sPUSCH or between the DL sTTI where the UL grant is located and the sPUSCH is a number p of UL sTTIs or a number q of OFDM symbols, the timing reference starting point of the timing interval is an ending position of multiple complete DL sTTIs, at the minimum interval with the timing reference ending point of the timing interval, among the one or more DL sTTIs that enable the timing interval to be more than or equal to the minimum interval or the ending position of the UL grant, and the timing reference ending point is the starting position of the UL sTTI where the sPUSCH is located; a fifth manner: when a minimum interval between a short PDSCH (sPDSCH) in the sTTI and a channel bearing an ACK/NACK fed back for the sPDSCH is a number p of DL sTTIs, the timing reference ending point of the timing interval is a complete UL sTTI, with a minimum interval from the timing reference starting point of the timing interval, among one or more UL sTTIs that enable the timing interval to be more than or equal to the minimum interval, and the timing reference starting point is a DL sTTI where the sPDSCH is located; a sixth manner: when the minimum interval between the sPDSCH and the channel bearing the ACK/NACK fed back for the sPDSCH is a number p of DL sTTIs, the timing reference ending point of the timing interval is a complete UL sTTI that enables the timing interval to be more than or equal to the minimum interval, and the timing reference starting point of the timing interval is the DL sTTI where the sPDSCH is located, the timing reference ending points in the determined group of timing intervals being uniformly distributed or distributed at equal intervals in the subframe; and a seventh manner: when the minimum interval between the sPDSCH and the channel bearing the ACK/NACK fed back for the sPDSCH is a number p of DL sTTIs, the timing reference ending point of the timing interval is the complete UL sTTI that enables the timing interval to be more than or equal to the minimum interval, and the timing reference starting point of the timing interval is the DL sTTI where the sPDSCH is located, the timing reference ending points in the determined group of timing intervals being continuously distributed in the subframe and p and q being natural numbers.

Herein, during UL scheduling, the minimum interval is determined to be a number p of UL sTTIs in at least one of the following manners.

when the number p of UL sTTIs only include one of previous and next UL sTTIs of the shared RS symbol, the shared RS symbol may not be counted in the number p of UL sTTIs.

when the number p of UL sTTIs only include one of previous and next UL sTTIs of the shared RS symbol, the shared RS symbol is required to be counted in the number p of UL sTTIs.

Herein, during DL data feedback, the complete UL sTTI that enables the timing interval to be more than or equal to the minimum interval is determined in at least one of the following manners.

When the complete UL sTTI that enables the timing interval to be more than or equal to the minimum interval is determined, the shared RS symbol of the UL sTTI may be included in the minimum interval.

When the complete UL sTTI that enables the timing interval to be more than or equal to the minimum interval is determined, the shared RS symbol of the UL sTTI is not included in the minimum interval.

In an embodiment of the disclosure, the group of timing intervals is determined when the following condition is met: a boundary of a DL subframe n is aligned with a boundary of a UL subframe n, n being a natural number.

It is to be noted that the determination module 22 may also determine the timing reference ending point of the timing interval in at least one of the following manners: a first determination manner: the timing reference ending point is determined according to a corresponding relationship table of (n, i) to (m, j); a second determination manner: the timing reference ending point (n+floor(j/x), j mod x) is determined according to a corresponding relationship between (n, i) and a UL sTTI (n, i') in the same subframe and to an expression j=i'+k, the UL sTTI (n, i') representing a UL sTTI having a UL sTTI sequence number of i' in the subframe n; a third determination manner: after a DL sTTI r meeting the minimum interval is determined according to an expression r=i+k, the timing reference ending point (m, j) is determined according to a correspondence between (m, r) and a UL sTTI (m, j) in the same subframe, the DL sTTI r representing a DL sTTI of which a sequence number is r, i being a DL sTTI sequence number of the timing reference starting point, (m, r) representing a DL sTTI of which a DL sTTI sequence number is r in a subframe m and the UL sTTI (m, j) being a UL sTTI having a UL sTTI sequence number of j in the subframe m; and a fourth determination manner: the timing reference ending point (n+floor(j/x), j mod x) is determined according to a function j=f(i) or j=f(k, i), (n, i) representing that the timing reference starting point is a DL sTTI of which a DL sTTI sequence number is i in the subframe n, (m, j) representing that the timing reference ending point is a UL sTTI having a UL sTTI sequence number of j in the subframe m, (n+floor(j/x), j mod x) representing that the timing reference ending point is a UL sTTI having a UL sTTI sequence number of 'j mod x' in a subframe n+floor(j/x), x being the number of UL sTTIs in each subframe, floor( ) being a rounding function, mod being a remainder calculation function and i, j, n, m, i' and r being natural numbers.

In an embodiment of the disclosure, when the timing interval is dynamic timing, the determination module 22 determines the timing interval in the following manners: the timing interval is determined by k1 subframes and/or k2 DL sTTIs and/or k3 UL sTTIs; and the timing interval is determined by a minimum interval and the k1 subframes and/or the k2 DL sTTIs and/or the k3 UL sTTIs, the minimum interval being at least one of the minimum interval between the UL grant and the sPUSCH or between the DL sTTI where the UL grant is located and the sPUSCH and the minimum interval between the sPDSCH and the channel bearing the ACK/NACK fed back for it, where at least one of k1, k2 and k3 may be indicated by physical-layer signaling or high-layer signaling and k1, k2 and k3 may all be natural numbers.

It is to be noted that the timing reference starting point of the timing interval is at least one of: an ending position of a subframe where the UL grant or the sPDSCH is located; a starting position of the subframe where the UL grant or the sPDSCH is located; the DL sTTI where the UL grant or the sPDSCH is located; and a UL sTTI corresponding to the DL sTTI where the UL grant or the sPDSCH is located.

It is to be noted that the determination module 22 may further determine the UL sTTI corresponding to the DL sTTI in at least one of the following manners: a UL sTTI where a starting symbol or ending symbol of a DL sTTI m is located is determined as the UL sTTI corresponding to the DL sTTI; and a next UL sTTI of the UL sTTI where the starting symbol or ending symbol of the DL sTTI m is located is determined as the UL sTTI corresponding to the DL sTTI, the DL sTTI m being a DL sTTI of which a DL sTTI sequence number is m and m being a natural number.

It is to be noted that, when there are multiple UL sTTIs where the starting symbol or ending symbol of the DL sTTI is located, determination module 22 may further determine the UL sTTI corresponding to the DL sTTI in at least one of the following manners: the UL sTTI aligned with the DL sTTI m in the multiple UL sTTIs where the ending symbol or starting symbol of the DL sTTI m is located or a next UL sTTI of the UL sTTI aligned with the DL sTTI m is determined as the UL sTTI corresponding to the DL sTTI; the UL sTTI including all OFDM symbols of the DL sTTI m in the multiple UL sTTIs where the ending symbol or starting symbol of the DL sTTI m is located or a next UL sTTI of the UL sTTI including all the OFDM symbols of the DL sTTI m is determined as the UL sTTI corresponding to the DL sTTI; the UL sTTI including a largest number of OFDM symbols of the DL sTTI m in the multiple UL sTTIs where the ending symbol or starting symbol of the DL sTTI m is located or a next UL sTTI of the UL sTTI including the largest number of OFDM symbols of the DL sTTI m is determined as the UL sTTI corresponding to the DL sTTI; the first UL sTTI in the multiple UL sTTIs where the ending symbol or starting symbol of the DL sTTI m is located or a next UL sTTI of the first UL sTTI is determined as the UL sTTI corresponding to the DL sTTI; and the last UL sTTI in the multiple UL sTTIs where the ending symbol or starting symbol of the DL sTTI m is located or a next-to-last UL sTTI is determined as the UL sTTI corresponding to the DL sTTI.

It is to be noted that, when the minimum interval includes a legacy PDCCH region which is not divided into a DL sTTI, a determination manner for the minimum interval includes at least one of the following manners: the minimum interval is k DL sTTIs excluding the legacy PDCCH region in the timing interval; and the minimum interval is that the timing interval includes the legacy PDCCH region and k-h DL sTTIs, h being a natural number smaller than k.

It is to be noted that a value of h is determined according to a size of the legacy PDCCH region and a size of the DL sTTI.

It is to be noted that, when the size of the DL sTTI is 2, a magnitude of h is positively proportional to the size of the legacy PDCCH region; when the size of the DL sTTI is 2, h is a fixed value, h being 0, 1 or 2; and when the size of the DL sTTI is 7, h is a fixed value, h being 0 or 1.

It is to be noted that each of the abovementioned modules may be implemented through software or hardware and the latter condition may be implemented in, but not limited to, the following manner: all of the modules are located in the same processor or each module is freely combined for location in different processors respectively.

Embodiment 3

The embodiment of the disclosure also provides a storage medium. In an embodiment, in the embodiment, the storage medium may be configured to store a program code configured to execute the steps of the method in embodiment 1.

In an embodiment, in the embodiment, the storage medium may include, but not limited to: various media capable of storing program codes such as a U disk, a ROM, a RAM, a mobile hard disk, a magnetic disk or an optical disk.

In an embodiment, in the embodiment, a processor executes the steps of the method in embodiment 1 according to the program code stored in the storage medium. That is, the embodiment of the disclosure also provides a computer storage medium, which includes a set of instructions, the instructions being executed to cause at least one processor to execute the UL and DL data processing method described in embodiment 1.

In an embodiment, specific examples in the embodiment may refer to the examples described in the abovementioned embodiments and optional implementation modes and will not be elaborated in the embodiment.

For better understanding the disclosure, the disclosure will be further explained below in combination with preferred embodiments.

For solving the problem that a timing interval may not be accurately determined by an existing timing method when divided DL sTTIs and UL sTTIs are not aligned, the disclosure discloses a timing method applied to the condition that various sTTIs with different lengths in a UL and a DL are supported. When different sTTI lengths are supported, accurate scheduling timing and feedback timing are determined and requirements of double communication parties on consistent timing are met.

A timing interval determination method is provided, and the method may be used by both of a base station side and a terminal side.

All possible values of a group of timing intervals from a timing reference starting point to a timing reference ending point include at least one value which is a non-integral multiple of a TTI.

Herein, the TTI is an sTTI or a DL sTTI or a UL sTTI or a subframe or a downlink transmission part or a UL transmission part.

Herein, the timing interval includes at least one of a UL scheduling timing interval and a DL data feedback timing interval.

Furthermore, when the UL scheduling timing or the data feedback timing is fixed timing, a selection principle for the timing reference starting point or the timing reference ending point includes at least one of the following manners. Herein, a timing reference starting point of the UL scheduling timing is a DL sTTI where a UL grant is located, and a timing reference ending point is a UL sTTI where an sPUSCH is located; and a timing reference starting point for DL data feedback is a DL sTTI where an sPDSCH is located, and a timing reference ending point is a UL sTTI where an ACK/NACK (sPUCCH) is located.

A first manner: when a minimum interval between the UL grant and the sPUSCH or between the DL sTTI where the UL grant is located and the sPUSCH is k UL sTTIs or 2k OFDM symbols, the timing reference starting point is an ending position of a closest complete DL sTTI that enables the timing interval to be more than or equal to the minimum interval or an ending position of the UL grant, and the timing reference ending point is a starting position of the UL sTTI where the sPUSCH is located.

The first manner may also be expressed through the following (A).

(A) The timing reference starting point is a closest DL sTTI meeting the condition that the minimum interval between the UL grant and the sPUSCH or between the DL sTTI where the UL grant is located and the sPUSCH is k UL sTTIs or 2k OFDM symbols, and the timing reference ending point is the UL sTTI where the sPUSCH is located.

Figure 3:
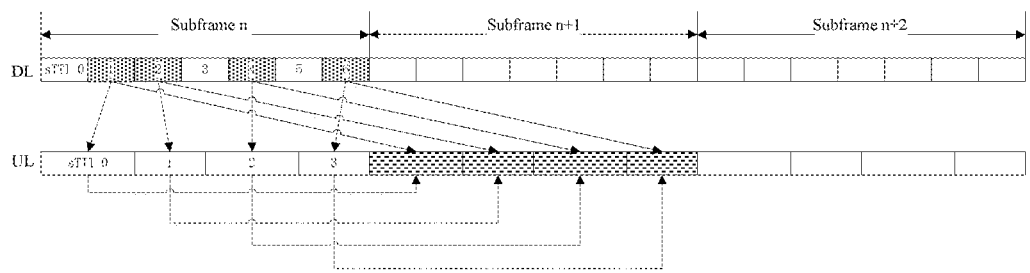
FIG. 3 is a schematic diagram of fixed timing for UL scheduling when DL sTTIs and UL sTTIs are unequal (DL sTTI=2 symbols and UL sTTI=4 symbols) and are not aligned according to an embodiment of the disclosure.

(Example A-1), specifically, when DL sTTI=2 (OFDM symbols) and UL sTTI=4 (OFDM symbols), a timing relationship determined according to the principle (A) is shown in FIG. 3. Four groups of timing relationships that DL sTTIs #1, 2, 4 and 6 in a subframe n where the UL grant is located schedule respectively UL sTTIs #0, 1, 2 and 3 in a subframe n+1 where the sPUSCH is located meet the minimum interval k=3 UL sTTIs. Correspondingly, when DL sTTI=UL sTTI=4, the timing relationship meets the interval k=3 UL sTTIs, that is, the timing relationship meets sTTI j=i+4, where i is a timing starting point sTTI sequence number and j is a timing ending point sTTI sequence number.

Figure 4:
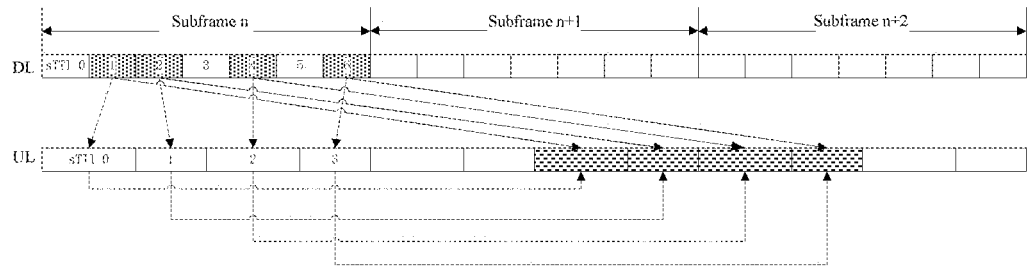
FIG. 4 is a schematic diagram of fixed timing for UL scheduling when DL sTTIs and UL sTTIs are unequal (DL sTTI=2 symbols and UL sTTI=4 symbols) and are not aligned according to an embodiment of the disclosure.

If it is considered that the minimum timing interval is k=5 UL sTTIs, as shown in FIG. 4, the four groups of timing relationships that the DL sTTIs #1, 2, 4 and 6 in the subframe n where the UL grant is located schedule the UL sTTIs #2 and 3 in the subframe n+1 where the sPUSCH is located and UL sTTIs #0 and 1 in a subframe n+2 respectively meet the minimum interval k=5 UL sTTIs. Correspondingly, when DL sTTI=UL sTTI=4, the timing relationship meets the interval k=5 UL sTTIs, that is, the timing relationship meets sTTI j=i+6, where i is a timing starting point sTTI sequence number and j is a timing ending point sTTI sequence number. More values of k will not be elaborated.

Figure 5:
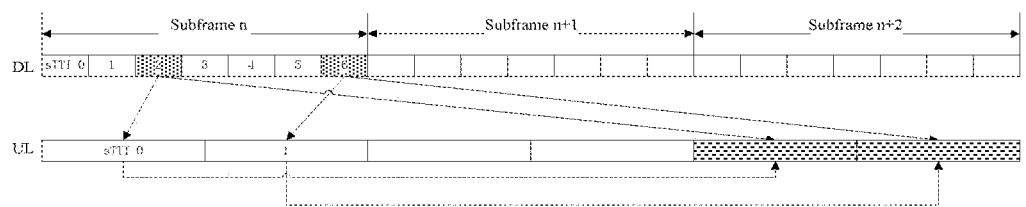
FIG. 5 is a schematic diagram of fixed timing for UL scheduling when DL sTTIs and UL sTTIs are unequal (DL sTTI=2 symbols and UL sTTI=7 symbols) and are not aligned according to an embodiment of the disclosure.

(Example A-2), specifically, when DL sTTI=2 (OFDM symbols) and UL sTTI=7 (OFDM symbols)=1 slot, the timing relationship determined according to the principle (A) is shown in FIG. 5. The two groups of timing relationships that the DL sTTIs #2 and 6 in the subframe n where the UL grant is located schedule the UL sTTIs #0 and 1 in the subframe n+2 where the sPUSCH is located respectively meet the minimum interval k=3 UL sTTIs. Correspondingly, when DL sTTI=UL sTTI=7, the timing relationship meets the interval k=3 UL sTTIs, that is, the timing relationship meets sTTI j=i+4, where i is a timing starting point sTTI sequence number and j is a timing ending point sTTI sequence number.

Figure 6:
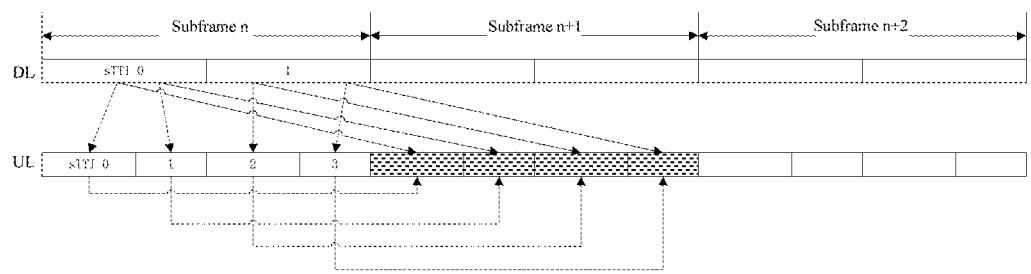
FIG. 6 is a schematic diagram of fixed timing for UL scheduling when DL sTTIs and UL sTTIs are unequal (DL sTTI=7 symbols and UL sTTI=4 symbols) and are not aligned according to an embodiment of the disclosure.

(Example A-3) specifically, when DL sTTI=7 and UL sTTI=4, the timing relationship, determined according to the principle (A), between the UL grant and the sPUSCH is shown in FIG. 6. The UL grant is located in first two OFDM symbols of the sTTI and four groups of timing relationships that the DL sTTI #0 in the subframe n schedules the sPUSCH of the UL sTTIs #0 and 1 in the subframe n+1 and the DL sTTI #1 in the subframe n schedules the sPUSCH of the UL sTTIs #2 and 3 in the subframe n+1 meet the minimum interval k=3 UL sTTIs between the UL grant and the sPUSCH. Correspondingly, when DL sTTI=UL sTTI=4, the timing relationship meets the interval k=3 UL sTTIs, that is, the timing relationship meets sTTI j=i+4, where i is the timing starting point sTTI sequence number and j is the timing ending point sTTI sequence number.

Figure 7:
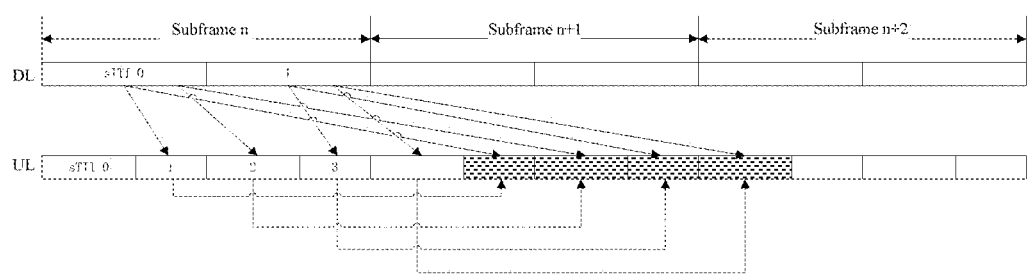
FIG. 7 is a schematic diagram of fixed timing for UL scheduling when DL sTTIs and UL sTTIs are unequal (DL sTTI=7 symbols and UL sTTI=4 symbols) and are not aligned according to an embodiment of the disclosure.

(Example A-4) specifically, when DL sTTI=7 and UL sTTI=4, the timing relationship, determined according to the principle (A), between the DL sTTI where the UL grant is located and the sPUSCH is shown in FIG. 7. Four groups of timing relationships that the DL sTTI #0 in the subframe n where the UL grant is located schedules the sPUSCH of the UL sTTIs #1 and 2 in the subframe n+1 and the DL sTTI #1 in the subframe n schedules the sPUSCH of the UL sTTIs #3 in the subframe n+1 and the UL sTTI #2 in the subframe n+2 meet the minimum interval k=0 UL sTTIs between the UL grant and the sPUSCH. Correspondingly, when DL sTTI=UL sTTI=4, the timing relationship meets the interval k=3 UL sTTIs, that is, the timing relationship meets sTTI j=i+4, where i is the timing starting point sTTI sequence number and j is the timing ending point sTTI sequence number.

Figure 8:
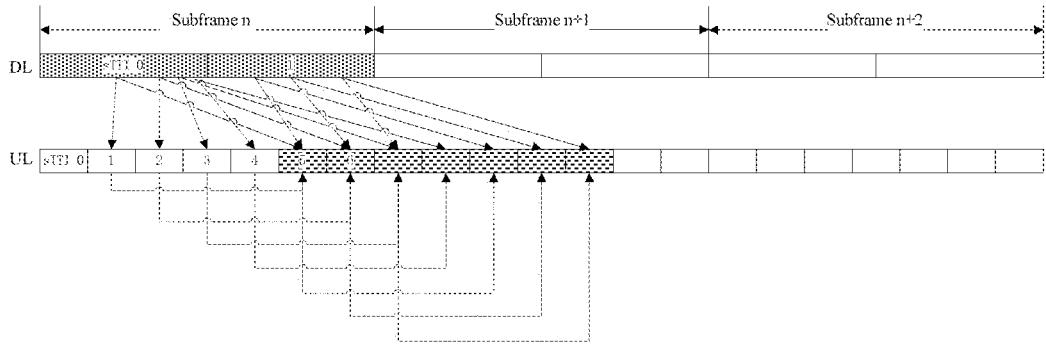
FIG. 8 is a schematic diagram of fixed timing for UL scheduling when DL sTTIs and UL sTTIs are unequal (DL sTTI=7 symbols and UL sTTI=2 symbols) and are not aligned according to an embodiment of the disclosure.

(Example A-5) specifically, when DL sTTI=7 and UL sTTI=2, the timing relationship, determined according to the principle (A), between the UL grant and the sPUSCH is shown in FIG. 8. The UL grant is located in the first two OFDM symbols of the sTTI and seven groups of timing relationships that the DL sTTI #0 in the subframe n where the UL grant is located schedules sPUSCH of UL sTTIs #5 and 6 in the subframe n and the UL sTTIs #0 and 1 in the subframe n+1 and the DL sTTI #1 in the subframe n where the UL grant is located schedules the sPUSCH of the UL sTTIs #2, 3 and 4 in the subframe n+1 meet the minimum interval k=3 UL sTTIs between the UL grant and the sPUSCH. Correspondingly, when DL sTTI=UL sTTI=2, the timing relationship meets the interval k=3 UL sTTIs, that is, the timing relationship meets sTTI j=i+4, where i is the timing starting point sTTI sequence number and j is the timing ending point sTTI sequence number.

Figure 9:
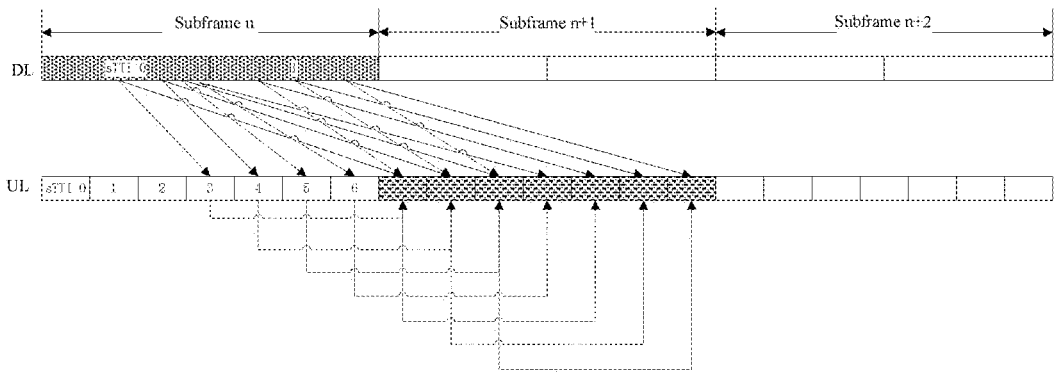
FIG. 9 is a schematic diagram of fixed timing for UL scheduling when DL sTTIs and UL sTTIs are unequal (DL sTTI=7 symbols and UL sTTI=2 symbols) and are not aligned according to an embodiment of the disclosure.

(Example A-6) specifically, when DL sTTI=7 and UL sTTI=2, the timing relationship, determined according to the principle (A), between the DL sTTI where the UL grant is located and the sPUSCH is shown in FIG. 9. Seven groups of timing relationships that the DL sTTI #0 in the subframe n where the UL grant is located schedules the sPUSCH of the UL sTTIs #0, 1, 2 and 3 in the subframe n+1 and the DL sTTI #1 in the subframe n where the UL grant is located schedules the sPUSCH of the UL sTTIs #4, 5 and 6 in the subframe n+1 meet the minimum interval k=0 UL sTTIs. between the DL sTTI where the UL grant is located and the sPUSCH Correspondingly, when DL sTTI=UL sTTI=2, the timing relationship meets the interval k=3 UL sTTIs, that is, the timing relationship meets sTTI j=i+4, where i is the timing starting point sTTI sequence number and j is the timing ending point sTTI sequence number.

Figure 10:
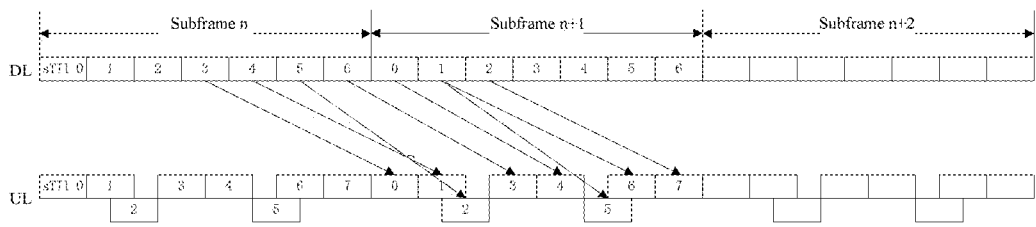
FIG. 10 is a schematic diagram of fixed timing for UL scheduling when DL sTTIs and UL sTTIs are equal (DL sTTI=2 symbols and UL sTTI=2 symbols) and are not aligned due to UL RS sharing according to an embodiment of the disclosure.

(Example A-7) specifically, when DL sTTI=2, UL sTTI=2 and part of OFDM symbols of the UL sTTIs are overlapped, the timing relationship determined according to the principle (A) when the minimum interval is k UL sTTIs is shown in FIG. 10. Eight groups of timing relationships that DL sTTIs #3, 4, 5 and 6 in the subframe where the UL grant is located schedule the sPUSCH of the UL sTTIs #0, 1, 2 and 3 in the subframe n+1 respectively, the DL sTTI #0 in the subframe n+1 where the UL grant is located schedules the sPUSCH in the UL sTTI #4 in the subframe n+1, the DL sTTI #1 in the subframe n+1 where the UL grant is located schedules the sPUSCH in the UL sTTIs #5 and 6 in the subframe n+1 and the DL sTTI #2 in the subframe n+1 where the UL grant is located schedules the sPUSCH in the UL sTTI #7 in the subframe n+1 meet the minimum interval k=3 UL sTTIs between the UL grant and the sPUSCH. Correspondingly, when DL sTTI=UL sTTI=2 and there is no overlapping, the timing relationship meets the interval k=3 UL sTTIs, that is, the timing relationship meets sTTI j=i+4, where i is the timing starting point sTTI sequence number and j is the timing ending point sTTI sequence number.

Figure 11:
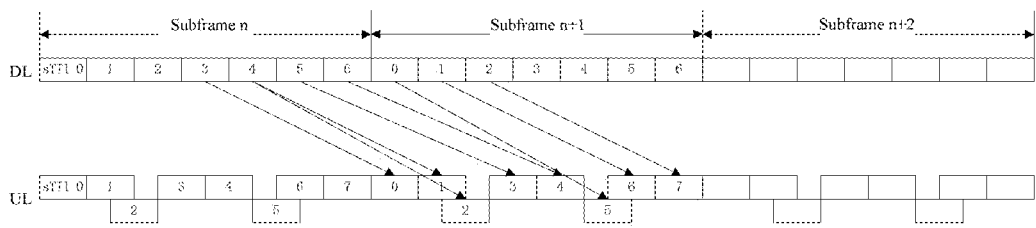
FIG. 11 is a schematic diagram of fixed timing for UL scheduling when DL sTTIs and UL sTTIs are equal (DL sTTI=2 symbols and UL sTTI=2 symbols) and are not aligned due to UL RS sharing according to an embodiment of the disclosure.

(Example A-8) specifically, when DL sTTI=2, UL sTTI=2 and there is overlapping, the timing relationship determined according to the principle (A) when the minimum interval is 2k OFDM symbols is shown in FIG. 11. Eight groups of timing relationships that the DL sTTI #3 in the subframe n where the UL grant is located schedules the sPUSCH in the UL sTTI #0 in the subframe n+1, the DL sTTI #4 in the subframe #n where the UL grant is located schedules the sPUSCH in the UL sTTI #1 and 2 in the subframe n+1, the DL sTTIs #5 and 6 in the subframe n where the UL grant is located and the DL sTTIs #0, 1 and 2 in the subframe n+1 schedule the sPUSCH in the UL sTTIs #3, 4, 5, 6 and 7 in the subframe n+1 respectively meet the minimum interval 2k=2*3=6 OFDM symbols between the UL grant and the sPUSCH. Correspondingly, when DL sTTI=UL sTTI=2 and there is no overlapping, the timing relationship meets the interval k=3 UL sTTIs or 2k=6 OFDM symbols, that is, the timing relationship meets sTTI j=i+4, where i is the timing starting point sTTI sequence number and j is the timing ending point sTTI sequence number.

A second manner: when the minimum interval between the UL grant and the sPUSCH is k UL sTTIs, the timing reference starting point is an ending position of complete DL sTTIs that enable the timing interval to be more than or equal to the minimum interval and uniformly distributed or distributed at equal intervals in the subframe, and the timing reference ending point is the UL sTTI where the sPUSCH is located.

The second manner may also be expressed through (B).

(B) The timing reference starting point is the DL sTTIs meeting the condition that the minimum interval between the UL grant and the sPUSCH is k UL sTTIs and uniformly distributed or distributed at equal intervals in the subframe, and the timing reference ending point is the UL sTTI where the sPUSCH is located.

Figure 12:
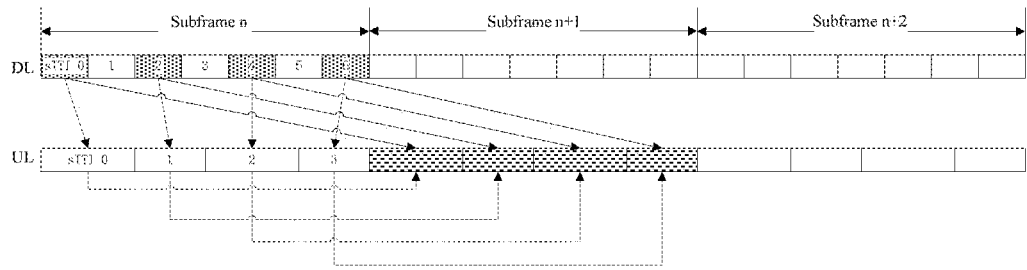
FIG. 12 is a schematic diagram of fixed timing for UL scheduling when DL sTTIs and UL sTTIs are unequal (DL sTTI=2 symbols and UL sTTI=4 symbols) and are not aligned according to an embodiment of the disclosure.

Specifically, descriptions are made only with UL and DL sTTI division when DL sTTI=2 (OFDM symbols) and UL sTTI=4 (OFDM symbols) in (example A-1) in (A) as an example. The timing relationship determined according to the principle (B) is shown in FIG. 12. Four groups of timing relationships that the DL sTTIs #0, 2, 4 and 6 in the subframe n where the UL grant is located schedule the UL sTTIs #0, 1, 2 and 3 in the subframe n+1 where the sPUSCH is located respectively meet that the minimum interval is k=3 UL sTTIs and the adopted DL sTTIs are uniformly distributed or distributed at equal intervals. Correspondingly, when DL sTTI=UL sTTI=4, the timing relationship meets the interval k=3 UL sTTIs, that is, the timing relationship meets sTTI j=i+4, where i is the timing starting point sTTI sequence number and j is the timing ending point sTTI sequence number.

A third manner: when the minimum interval between the UL grant and the sPUSCH is k UL sTTIs, the timing reference starting point is an ending position of complete DL sTTIs that enable the timing interval to be more than or equal to the minimum interval and continuous in the subframe, and the timing reference ending point is the UL sTTI where the sPUSCH is located.

The third manner may also be expressed through (C).

(C) The timing reference starting point is the DL sTTIs meeting the condition that the minimum interval between the UL grant and the sPUSCH is k UL sTTIs and continuous in the subframe, and the timing reference ending point is the UL sTTI where the sPUSCH is located.

Specifically, descriptions are made only with UL and DL sTTI division when DL sTTI=2 (OFDM symbols) and UL sTTI=4 (OFDM symbols) in (example A-1) in (A) as an example. The timing relationship determined according to the principle (C) is specifically as follows: the four groups of timing relationships that the DL sTTIs #1, 2, 3 and 4 in the subframe n where the UL grant is located schedule the UL sTTIs #0, 1, 2 and 3 in the subframe n+1 where the sPUSCH is located respectively meet that the minimum interval is k=3 UL sTTIs and the adopted DL sTTIs are continuous DL sTTIs. Correspondingly, when DL sTTI=UL sTTI=4, the timing relationship meets the interval k=3 UL sTTIs, that is, the timing relationship meets sTTI j=i+4, where i is the timing starting point sTTI sequence number and j is the timing ending point sTTI sequence number.

A fourth manner: when the minimum interval between the UL grant and the sPUSCH or between the DL sTTI where the UL grant is located and the sPUSCH is k UL sTTIs or 2k OFDM symbols, the timing reference starting point is an ending position of multiple closest complete DL sTTIs that enable the timing interval to be more than or equal to the minimum interval or an ending position of multiple UL grants, and the timing reference ending point is the starting position of the UL sTTI where the sPUSCH is located.

The fourth manner may also be expressed through (D).

(D) The timing reference starting point is multiple closest DL sTTIs meeting the condition that the minimum interval between the UL grant and the sPUSCH or between the DL sTTI where the UL grant is located and the sPUSCH is k UL sTTIs or 2k OFDM symbols, and the timing reference ending point is the UL sTTI where the sPUSCH is located.

Figure 13:
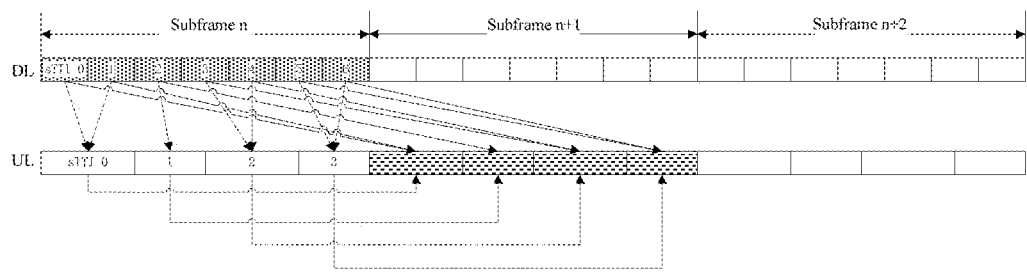
FIG. 13 is a schematic diagram illustrating that fixed timing is adopted for UL scheduling when DL sTTIs and UL sTTIs are unequal (DL sTTI=2 symbols and UL sTTI=4 symbols) and are not aligned and each DL sTTI may schedule UL data according to an embodiment of the disclosure.

Specifically, when DL sTTI=2 (OFDM symbols) and UL sTTI=4 (OFDM symbols), the timing relationship determined according to the principle (D) is shown in FIG. 13. Each group of timing relationship that the DL sTTI #0 or 1 in the subframe n where the UL grant is located schedules the UL sTTI #0 in the subframe n+1 where the sPUSCH is located, the DL sTTI #2 in the subframe n where the UL grant is located schedules the UL sTTI #1 in the subframe n+1 where the sPUSCH is located, the DL sTTI #3 or 4 in the subframe n where the UL grant is located schedules the UL sTTI #2 in the subframe n+1 where the sPUSCH is located and the DL sTTI #5 or 6 in the subframe n where the UL grant is located schedules the UL sTTI #3 in the subframe n+1 where the sPUSCH is located meets that the minimum interval is k=3 UL sTTIs but each DL sTTI is allowed to schedule the sPUSCH. Correspondingly, when DL sTTI=UL sTTI=4, the timing relationship meets the interval k=3 UL sTTIs, that is, the timing relationship meets sTTI j=i+4, where i is the timing starting point sTTI sequence number and j is the timing ending point sTTI sequence number.

A fifth manner: when the minimum interval between the sPDSCH and the ACK/NACK (sPUCCH) is k UL sTTIs, the timing reference ending point is a closest complete UL sTTI that enables the timing interval to be more than or equal to the minimum interval, and the timing reference starting point is the DL sTTI where the sPDSCH is located.

The fifth manner may also be expressed through (a).

(a) The timing reference ending point is the UL sTTIs meeting the condition that the minimum interval between the sPDSCH and the sPUCCH is k DL sTTIs, and the timing reference starting point is the DL sTTI where the sPDSCH is located.

Figure 14:
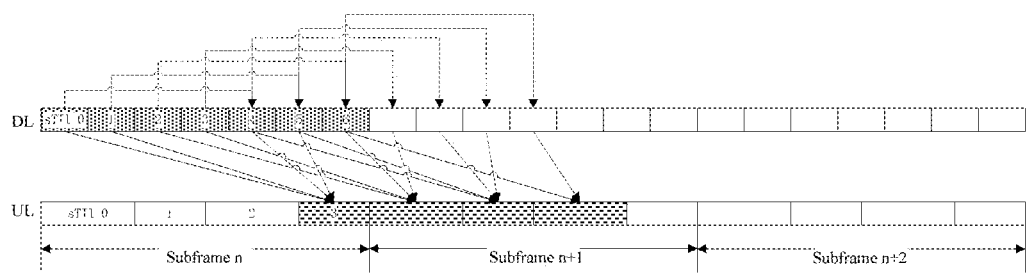
FIG. 14 is a schematic diagram of fixed timing for DL data feedback when DL sTTIs and UL sTTIs are unequal (DL sTTI=2 symbols and UL sTTI=4 symbols) and are not aligned according to an embodiment of the disclosure.

Specifically, when DL sTTI=2 (OFDM symbols) and UL sTTI=4 (OFDM symbols), the timing relationship determined according to the principle (a) is shown in FIG. 14. Seven groups of timing relationships that the DL sTTIs #0 and 1 in the subframe n where the sPDSCH is located correspond to the UL sTTI #3 in the subframe n where the fed back ACK/NACK (sPUCCH) is located, the DL sTTIs #2 and 3 in the subframe n where the sPDSCH is located correspond to the UL sTTI #0 in the subframe n+1 where the fed back ACK/NACK (sPUCCH) is located, the DL sTTIs #4 and 5 in the subframe n where the sPDSCH is located correspond to the UL sTTI #1 in the subframe n+1 where the fed back ACK/NACK (sPUCCH) is located and the DL sTTI #6 in the subframe n where the sPDSCH is located corresponds to the UL sTTI #2 in the subframe n+1 where the fed back ACK/NACK (sPUCCH) is located meet the minimum interval k=3 DL sTTIs. Correspondingly, when DL sTTI=UL sTTI=2, the timing relationship meets the interval k=3 DL sTTIs, that is, the timing relationship meets sTTI j=i+4, where i is the timing starting point sTTI sequence number and j is the timing ending point sTTI sequence number.

Figure 15:
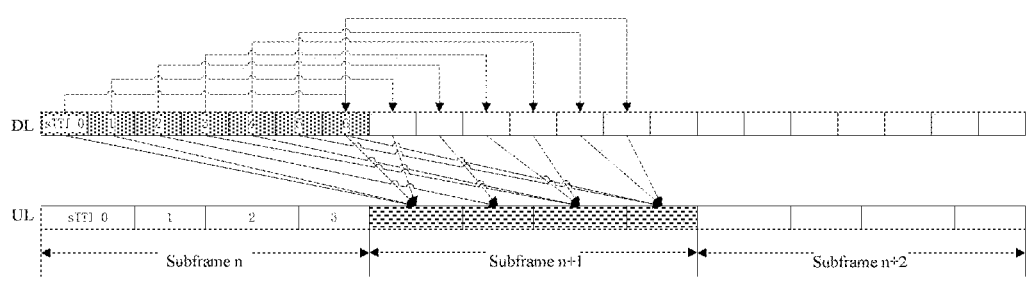
FIG. 15 is a schematic diagram of fixed timing for DL data feedback when DL sTTIs and UL sTTIs are unequal (DL sTTI=2 symbols and UL sTTI=4 symbols) and are not aligned according to an embodiment of the disclosure.

If it is considered that the minimum timing interval is k=5 UL sTTIs, as shown in FIG. 15, seven groups of timing relationships that the DL sTTIs #0 and 1 in the subframe n where the sPDSCH is located correspond to the UL sTTI #0 in the subframe n+1 where the fed back ACK/NACK (sPUCCH) is located, the DL sTTI #2 in the subframe n where the sPDSCH is located corresponds to the UL sTTI #1 in the subframe n+1 where the fed back ACK/NACK (sPUCCH) is located, the DL sTTIs #3 and 4 in the subframe n where the sPDSCH is located correspond to the UL sTTI #2 in the subframe n+1 where the fed back ACK/NACK (sPUCCH) is located and the DL sTTIs #5 and 6 in the subframe n where the sPDSCH is located correspond to the UL sTTI #3 in the subframe n+1 where the fed back ACK/NACK (sPUCCH) is located meet the minimum interval k=5 DL sTTIs. Correspondingly, when DL sTTI=UL sTTI=2, the timing relationship meets the interval k=5 DL sTTIs, that is, the timing relationship meets sTTI j=i+6, where i is the timing starting point sTTI sequence number and j is the timing ending point sTTI sequence number.

In other UL and DL sTTI division scenarios, the DL data feedback timing may be obtained according to the principle (a), as described in (A). No more elaborations will be made.

A sixth manner: when the minimum interval between the sPDSCH and the ACK/NACK (sPUCCH) is k UL sTTIs, the timing reference ending point is complete UL sTTIs that enable the timing interval to be more than or equal to the minimum interval and uniformly distributed or distributed at equal intervals in the subframe, and the timing reference starting point is the DL sTTI where the sPDSCH is located.

The sixth manner may also be expressed through (b).

(b) The timing reference ending point is the UL sTTIs meeting the condition that the minimum interval between the sPDSCH and the sPUCCH is k DL sTTIs and uniformly distributed or distributed at equal intervals in the subframe, and the timing reference starting point is the DL sTTI where the sPDSCH is located.

Specifically, for example, when DL sTTI=7 (OFDM symbols) and UL sTTI=4 (OFDM symbols), the timing relationship determined according to the principle (b) is as follows: two groups of timing relationships that the DL sTTIs #0 and 1 in the subframe n where the sPDSCH is located corresponds to the UL sTTIs #0 and 2 in the subframe n+2 where the fed back ACK/NACK (sPUCCH) is located meet that the minimum interval is k=3 DL sTTIs and the UL sTTIs are distributed at equal intervals. Correspondingly, when DL sTTI=UL sTTI=7, the timing relationship meets the interval k=3 DL sTTIs, that is, the timing relationship meets sTTI j=i+4, where i is the timing starting point sTTI sequence number and j is the timing ending point sTTI sequence number.

A seventh manner: when the minimum interval between the sPDSCH and the ACK/NACK (sPUCCH) is k UL sTTIs, the timing reference ending point is complete UL sTTI that enables the timing interval to be more than or equal to the minimum interval and continuous in the subframe, and the timing reference starting point is the DL sTTI where the sPDSCH is located.

The seventh manner may also be expressed through (c).

(c) The timing reference ending point is the UL sTTIs meeting the condition that the minimum interval between the sPDSCH and the sPUCCH is k DL sTTIs and continuous in the subframe, and the timing reference starting point is the DL sTTI where the sPDSCH is located.

Specifically, for example, when DL sTTI=7 (OFDM symbols) and UL sTTI=4 (OFDM symbols), the timing relationship determined according to the principle (c) is as follows: the two groups of timing relationships that the DL sTTIs #0 and 1 in the subframe n where the sPDSCH is located corresponds to the UL sTTIs #1 and 2 in the subframe n+2 where the fed back ACK/NACK (sPUCCH) is located meet that the minimum interval is k=3 DL sTTIs and the UL sTTIs are continuous.

Correspondingly, when DL sTTI=UL sTTI=7, the timing relationship meets the interval k=3 DL sTTIs, that is, the timing relationship meets sTTI j=i+4, where i is the timing starting point sTTI sequence number and j is the timing ending point sTTI sequence number.

Furthermore, a determination manner for the timing ending point of fixed timing includes at least one of the following manners.

The timing reference starting point is a subframe n, DL sTTI i and the timing reference ending point is subframe m, a UL sTTI j. In such case, the timing reference ending point i directly obtained according to a corresponding relationship table of (n, i) to (m, j).

Specifically, descriptions are made on the basis of example (A-1). When DL sTTI=2 (OFDM symbols) and UL sTTI=4 (OFDM symbols), descriptions may be made with a manner (1) or (2).

(1) Table 1 is a timing relationship table for UL scheduling timing from (subframe n, DL sTTI i) (UL grant) to (subframe m=n+k1, UL sTTI j=i+k2) (sPUSCH), as shown in Table 1.

TABLE 1

| | i | | | | | |
|---|---|---|---|---|---|---|
| | 1 | 2 | 3 | 4 | 5 | 6 |
| (k1, k2) | — | (1, −1) | (1, −1) | — | (1, −2) | — | (1, −3) |

(2) Table 2 is a timing relationship table of UL scheduling timing from (subframe n, DL sTTI i) (UL grant) to (subframe m=n+k1, UL sTTI j) (sPUSCH), as shown in Table 2.

TABLE 2

| | i | | | | | | |
|---|---|---|---|---|---|---|---|
| | 0 | 1 | 2 | 3 | 4 | 5 | 6 |
| (k1, j) | — | (1, 0) | (1, 1) | — | (1, 2) | — | (1, 3) |

The timing reference starting point is subframe n, DL sTTI i. In such case, (n, i) corresponds to a UL sTTI (n, i') in the same subframe at first, and then the timing reference ending point is determined by j=i'+k2.

Specifically, descriptions are made on the basis of example (A-1). When DL sTTI=2 (OFDM symbols) and UL sTTI=4 (OFDM symbols), Table 3 is a comparison table for determining the DL sTTI i and UL sTTI i' in the same subframe n, as shown in Table 3.

TABLE 3

| | DL sTTI i | | | | | | |
|---|---|---|---|---|---|---|---|
| | 0 | 1 | 2 | 3 | 4 | 5 | 6 |
| UL sTTI i' | 0 | 0 | 1 | 1 or 2 (preferably 2) | 2 | 3 | 3 |

The timing relationship of the UL scheduling timing from the UL grant (DL sTTI i) to the sPUSCH (UL sTTI i) is j=i'+4. Furthermore, i=1, 2, 4 and 6.

The timing reference starting point is subframe n, DL sTTI i. In such case, the DL sTTI i' meeting the minimum interval is determined at first by i'=i+k2, and then the timing reference ending point is determined by a correspondence between (m, i') and a UL sTTI (m, j) in the same subframe.

Specifically, descriptions are made on the basis of example (A-1). When DL sTTI=2 (OFDM symbols) and UL sTTI=4 (OFDM symbols), the DL sTTI is calculated at first according to the minimum timing interval n+4, and the DL sTTI i'=i+4 is calculated at first according to the timing relationship of the DL data feedback timing from the sPDSCH (DL sTTI i) to the sPUCCH (UL sTTI j) and with reference to the DL sTTI. Table 4 is a comparison table for determining the DL sTTI i' and the UL sTTI j, as shown in Table 4.

TABLE 4

| | DL sTTI i' | | | | | | |
|---|---|---|---|---|---|---|---|
| | 0 | 1 | 2 | 3 | 4 | 5 | 6 |
| UL sTTI j | 0 | 1 | 1 | 2 | 3 | 3 | 0-in subframe n + 1 | j in the DL data feedback timing from the sPDSCH (DL sTTI i) to the sPUCCH (UL sTTI j) is obtained by table lookup. Furthermore, i=0, 1, 2, 3, 4, 5 and 6.

The timing reference starting point is subframe n, DL sTTI i. In such case, the timing reference ending point is determined through a function (j)=f(i) or (j)=f(k, i).

(Preferably, in case of a function f, DL sTTI=2 and UL sTTI=4, j=⌊i/2⌋+k i=1, 2, 4 and 6).

(Preferably, in case of the function f, DL sTTI=2 and UL sTTI=7, j=⌊i/4⌋+k i=2 and 6).

Specifically, descriptions are made on the basis of schematic diagram of example (A-1). When DL sTTI=2 (OFDM symbols) and UL sTTI=4 (OFDM symbols), the adopted function j=f(i)=⌊i/2⌋+4 or j=f(k, i)=⌊i/2⌋+k is determined, and then the timing relationship of the UL scheduling timing from the UL grant (DL sTTI i) to the sPUSCH (UL sTTI j) is j=i/2+k. Furthermore, i=1, 2, 4 and 6.

Furthermore, when the timing interval includes a legacy PDCCH region which is not divided into a DL sTTI, a determination manner for the k DL sTTIs includes at least one of the following manners.

The k DL sTTIs are k DL sTTIs excluding the legacy PDCCH region.

The k DL sTTIs include the legacy PDCCH region and k−i DL sTTIs.

Furthermore, a value of i is determined according to a size of the legacy PDCCH region and a size of the DL sTTI in at least one of the following manners.

When DL sTTI=2, the value of i is positively proportional to the size of the legacy PDCCH region.

When DL sTTI=2, i is a fixed value, preferably a value in 0 or 1 or 2.

When DL sTTI=7, i is a fixed value, preferably a value in 0 or 1.

Figure 16:
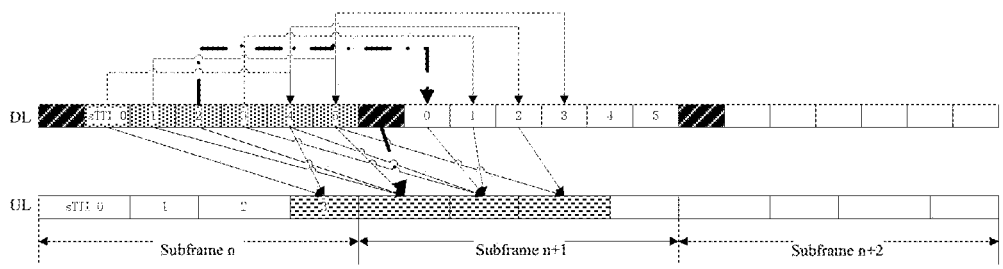
FIG. 16 is a schematic diagram of fixed timing for DL data feedback when DL sTTIs and UL sTTIs are unequal (DL sTTI=2 symbols, a legacy PDCCH region is excluded during division of the DL sTTIs and UL sTTI=4 symbols) and are not aligned according to an embodiment of the disclosure.

Specifically, for example, when legacy PDCCH=2 (OFDM symbols), DL sTTI=2 (OFDM symbols) and UL sTTI=4 (OFDM symbols), as shown in FIG. 16, the legacy PDCCH region is excluded during DL sTTI division. In such case, DL sTTIs in a subframe are 0-5. Still considering that the minimum interval is k DL sTTIs in the principle (a), in such case, there are two conditions after a DL sTTI i+4: the legacy PDCCH is not crossed and the legacy PDCCH is crossed. In such case, the principle is the closest UL sTTI meeting the condition that the minimum interval between the DL sTTIs is k=3 DL sTTIs. Then, it is necessary to consider the legacy PDCCH region. That is, the timing relationship when the legacy PDCCH is not crossed is the DL sTTI i+4 and the timing relationship when the legacy PDCCH is crossed is a DL sTTI i+4-1. (k−1 is considered for the timing relationship represented by the black chain dotted line and the right side thereof in the figure).

Furthermore, when a signaling indication manner is adopted for the scheduling timing or the feedback timing, the determination method for the timing interval includes at least one of the following manners.

From the timing reference starting point, the timing interval is formed by k1 subframes and/or k2 DL sTTIs and/or k3 UL sTTIs.

From the timing reference starting point, the timing interval is formed by the k1 subframes and/or the k2 DL sTTIs and/or the k3 UL sTTIs on the basis of a fixed timing interval.

Herein, at least one of k1, k2 and k3 is notified through physical-layer signaling or high-layer signaling.

The timing relationship includes at least one of a UL scheduling timing interval UL grant→sPUSCH, a DL data feedback timing interval sPDSCH→ACK/NACK (sPUCCH), a DL scheduling timing interval DL grant→sPDSCH and a UL data feedback timing interval sPUSCH→ACK/NACK (UL grant or Physical Hybrid Automatic Repeat reQuest (ARQ) Indicator Channel (PHICH).

The timing relationships may be represented as a timing relationship A→B in a unified manner, A being located in subframe n, sTTI m. Then, a timing starting moment B is determined according to the timing relationship A+k1*subframe+k2*DL sTTI+k3*UL sTTI. When k1 is 0, it is indicated that a corresponding parameter is not adopted to determine the timing relationship. For example, when k1 in k1, k2 and k3 is 0, it is indicated that the timing relationship is only determined according to the DL sTTI and the UL sTTI. When k1=k2=0, it is indicated that the timing relationship is only determined according to the UL sTTI. When k3=0, it is indicated that the timing relationship is only determined according to the subframe and the DL sTTI. Other conditions will not be elaborated. When the timing interval is a fixed timing interval, k1, k2 and k3 are fixed values. When the timing interval is an unfixed timing interval, at least one of k1, k2 and k3 is indicated through the physical-layer signaling (Downlink Control Information (DCI)) or the high-layer signaling (Radio Resource Control (RRC).

Furthermore, a determination manner for the timing reference starting point includes at least one of the following manners:

an ending position of a subframe where the UL grant or the sPDSCH is located; a starting position of the subframe where the UL grant or the sPDSCH is located; the DL sTTI where the UL grant or the sPDSCH is located; a position of a UL sTTI corresponding to the DL sTTI where the UL grant or the sPDSCH is located; an ending position of a subframe where the UL sTTI is located; a starting position of the subframe where the UL sTTI is located; a present position of the UL sTTI; and a position of the DL sTTI corresponding to the UL sTTI.

The timing reference starting point of the UL scheduling timing interval and the DL data feedback timing interval (DL sTTI to UL sTTI) includes at least one of: the ending position of the subframe where the DL sTTI is located, the starting position of the subframe where the DL sTTI is located, the present position of the DL sTTI and the position of the UL sTTI corresponding to the DL sTTI. Specifically, the timing reference starting point of the UL scheduling timing interval UL grant→PUSCH includes at least one of: the ending position where the UL grant is located; the starting position of the subframe where the UL grant is located; the DL sTTI where the UL grant is located; and the position of the UL sTTI corresponding to the DL sTTI where the UL grant is located. Specifically, the timing reference starting point of the DL data feedback timing interval sPDSCH→ACK/NACK (sPUCCH) includes at least one of: the ending position of the subframe where the sPDSCH is located; the starting position of the subframe where the sPDSCH is located; the DL sTTI where the sPDSCH is located; and the position of the UL sTTI corresponding to the DL sTTI where the sPDSCH is located.

The timing reference starting point of the DL scheduling timing interval DL grant→sPDSCH includes at least one of: an ending position of a subframe where the DL grant is located and a DL sTTI where the DL grant is located.

The timing reference starting point of the DL scheduling timing interval DL grant→sPDSCH includes at least one of: an ending position of a subframe where the sPUSCH is located; a starting position of the subframe where the sPUSCH is located; a DL sTTI where the sPUSCH is located; and a position of a UL sTTI corresponding to the DL sTTI where the sPUSCH is located.

Furthermore, the determination manner for the timing ending point includes at least one of the following manners:

the present position of the DL sTTI, the position of the UL sTTI corresponding to the DL sTTI, the present position of the UL sTTI and the position of the DL sTTI corresponding to the UL sTTI.

Specifically, the timing ending point of the UL scheduling timing interval UL grant→sPUSCH includes at least one of: the UL sTTI where the sPUSCH is located and a UL sTTI corresponding to a DL sTTI determined by adding k DL sTTIs to the DL sTTI where the UL grant is located. Specifically, the timing ending point of the DL data feedback timing interval sPDSCH→ACK/NACK (sPUCCH) includes at least one of: the UL sTTI where the sPUCCH is located and a UL sTTI corresponding to a DL sTTI determined by adding k DL sTTIs to the DL sTTI where the sPDSCH is located.

Furthermore, a determination method for the position of the UL sTTI corresponding to the DL sTTI includes at least one of the following manners (similarly, manners 1-4 are also applied to corresponding determination of the timing end points DL sTTI and UL sTTI) (a UL sTTI #m1 corresponding to a DL sTTI #m is determined):

a first manner: the UL sTTI m1 where a starting symbol of the DL sTTI m is located; or a second manner: the UL sTTI m1 where an ending symbol of the DL sTTI m is located; or a third manner: the next UL sTTI m1 of a UL sTTI where the starting symbol of the DL sTTI m is located; or a fourth manner: the next UL sTTI m1 of a UL sTTI where the ending symbol of the DL sTTI m is located.

Specifically, the UL sTTI #m1 corresponding to the DL sTTI #m is determined. For example, the UL grant schedules the sPUSCH, the DL sTTI m where the UL grant is located corresponds to the UL sTTI #m1, k2 represents the number of UL sTTIs, and if the scheduling timing is only determined according to the sTTI, the scheduling timing that the UL grant schedules the sPUSCH is m1+k2*sTTI, the sTTI being a UL sTTI. A manner for correspondence between the DL sTTI m where the UL grant is located and the UL sTTI #m1 may be one of the manners 1-4. For example, for the DL data feedback timing interval sPDSCH→ACK/NACK (sPUCCH), if the feedback timing is only determined according to the sTTI, the DL sTTI m determined adding the minimum feedback time interval k (for example, k=4) DL sTTIs to the DL sTTI where the sPDSCH is located corresponds to the UL sTTI m1, and the ACK/NACK (sPUCCH) is fed back and born in the UL sTTI m1 (in case of a fixed timing relationship) or a next UL sTTI (in case of an unfixed timing relationship). Herein, a manner for correspondence between the DL sTTI m and the UL sTTI #m1 may be one of the manners 1-4.

Furthermore, a determination method for the position of the DL sTTI corresponding to the UL sTTI includes at least one of:

a first manner: the DL sTTI m1 where a starting symbol of the UL sTTI m is located; or a second manner: the DL sTTI m1 where an ending symbol of the UL sTTI m is located; or a third manner: the next DL sTTI m1 of a DL sTTI where the starting symbol of the UL sTTI m is located; or a fourth manner: the next DL sTTI m1 of a DL sTTI where the ending symbol of the UL sTTI m is located.

Specifically, the DL sTTI #m1 corresponds to the UL sTTI #m is determined. For example, for the UL data feedback timing interval sPUSCH→ACK/NACK (UL grant), when the feedback timing is only determined according to the sTTI, the UL sTTI m determined by adding the minimum feedback time interval k (for example, k=4) UL sTTIs to the UL sTTI where the sPUSCH is located corresponds to the DL sTTI m1, and the ACK/NACK (UL grant) is fed back and born in the DL sTTI m1 or a next DL sTTI. Herein, a manner for correspondence between the UL sTTI m and the DL sTTI #m1 may be one of the manners 1-4.

Furthermore, if the UL sTTI determined for the DL sTTI m in the manners 1-4 includes multiple UL sTTIs (more than or equal to 2, that is, there is more than one UL sTTI), one of them is determined in at least one of the following manners.

The one aligned with the DL sTTI in the multiple UL sTTIs is selected.

The one which may include all OFDM symbols of the DL sTTI in the multiple UL sTTIs is selected.

The one which may include more of all the OFDM symbols of the DL sTTI in the multiple UL sTTIs is selected.

The last one of the multiple UL sTTIs is selected.

The first one of the multiple UL sTTIs is selected.

Specifically, since the UL sTTIs include overlapped sTTIs, for example, two UL sTTIs share a UL RS of the same OFDM symbol, if there are two corresponding UL sTTIs, for example, corresponding to an overlapped symbol, determined in the manners 1-4 and the UL RS shared by the two sTTIs is on the overlapped symbol, the one aligned with the DL sTTI is preferably selected as the UL sTTI m1; or the one including all the OFDM symbols of the DL sTTI may be selected from the multiple UL sTTIs as the UL sTTI m1; or the one including more of all the OFDM symbols of the DL sTTI may be selected from the multiple UL sTTIs as the UL sTTI m1; or the first one of the overlapped sTTIs is selected, for example, it is considered that the DL sTTI may be aligned with the UL sTTI, or transmission may be implemented most rapidly on the premise that a minimum timing requirement is met; and the last one of the overlapped sTTIs is preferably selected, for example, it is considered that the DL sTTI may be aligned with the UL sTTI, or a sufficient preparation time is provided on the premise that the minimum timing requirement is met.

Related additional descriptions are made. When an LTE system supports an sTTI, a legacy PDCCH is a PDCCH in the LTE system. An sPDCCH represents a PDCCH in the sTTI and may be called an sPDCCH for short. Similarly, a PDSCH in the sTTI may be called an sPDSCH for short, a PUSCH in the sTTI may be called an sPUSCH for short and a PUCCH in the sTTI may be called an sPUCCH for short.

The sPDCCH bears a DL grant to schedule the sPDSCH, the sPDCCH bears a UL grant to schedule the sPUSCH, an ACK/NACK is born through the sPUCCH for feedback for the sPDSCH and a feedback is given to the sPUSCH through the UL grant. The sTTI is a TTI shorter than 1 ms in terms of time. When being applied to the LTE system, the sTTI consists of N OFDM symbols, and the number N of the included OFDM symbols is at least one of {1, 2, 3, 4, 5, 6, 7}. Herein, if the sTTI includes N OFDM symbols, the sPDCCH occupies X OFDM symbols on a time domain, X<N and a value of X is preferably 1 or 2. Moreover, the X OFDM symbols are first X OFDM symbols of the N OFDM symbols of the sTTI. The value of X may be fixed or configured by a base station. Preferably, a length of a DL sTTI includes two OFDM symbols and a slot (including 7 OFDM symbols of case of a normal Cyclic Prefix (CP) and including 6 OFDM symbols of case of an extended CP). A length of a UL sTTI includes two OFDM symbols, four OFDM symbols and a slot (including 7 OFDM symbols of case of the normal CP and including 6 OFDM symbols of case of the extended CP).

Specific Embodiment 1

FIG. 3 illustrates UL and DL sTTI division when a DL sTTI includes two OFDM symbols and a UL sTTI includes four OFDM symbols. It is to be noted that, in such case, a UL sTTI 1 also includes a last OFDM symbol of a UL sTTI 0. That is, a middlemost OFDM symbol, i.e., a fourth OFDM symbol, in a slot in case of a normal CP is shared by previous and next UL sTTIs.

For UL scheduling timing UL grant→sPUSCH, a relationship between UL sTTIs that a minimum interval is 3 UL sTTIs is met.

In such case, fixed scheduling timing is adopted. That is, only four DL sTTIs are selected from seven DL sTTIs to schedule four UL sTTIs respectively.

It is noted that a scheduling relationship is shown by solid arrowheads. A process is presented by two dotted arrowheads: a DL sTTI 1 corresponds to the UL sTTI 0 at first (a principle is a closest DL sTTI meeting the condition that the minimum interval between the UL sTTIs is 3 UL sTTIs), and then subframe n+1, UL sTTI 0 is determined through UL sTTI timing 0+4. The scheduling relationship (including the process) may be embodied in a form of the following first or second or third manner.

That is, when DL sTTI=2 (OFDM symbols) and UL sTTI=4 (OFDM symbols), four groups of timing relationships that DL sTTIs #1, 2, 4 and 6 in a subframe n where a UL grant is located schedule UL sTTIs #0, 1, 2 and 3 in a subframe n+1 where an sPUSCH is located respectively meet the minimum interval k=3 UL sTTIs. Correspondingly, when DL sTTI=UL sTTI=4, the timing relationship meets the interval k=3 UL sTTIs, that is, the timing relationship meets sTTI j=i+4, where i is a timing starting point sTTI sequence number and j is a timing ending point sTTI sequence number.

The first manner: a timing relationship of UL scheduling timing from (subframe n, DL sTTI i) (UL grant) to (subframe m=n+k1, UL sTTI j=i+k2) (sPUSCH) is shown in Table 1. Or, the timing relationship of the UL scheduling timing from (subframe n, DL sTTI i) (UL grant) to (subframe m=n+k1, UL sTTI j) (sPUSCH) is shown in Table 2.

The second manner: a timing reference starting point is subframe n, DL sTTI i. In such case, (n, i) corresponds to a UL sTTI (n, i') in the same subframe at first, and then a timing reference ending point is determined by j=i'+k2. That is, as shown in Table 3 which is a comparison table for determining the DL sTTI i and UL sTTI i' in the same subframe n, the timing relationship of the UL scheduling timing from the UL grant (DL sTTI i) to the sPUSCH (UL sTTI j) is j=i'+4. Furthermore, i=1, 2, 4 and 6.

The third manner: the timing reference starting point is subframe n, DL sTTI i. In such case, the timing reference ending point is determined through a function (j)=f(i) or (j)=f(k, i). If it is determined that the adopted function is j=f(i)=+4 or j=f(k, i)=, the timing relationship of the UL scheduling timing from the UL grant (DL sTTI i) to the sPUSCH (UL sTTI j) is j=+4. Furthermore, i=1, 2, 4 and 6.

Through the solution of the embodiment, a timing relationship determination method disclosed in the disclosure may be adopted to solve problems about accurate determination of the timing relationship when divided UL and DL sTTIs in an sTTI including relatively few OFDM symbols are not aligned, particularly solve the problem that the UL and DL sTTIs are not aligned by determining the closest DL sTTI meeting minimum timing in case of the fixed timing relationship, solve the problem of different UL and DL sTTI understandings and meet a low-delay communication requirement.

Specific Embodiment 2

FIG. 4 illustrates UL and DL sTTI division when a DL sTTI includes two OFDM symbols and a UL sTTI includes four OFDM symbols. It is to be noted that, in such case, a UL sTTI 1 also includes a last OFDM symbol of a UL sTTI 0. That is, a middlemost OFDM symbol, i.e., a fourth OFDM symbol, in a slot in case of a normal CP is shared by previous and next UL sTTIs.

For UL scheduling timing UL grant→sPUSCH, a relationship between UL sTTIs that a minimum interval is 5 UL sTTIs is met.

In such case, fixed scheduling timing is adopted. That is, only four DL sTTIs are selected from seven DL sTTIs to schedule four UL sTTIs respectively.

It is noted that a scheduling relationship is shown by solid arrowheads. A process is presented by two dotted arrowheads: a DL sTTI 1 corresponds to the UL sTTI 0 at first (a principle is a closest DL sTTI meeting the condition that the minimum interval between the UL sTTIs is 5 UL sTTIs), and then subframe n+1, UL sTTI 0 is determined through UL sTTI timing 0+6. The scheduling relationship (including the process) may be embodied in a form of the following first or second or third manner.

That is, when DL sTTI=2 (OFDM symbols) and UL sTTI=4 (OFDM symbols), four groups of timing relationships that DL sTTIs #1, 2, 4 and 6 in a subframe n where a UL grant is located schedule UL sTTIs #2 and 3 in a subframe n3 where an sPUSCH is located and UL sTTIs #0 and 1 in a subframe n+2 respectively meet the minimum interval k=5 UL sTTIs. Correspondingly, when DL sTTI=UL sTTI=4, the timing relationship meets the interval k=5 UL sTTIs, that is, the timing relationship meets sTTI j=i+6, where i is a timing starting point sTTI sequence number and j is a timing ending point sTTI sequence number. (More values of k will not be elaborated.)

A first manner: Table 5 is a second timing relationship table between UL scheduling timing (subframe n, DL sTTI i) (UL grant) and (subframe m=n+k1, UL sTTI j=i+k2) (sPUSCH), as shown in Table 5.

TABLE 5

| | i | | | | | | |
|---|---|---|---|---|---|---|---|
| | 0 | 1 | 2 | 3 | 4 | 5 | 6 |
| (k1, k2) | — | (1, 1) | (1, 1) | — | (2, −4) | — | (2, −5) |

Or, Table 6 is a second timing relationship table of UL scheduling timing from (subframe n, DL sTTI i) (UL grant) to (subframe m=n+k1, UL sTTI j) (sPUSCH), as shown in Table 6.

TABLE 6

| | i | | | | | | |
|---|---|---|---|---|---|---|---|
| | 0 | 1 | 2 | 3 | 4 | 5 | 6 |
| (k1, j) | — | (1, 2) | (1, 3) | — | (2, 0) | — | (2, 1) |

For the UL sTTI (n, i') in the same subframe, a timing reference ending point is determined by j=i'+k2. That is, a comparison table, as shown in Table 3, for the DL sTTI i and UL sTTI i' in the same subframe n is determined at first, and the timing relationship of the UL scheduling timing from the UL grant (DL sTTI i) to the sPUSCH (UL sTTI j) is j=i'+6. Furthermore, i=1, 2, 4 and 6.

A third manner: the timing reference starting point is subframe n, DL sTTI i. In such case, the timing reference ending point is determined through a function (j)=f(i) or (j)=f(k, i). If it is determined that the adopted function is j=f(i)=+6 or j=f(k, i)=+k, the timing relationship of the UL scheduling timing from the UL grant (DL sTTI i) to the sPUSCH (UL sTTI j) is j=+6. Furthermore, i=1, 2, 4 and 6.

Through the solution of the embodiment, a timing relationship determination method disclosed in the disclosure may be adopted to solve problems about accurate determination of the timing relationship when divided UL and DL sTTIs in an sTTI including relatively few OFDM symbols are not aligned, particularly solve the problem that the UL and DL sTTIs are not aligned by determining the closest DL sTTI meeting minimum timing in case of the fixed timing relationship, solve the problem of different UL and DL sTTI understandings and meet a low-delay communication requirement.

Specific Embodiment 3

FIG. 12 illustrates UL and DL sTTI division when a DL sTTI includes two OFDM symbols and a UL sTTI includes four OFDM symbols. It is to be noted that, in such case, a UL sTTI 1 also includes a last OFDM symbol of a UL sTTI 0. That is, a middlemost OFDM symbol, i.e., a fourth OFDM symbol, in a slot in case of a normal CP is shared by previous and next UL sTTIs.

For UL scheduling timing UL grant→sPUSCH, a relationship between UL sTTIs that a minimum interval is k=3 UL sTTIs is met. (More values of k will not be elaborated.) In such case, fixed scheduling timing is adopted. That is, only four DL sTTIs are selected from seven DL sTTIs to schedule four UL sTTIs respectively.

It is noted that a scheduling relationship is shown by solid arrowheads. A process is presented by two dotted arrowheads: closest DL sTTIs meeting the condition that the minimum interval between the UL sTTIs is 3 UL sTTIs are determined and the DL sTTIs are uniformly distributed. The scheduling relationship (including the process) may be embodied in a form of the following first or second or third manner.

That is, when DL sTTI=2 (OFDM symbols) and UL sTTI=4 (OFDM symbols), four groups of timing relationships that DL sTTIs #0, 2, 4 and 6 in a subframe n where a UL grant is located schedule UL sTTIs #0, 1, 2 and 3 in a subframe n+1 where an sPUSCH is located respectively meet that the minimum interval is k=3 UL sTTIs and the DL sTTIs are uniformly distributed. Correspondingly, when DL sTTI=UL sTTI=4, the timing relationship meets the interval k=3 UL sTTIs, that is, the timing relationship meets sTTI j=i+4, where i is a timing starting point sTTI sequence number and j is a timing ending point sTTI sequence number.

A first manner: Table 7 is a timing relationship table between UL scheduling timing (subframe n, DL sTTI i) (UL grant) and (subframe m=n+k1, UL sTTI j=i+k2) (sPUSCH), as shown in Table 7.

TABLE 7

| | i | | | | | | |
|---|---|---|---|---|---|---|---|
| | 0 | 1 | 2 | 3 | 4 | 5 | 6 |
| (k1, k2) | (1, 0) | — | (1, −1) | — | (1, −2) | — | (1, −3) |

Or, Table 8 is a timing relationship table of UL scheduling timing from (subframe n, DL sTTI i) (UL grant) to (subframe m=n+k1, UL sTTI j) (sPUSCH), as shown in Table 8.

TABLE 8

| | i | | | | | | |
|---|---|---|---|---|---|---|---|
| | 0 | 1 | 2 | 3 | 4 | 5 | 6 |
| (k1, j) | (1, 0) | — | (1, 1) | — | (1, 2) | — | (1, 3) |

A second manner: a timing reference starting point is subframe n, DL sTTI i. In such case, (n, i) corresponds to a UL sTTI (n, i') in the same subframe at first, and then a timing reference ending point is determined by j=i'+k2. That is, a comparison table, as shown in Table 3, for the DL sTTI i and UL sTTI i' in the same subframe n is determined at first, and the timing relationship of the UL scheduling timing from the UL grant (DL sTTI i) to the sPUSCH (UL sTTI j) is j=i'+4. Furthermore, i=0, 2, 4 and 6.

A third manner: the timing reference starting point is subframe n, DL sTTI i. In such case, the timing reference ending point is determined through a function (j)=f(i) or (j)=f(k, i). If it is determined that the adopted function is j=f(i)=⌊i/2⌋+4 or j=f(k, i)=⌊i/2⌋+k, the timing relationship of the UL scheduling timing from the UL grant (DL sTTI i) to the sPUSCH (UL sTTI j) is j=⌊i/2⌋+4. Furthermore, i=0, 2, 4 and 6.

Through the solution of the embodiment, a timing relationship determination method disclosed in the disclosure may be adopted to solve problems about accurate determination of the timing relationship when divided UL and DL sTTIs in an sTTI including relatively few OFDM symbols are not aligned, particularly solve the problem that the UL and DL sTTIs are not aligned by determining the closest DL sTTIs meeting minimum timing, the DL sTTIs being uniformly distributed, in case of the fixed timing relationship, solve the problem of different UL and DL sTTI understandings and meet a low-delay communication requirement.

Specific Embodiment 4

FIG. 13 illustrates UL and DL sTTI division when a DL sTTI includes two OFDM symbols and a UL sTTI includes four OFDM symbols. It is to be noted that, in such case, a UL sTTI 1 also includes a last OFDM symbol of a UL sTTI 0. That is, a middlemost OFDM symbol, i.e., a fourth OFDM symbol, in a slot in case of a normal CP is shared by previous and next UL sTTIs.

For UL scheduling timing UL grant→sPUSCH, a relationship between UL sTTIs that a minimum interval is k=3 UL sTTIs is met. (More values of k will not be elaborated.) In such case, fixed scheduling timing is adopted and each DL sTTI may schedule an sPUSCH.

It is noted that a scheduling relationship is shown by solid arrowheads. A process is presented by two dotted arrowheads: closest DL sTTIs meeting the condition that the minimum interval between the UL sTTIs is 3 UL sTTIs are determined and each DL sTTI may schedule the sPUSCH. The scheduling relationship (including the process) may be embodied in a form of the following first or second or third manner.

That is, when DL sTTI=2 (OFDM symbols) and UL sTTI=4 (OFDM symbols), each group of timing relationship that the DL sTTI #0 or 1 in the subframe n where the UL grant is located schedules the UL sTTI #0 in the subframe n+1 where the sPUSCH is located, the DL sTTI #2 in the subframe n where the UL grant is located schedules the UL sTTI #1 in the subframe n+1 where the sPUSCH is located, the DL sTTI #3 or 4 in the subframe n where the UL grant is located schedules the UL sTTI #2 in the subframe n+1 where the sPUSCH is located and the DL sTTI #5 or 6 in the subframe n where the UL grant is located schedules the UL sTTI #3 in the subframe n+1 where the sPUSCH is located meets that the minimum interval is k=3 UL sTTIs and each DL sTTI is allowed to schedule the sPUSCH. Correspondingly, when DL sTTI=UL sTTI=4, the timing relationship meets the interval k=3 UL sTTIs, that is, the timing relationship meets sTTI j=i+4, where i is a timing starting point sTTI sequence number and j is a timing ending point sTTI sequence number.

A first manner: Table 9 is a timing relationship table between UL scheduling timing (subframe n, DL sTTI i) (UL grant) and (subframe m=n+k1, UL sTTI j=i+k2) (sPUSCH), as shown in Table 9.

TABLE 9

| | i | | | | | | |
|---|---|---|---|---|---|---|---|
| | 0 | 1 | 2 | 3 | 4 | 5 | 6 |
| (k1, k2) | (1, 0) | (1, −1) | (1, −1) | (1, −1) | (1, −2) | (1, −2) | (1, −3) |

Or, Table 10 is a timing relationship table of UL scheduling timing from (subframe n, DL sTTI i) (UL grant) to (subframe m=n+k1, UL sTTI j) (sPUSCH), as shown in Table 10.

TABLE 10

| | i | | | | | | |
|---|---|---|---|---|---|---|---|
| | 0 | 1 | 2 | 3 | 4 | 5 | 6 |
| (k1, j) | (1, 0) | (1, 0) | (1, 1) | (1, 2) | (1, 2) | (1, 3) | (1, 3) |

A second manner: a timing reference starting point is subframe n, DL sTTI i. In such case, (n, i) corresponds to a UL sTTI (n, i') in the same subframe at first, and then a timing reference ending point is determined by j=i'+k2. That is, a comparison table, as shown in Table 11, for the DL sTTI i and UL sTTI i' in the same subframe n is determined at first.

TABLE 11

| | DL sTTI i | | | | | | |
|---|---|---|---|---|---|---|---|
| | 0 | 1 | 2 | 3 | 4 | 5 | 6 |
| UL sTTI i' | 0 | 0 | 1 | 2 | 2 | 3 | 3 |

The timing relationship of the UL scheduling timing from the UL grant (DL sTTI i) to the sPUSCH (UL sTTI i) is j=i'+4. Furthermore, i=0, 1, 2, 3, 4, 5 and 6.

A third manner: the timing reference starting point is subframe n, DL sTTI i. In such case, the timing reference ending point is determined through a function (j)=f(i) or (j)=f(k, i). If it is determined that the adopted function is $$j = f(i) = \begin{cases} \lfloor i/2 \rfloor + 4, i = 0, 1, 2 \\ \lceil i/2 \rceil + 4, i = 3, 4, 5, 6 \end{cases} \text{ or}$$

$$j = f(k, i) = \begin{cases} \lfloor i/2 \rfloor + k, i = 0, 1, 2 \\ \lceil i/2 \rceil + k, i = 3, 4, 5, 6 \end{cases},$$

the timing relationship of the UL scheduling timing from the UL grant (DL sTTI i) to the sPUSCH (UL sTTI j) is $$j = \begin{cases} \lfloor i/2 \rfloor + 4, i = 0, 1, 2 \\ \lceil i/2 \rceil + 4, i = 3, 4, 5, 6 \end{cases}.$$

Furthermore, i=0, 1, 2, 3, 4, 5 and 6.

Through the solution of the embodiment, a timing relationship determination method disclosed in the disclosure may be adopted to solve problems about accurate determination of the timing relationship when divided UL and DL sTTIs in an sTTI including relatively few OFDM symbols are not aligned, particularly solve the problem that the UL and DL sTTIs are not aligned by determining the closest DL sTTIs meeting minimum timing, each DL sTTI being allowed to schedule the sPUSCH, in case of the fixed timing relationship, solve the problem of different UL and DL sTTI understandings and meet a low-delay communication requirement.

Specific Embodiment 5

FIG. 13 illustrates UL and DL sTTI division when a DL sTTI includes two OFDM symbols and a UL sTTI includes four OFDM symbols. It is to be noted that, in such case, a UL sTTI 1 also includes a last OFDM symbol of a UL sTTI 0. That is, a middlemost OFDM symbol, i.e., a fourth OFDM symbol, in a slot in case of a normal CP is shared by previous and next UL sTTIs.

For UL scheduling timing UL grant→sPUSCH, a relationship between UL sTTIs that a minimum interval is k=3 UL sTTIs is met. In such case, dynamic timing additionally indicating k UL sTTIs on the basis of fixed scheduling timing is adopted. A fixed timing relationship takes embodiment 4 as an example, and a scheduling relationship is shown by solid arrowheads. A process is presented by two dotted arrowheads: closest DL sTTIs meeting the condition that the minimum interval between the UL sTTIs is 3 UL sTTIs are determined and each DL sTTI may schedule the sPUSCH. That is, when DL sTTI=2 (OFDM symbols) and UL sTTI=4 (OFDM symbols), each group of timing relationship that the DL sTTI #0 or 1 in the subframe n where the UL grant is located schedules the UL sTTI #0 in the subframe n+1 where the sPUSCH is located, the DL sTTI #2 in the subframe n where the UL grant is located schedules the UL sTTI #1 in the subframe n+1 where the sPUSCH is located, the DL sTTI #3 or 4 in the subframe n where the UL grant is located schedules the UL sTTI #2 in the subframe n+1 where the sPUSCH is located and the DL sTTI #5 or 6 in the subframe n where the UL grant is located schedules the UL sTTI #3 in the subframe n+1 where the sPUSCH is located meets that the minimum interval is k=3 UL sTTIs and each DL sTTI is allowed to schedule the sPUSCH. Correspondingly, when DL sTTI=UL sTTI=4, the timing relationship meets the interval k=3 UL sTTIs, that is, the timing relationship meets sTTI j=i+4, where i is a timing starting point sTTI sequence number and j is a timing ending point sTTI sequence number.

The dynamic scheduling timing indicates that an offset is additionally indicated on the basis of the fixed timing (minimum timing) through a timing interval indication bit field in the UL grant. For example, four offsets are indicated by 2 bit, for example, 0, 2, 4 and 6 UL sTTIs.

Through the solution of the embodiment, a timing relationship determination method disclosed in the disclosure may be adopted to solve problems about accurate determination of the timing relationship when divided UL and DL sTTIs in an sTTI including relatively few OFDM symbols are not aligned, particularly solve the problem that the UL and DL sTTIs are not aligned by flexibly indicating a position of a UL sTTI where the scheduled sPUSCH is located on the basis of determining that the minimum timing is met in case of the dynamic timing relationship and solve the problem of different UL and DL sTTI understandings.

Specific Embodiment 6

FIG. 5 illustrates UL and DL sTTI division when a DL sTTI includes two OFDM symbols and a UL sTTI includes seven OFDM symbols. It is to be noted that this is a condition of a normal CP.

For UL scheduling timing UL grant→sPUSCH, a relationship between UL sTTIs that a minimum interval is 3 UL sTTIs is met.

In such case, fixed scheduling timing is adopted. That is, only two DL sTTIs are selected from seven DL sTTIs to schedule two UL sTTIs respectively.

It is noted that a scheduling relationship is shown by solid arrowheads. A process is presented by two dotted arrowheads: a DL sTTI 2 corresponds to the UL sTTI 0 at first (a principle is a closest DL sTTI meeting the condition that the minimum interval between the UL sTTIs is 3 UL sTTIs), and then subframe n+2, UL sTTI 0 is determined through UL sTTI timing 0+4. The scheduling relationship (including the process) may be embodied in a form of the following first or second or third manner.

That is, when DL sTTI=2 (OFDM symbols) and UL sTTI=7 (OFDM symbols), two groups of timing relationships that DL sTTIs #2 and 6 in a subframe n where a UL grant is located schedule UL sTTIs #0 and 1 in a subframe n+2 where an sPUSCH is located respectively meet the minimum interval k=3 UL sTTIs. Correspondingly, when DL sTTI=UL sTTI=7, the timing relationship meets the interval k=3 UL sTTIs, that is, the timing relationship meets sTTI j=i+4, where i is a timing starting point sTTI sequence number and j is a timing ending point sTTI sequence number.

A first manner: Table 12 is a timing relationship table between UL scheduling timing (subframe n, DL sTTI i) (UL grant) and (subframe m=n+k1, UL sTTI j=i+k2) (sPUSCH), as shown in Table 12.

TABLE 12

| | i | | | | | | |
|---|---|---|---|---|---|---|---|
| | 0 | 1 | 2 | 3 | 4 | 5 | 6 |
| (k1, k2) | — | — | (2, −2) | — | — | — | (2, −5) |

Or, Table 13 is a timing relationship table of UL scheduling timing from (subframe n, DL sTTI i) (UL grant) to (subframe m=n+k1, UL sTTI j) (sPUSCH), as shown in Table 13.

TABLE 13

| | i | | | | | | |
|---|---|---|---|---|---|---|---|
| | 0 | 1 | 2 | 3 | 4 | 5 | 6 |
| (k1, j) | — | — | (2, 0) | — | — | — | (2, 1) |

A second manner: a timing reference starting point is subframe n, DL sTTI i. In such case, (n, i) corresponds to a UL sTTI (n, i') in the same subframe at first, and then a timing reference ending point is determined by j=i'+k2. That is, a comparison table, as shown in Table 14, for the DL sTTI i and UL sTTI i' in the same subframe n is determined at first.

TABLE 14

| | DL sTTI i | | | | | | |
|---|---|---|---|---|---|---|---|
| | 0 | 1 | 2 | 3 | 4 | 5 | 6 |
| UL sTTI i' | 0 | 0 | 0 | 0 or 1 (preferably 1) | 1 | 1 | 1 |

The timing relationship of the UL scheduling timing from the UL grant (DL sTTI i) to the sPUSCH (UL sTTI i) is j=i'+4. Furthermore, i=2 and 6.

A third manner: the timing reference starting point is subframe n, DL sTTI i. In such case, the timing reference ending point is determined through a function (j)=f(i) or (j)=f(k, i). If it is determined that the adopted function is j=f(i)=⌊i/4⌋+4 or j=f(k, i)=⌊i/4⌋+k, the timing relationship of the UL scheduling timing from the UL grant (DL sTTI i) to the sPUSCH (UL sTTI j) is j=⌊i/4⌋+4. Furthermore, i=2 and 6.

Through the solution of the embodiment, a timing relationship determination method disclosed in the disclosure may be adopted to solve problems about accurate determination of the timing relationship when divided UL and DL sTTIs in an sTTI including relatively few OFDM symbols are not aligned, particularly solve the problem that the UL and DL sTTIs are not aligned by determining the closest DL sTTI meeting minimum timing in case of the fixed timing relationship, solve the problem of different UL and DL sTTI understandings and meet a low-delay communication requirement.

Specific Embodiment 7

FIG. 6 illustrates UL and DL sTTI division when a DL sTTI includes seven OFDM symbols and a UL sTTI includes four OFDM symbols. It is to be noted that, in such case, a UL sTTI 1 also includes a last OFDM symbol of a UL sTTI 0. That is, a middlemost OFDM symbol, i.e., a fourth OFDM symbol, in a slot in case of a normal CP is shared by previous and next UL sTTIs.

For UL scheduling timing UL grant→sPUSCH, a relationship between UL sTTIs that a minimum interval is 3 UL sTTIs is met.

In such case, fixed scheduling timing is adopted. That is, two DL sTTIs are required to schedule four UL sTTIs.

It is noted that a scheduling relationship is shown by solid arrowheads. A process is presented by two dotted arrowheads. A closest DL sTTI meeting the condition that a minimum interval between the UL sTTIs is 3 UL sTTIs, there is made such a hypothesis that the UL grant is located in first two OFDM symbols of the DL sTTI and a minimum interval between an ending position of the UL grant and a starting position of a scheduled UL sTTI is 3 UL sTTIs. The scheduling relationship (including the process) may be embodied in a form of the following first or second or third manner.

That is, when DL sTTI=7 (OFDM symbols) and UL sTTI=4 (OFDM symbols), the UL grant is located in first two OFDM symbols of the sTTI and four groups of timing relationships that the DL sTTI #0 in the subframe n schedules the sPUSCH of the UL sTTIs #0 and 1 in the subframe n+1 and the DL sTTI #1 in the subframe n schedules the sPUSCH of the UL sTTIs #2 and 3 in the subframe n+1 meet the minimum interval k=3 UL sTTIs between the UL grant and the sPUSCH. Correspondingly, when DL sTTI=UL sTTI=4, the timing relationship meets the interval k=3 UL sTTIs, that is, the timing relationship meets sTTI j=i+4, where i is a timing starting point sTTI sequence number and j is a timing ending point sTTI sequence number.

The first manner: Table 15 is a timing relationship table for UL scheduling timing from (subframe n, DL sTTI i) (UL grant) to (subframe m=n+k1, UL sTTI j=i+k2) (sPUSCH) (it is noted that a DL sTTI is required to schedule two UL sTTIs, so that UL indexes are introduced for distinction), as shown in Table 15.

TABLE 15

|        | i                                              |                                                |
|--------|------------------------------------------------|------------------------------------------------|
|        | 0                                              | 1                                              |
| (k1, k2) | (1, 0) UL index = 0, (1, 1) UL index = 1     | (1, 1) UL index = 0, (1, 2) UL index = 1     |

Or, Table 16 is a timing relationship table of UL scheduling timing from (subframe n, DL sTTI i) (UL grant) to (subframe m=n+k1, UL sTTI j) (sPUSCH), as shown in Table 16.

TABLE 16

|        | i                                              |                                                |
|--------|------------------------------------------------|------------------------------------------------|
|        | 0                                              | 1                                              |
| (k1, j) | (1, 0) UL index = 0, (1, 1) UL index = 1     | (1, 2) UL index = 0, (1, 3) UL index = 1     |

The second manner: a timing reference starting point is subframe n, DL sTTI i. In such case, (n, i) corresponds to a UL sTTI (n, i') in the same subframe at first, and then a timing reference ending point is determined by j=i'+k2. That is, a comparison table, as shown in Table 17, for the DL sTTI i and UL sTTI i' in the same subframe n is determined at first, as shown in Table 17.

TABLE 17

|          | DL sTTI i      |                |                |                |
|----------|----------------|----------------|----------------|----------------|
|          | 0 UL index = 0 | 0 UL index = 1 | 1 UL index = 0 | 1 UL index = 1 |
| UL sTTI i' | 0              | 1              | 2              | 3              |

The timing relationship of the UL scheduling timing from the UL grant (DL sTTI i) to the sPUSCH (UL sTTI i) is j=i'+4. Furthermore, i=0 and 1.

The third manner: the timing reference starting point is subframe n, DL sTTI i. In such case, the timing reference ending point is determined through a function (j)=f(i) or (j)=f(k, i). If it is determined that the adopted function is j=f(i)=2i+UL index+4 or j=f(k, i)=2i+UL index+k, the timing relationship of the UL scheduling timing from the UL grant (DL sTTI i) to the sPUSCH (UL sTTI j) is j=2i+UL index+4. Furthermore, i=0 and 1.

Through the solution of the embodiment, a timing relationship determination method disclosed in the disclosure may be adopted to solve problems about accurate determination of the timing relationship when divided UL and DL sTTIs in an sTTI including relatively few OFDM symbols are not aligned, particularly solve the problem that the UL and DL sTTIs are not aligned by determining the closest DL sTTI meeting minimum timing in case of the fixed timing relationship, solve the problem of different UL and DL sTTI understandings and meet a low-delay communication requirement.

Specific Embodiment 8

FIG. 7 illustrates UL and DL sTTI division when a DL sTTI includes seven OFDM symbols and a UL sTTI includes four OFDM symbols. It is to be noted that, in such case, a UL sTTI 1 also includes a last OFDM symbol of a UL sTTI 0. That is, a middlemost OFDM symbol, i.e., a fourth OFDM symbol, in a slot in case of a normal CP is shared by previous and next UL sTTIs.

For UL scheduling timing UL grant→sPUSCH, a relationship between UL sTTIs that a minimum interval is 3 UL sTTIs is met.

In such case, fixed scheduling timing is adopted. That is, two DL sTTIs are required to schedule four UL sTTIs.

It is noted that a scheduling relationship is shown by solid arrowheads. A process is presented by two dotted arrowheads. A closest DL sTTI meeting the condition that a minimum interval between the UL sTTIs is 3 UL sTTIs, there is made such a hypothesis that the UL grant is located in first two OFDM symbols of the DL sTTI and a minimum interval between an ending position of an ending OFDM symbol of the DL sTTI where the UL grant is located and a starting position of a scheduled UL sTTI is 3 UL sTTIs. The scheduling relationship (including the process) may be embodied in a form of the following first or second or third manner.

When DL sTTI=7 and UL sTTI=4, the timing relationship, determined according to the principle (A), between the DL sTTI where the UL grant is located and the sPUSCH is shown in FIG. 7. Four groups of timing relationships that the DL sTTI #0 in the subframe n where the UL grant is located schedules the sPUSCH of the UL sTTIs #1 and 2 in the subframe n+1 and the DL sTTI #1 in the subframe n schedules the sPUSCH of the UL sTTIs #3 in the subframe n+1 and the UL sTTI #2 in the subframe n+2 meet the minimum interval k=0 UL sTTIs between the UL grant and the sPUSCH. Correspondingly, when DL sTTI=UL sTTI=4, the timing relationship meets the interval k=3 UL sTTIs, that is, the timing relationship meets sTTI j=i+4, where i is a timing starting point sTTI sequence number and j is a timing ending point sTTI sequence number.

A first manner: Table 18 is a timing relationship table for UL scheduling timing from (subframe n, DL sTTI i) (UL grant) to (subframe m=n+k1, UL sTTI j=i+k2) (sPUSCH) (it is noted that a DL sTTI is required to schedule two UL sTTIs, so that UL indexes are introduced for distinction), as shown in Table 18.

TABLE 18

|        | i                                              |                                                |
|--------|------------------------------------------------|------------------------------------------------|
|        | 0                                              | 1                                              |
| (k1, k2) | (1, 1) UL index = 0, (1, 2) UL index = 1     | (1, 2) UL index = 0, (2, −1) UL index = 1    |

Or, Table 19 is a timing relationship table of UL scheduling timing from (subframe n, DL sTTI i) (UL grant) to (subframe m=n+k1, UL sTTI j) (sPUSCH), as shown in Table 19.

TABLE 19

|        | i                                              |                                                |
|--------|------------------------------------------------|------------------------------------------------|
|        | 0                                              | 1                                              |
| (k1, j) | (1, 1) UL index = 0, (1, 2) UL index = 1     | (1, 3) UL index = 0, (2, 0) UL index = 1     |

A second manner: a timing reference starting point is subframe n, DL sTTI i. In such case, (n, i) corresponds to a UL sTTI (n, i') in the same subframe at first, and then a timing reference ending point is determined by j=i'+k2. That is, a comparison table, as shown in Table 20, for the DL sTTI i and UL sTTI i' in the same subframe n is determined at first, as shown in Table 20.

TABLE 20

| | DL sTTI i | | | |
|---|---|---|---|---|
| | 0 UL index = 0 | 0 UL index = 1 | 1 UL index = 0 | 1 UL index = 1 |
| UL sTTI i' | 1 | 2 | 3 | 0 (subframe n + 1) |

The timing relationship of the UL scheduling timing from the UL grant (DL sTTI i) to the sPUSCH (UL sTTI i) is j=i'+4. Furthermore, i=0 and 1.

A third manner: the timing reference starting point is subframe n, DL sTTI i. In such case, the timing reference ending point is determined through a function (j)=f(i) or (j)=f(k, i). If it is determined that the adopted function is j=f(i)=(2i+UL index+1)mod 4+4 or j=f(k, i)=(2i+UL index+1)mod 4+k, the timing relationship of the UL scheduling timing from the UL grant (DL sTTI i) to the sPUSCH (UL sTTI j) is j=(2i+UL index+1)mod 4+4. Furthermore, i=0 and 1.

Through the solution of the embodiment, a timing relationship determination method disclosed in the disclosure may be adopted to solve problems about accurate determination of the timing relationship when divided UL and DL sTTIs in an sTTI including relatively few OFDM symbols are not aligned, particularly solve the problem that the UL and DL sTTIs are not aligned by determining the closest DL sTTI meeting minimum timing in case of the fixed timing relationship, solve the problem of different UL and DL sTTI understandings and meet a low-delay communication requirement.

Specific Embodiment 9

FIG. 8 illustrates UL and DL sTTI division when a DL sTTI includes seven OFDM symbols and a UL sTTI includes two OFDM symbols. It is to be noted that, in such case, the UL sTTIs are not overlapped.

For UL scheduling timing UL grant→sPUSCH, a relationship between UL sTTIs that a minimum interval is 3 UL sTTIs is met.

In such case, fixed scheduling timing is adopted. That is, two DL sTTIs are required to schedule seven UL sTTIs.

It is noted that a scheduling relationship is shown by solid arrowheads. A process is presented by two dotted arrowheads. There is made such a hypothesis that the UL grant is located in first two OFDM symbols of the DL sTTI and that a minimum interval between an ending position of the UL grant and a starting position of a scheduled UL sTTI is 3 UL sTTIs is met. The scheduling relationship (including the process) may be embodied in a form of the following first or second or third manner.

That is, when DL sTTI=7 and UL sTTI=2, the timing relationship determined between the UL grant and the sPUSCH is shown in FIG. 8. The UL grant is located in the first two OFDM symbols of the sTTI and seven groups of timing relationships that the DL sTTI #0 in the subframe n where the UL grant is located schedules sPUSCH of UL sTTIs #5 and 6 in the subframe n and the UL sTTIs #0 and 1 in the subframe n+1 and the DL sTTI #1 in the subframe n where the UL grant is located schedules the sPUSCH of the UL sTTIs #2, 3 and 4 in the subframe n+1 meet the minimum interval k=3 UL sTTIs between the DL sTTI where the UL grant is located and the sPUSCH. Correspondingly, when DL sTTI=UL sTTI=2, the timing relationship meets the interval k=3 UL sTTIs, that is, the timing relationship meets sTTI j=i+4, where i is a timing starting point sTTI sequence number and j is a timing ending point sTTI sequence number.

A first manner: Table 21 is a timing relationship table for UL scheduling timing from (subframe n, DL sTTI i) (UL grant) to (subframe m=n+k1, UL sTTI j=i+k2) (sPUSCH) (it is noted that a DL sTTI is required to schedule two UL sTTIs, so that UL indexes are introduced for distinction), as shown in Table 21.

TABLE 21

| | i | |
|---|---|---|
| | 0 | 1 |
| (k1, k2) | (0, 5) UL index = 0, | (1, 1) UL index = 0, |
| | (0, 6) UL index = 1, | (1, 2) UL index = 1, |
| | (1, 0) UL index = 2, | (1, 3) UL index = 2, |
| | (1, 1) UL index = 3, | |

Or, Table 22 is a timing relationship table of UL scheduling timing from (subframe n, DL sTTI i) (UL grant) to (subframe m=n+k1, UL sTTI j) (sPUSCH), as shown in Table 22.

TABLE 22

| | i | |
|---|---|---|
| | 0 | 1 |
| (k1, j) | (0, 5) UL index = 0, | (1, 2) UL index = 0, |
| | (0, 6) UL index = 1, | (1, 3) UL index = 1, |
| | (1, 0) UL index = 2, | (1, 4) UL index = 2, |
| | (1, 1) UL index = 3, | |

A second manner: a timing reference starting point is subframe n, DL sTTI i. In such case, (n, i) corresponds to a UL sTTI (n, i') in the same subframe at first, and then a timing reference ending point is determined by j=i'+k2. That is, a comparison table, as shown in Table 23, for the DL sTTI i and UL sTTI i' in the same subframe n is determined at first.

TABLE 23

| | DL sTTI i | | | | | | |
|---|---|---|---|---|---|---|---|
| | 0 UL index = 0 | 0 UL index = 1 | 0 UL index = 2 | 0 UL index = 3 | 1 UL index = 0 | 1 UL index = 0 | 1 UL index = 1 |
| UL sTTI i' | 1 | 2 | 3 | 4 | 5 | 6 | 0 (subframe n + 1) |

The timing relationship of the UL scheduling timing from the UL grant (DL sTTI i) to the sPUSCH (UL sTTI i) is j=i'+4. Furthermore, i=0 and 1.

A third manner: the timing reference starting point is subframe n, DL sTTI i. In such case, the timing reference ending point is determined through a function (j)=f(i) or (j)=f(k, i). If it is determined that the adopted function is j=f(i)=(4i+UL index+5)mod 7+4 or j=f(k, i)=(4i+UL index+5)mod 7+k, the timing relationship of the UL scheduling timing from the UL grant (DL sTTI i) to the sPUSCH (UL sTTI j) is j=(4i+UL index+5)mod 7+4. Furthermore, i=0 and 1.

Through the solution of the embodiment, a timing relationship determination method disclosed in the disclosure may be adopted to solve problems about accurate determination of the timing relationship when divided UL and DL sTTIs in an sTTI including relatively few OFDM symbols are not aligned, particularly solve the problem that the UL and DL sTTIs are not aligned by determining the closest DL sTTI meeting minimum timing in case of the fixed timing relationship, solve the problem of different UL and DL sTTI understandings and meet a low-delay communication requirement.

Specific Embodiment 10

FIG. 8 illustrates UL and DL sTTI division when a DL sTTI includes seven OFDM symbols and a UL sTTI includes two OFDM symbols. It is to be noted that, in such case, the UL sTTIs are not overlapped.

For UL scheduling timing UL grant→sPUSCH, a relationship between UL sTTIs that a minimum interval is 3 UL sTTIs is met.

In such case, fixed scheduling timing is adopted. That is, two DL sTTIs are required to schedule seven UL sTTIs.

It is noted that a scheduling relationship is shown by solid arrowheads. A process is presented by two dotted arrowheads. There is made such a hypothesis that the UL grant is located in first two OFDM symbols of the DL sTTI and that a minimum interval between an ending position of a DL sTTI where the UL grant is located and a starting position of a scheduled UL sTTI is 3 UL sTTIs is met. The scheduling relationship (including the process) may be embodied in a form of the following first or second or third manner.

That is, when DL sTTI=7 and UL sTTI=2, the timing relationship determined between the DL sTTI where the UL grant is located and the sPUSCH is shown in FIG. 9. Seven groups of timing relationships that the DL sTTI #0 in the subframe n where the UL grant is located schedules the sPUSCH of the UL sTTIs #0, 1, 2 and 3 in the subframe n+1 and the DL sTTI #1 in the subframe n where the UL grant is located schedules the sPUSCH of the UL sTTIs #4, 5 and 6 in the subframe n+1 meet the minimum interval k=0 UL sTTIs. between the DL sTTI where the UL grant is located and the sPUSCH Correspondingly, when DL sTTI=UL sTTI=2, the timing relationship meets the interval k=3 UL sTTIs, that is, the timing relationship meets sTTI j=i+4, where i is a timing starting point sTTI sequence number and j is a timing ending point sTTI sequence number.

A first manner: Table 24 is a timing relationship table for UL scheduling timing from (subframe n, DL sTTI i) (UL grant) to (subframe m=n+k1, UL sTTI j=i+k2) (sPUSCH) (it is noted that a DL sTTI is required to schedule two UL sTTIs, so that UL indexes are introduced for distinction), as shown in Table 24.

TABLE 24

| | i | |
|---|---|---|
| | 0 | 1 |
| (k1, k2) | (1, 0) UL index = 0, | (1, 3) UL index = 0, |
| | (1, 1) UL index = 1, | (1, 4) UL index = 1, |
| | (1, 2) UL index = 2, | (1, 5) UL index = 2, |
| | (1, 3) UL index = 3, | |

Or, Table 25 is a timing relationship table of UL scheduling timing from (subframe n, DL sTTI i) (UL grant) to (subframe m=n+k1, UL sTTI j) (sPUSCH), as shown in Table 25.

TABLE 25

| | i | |
|---|---|---|
| | 0 | 1 |
| (k1, j) | (1, 0) UL index = 0, | (1, 4) UL index = 0, |
| | (1, 1) UL index = 1, | (1, 5) UL index = 1, |
| | (1, 2) UL index = 2, | (1, 6) UL index = 2, |
| | (1, 3) UL index = 3, | |

A second manner: a timing reference starting point is subframe n, DL sTTI i. In such case, (n, i) corresponds to a UL sTTI (n, i') in the same subframe at first, and then a timing reference ending point is determined by j=i'+k2. That is, a comparison table, as shown in Table 26, for the DL sTTI i and UL sTTI i' in the same subframe n is determined at first.

TABLE 26

| | DL sTTI i | | | | | | |
|---|---|---|---|---|---|---|---|
| | 0 UL index = 0 | 0 UL index = 1 | 0 UL index = 2 | 0 UL index = 3 | 1 UL index = 0 | 1 UL index = 0 | 1 UL index = 1 |
| UL sTTI i' | 3 | 4 | 5 | 6 | 0 (subframe n + 1) | 1 (subframe n + 1) | 2 (subframe n + 1) |

The timing relationship of the UL scheduling timing from the UL grant (DL sTTI i) to the sPUSCH (UL sTTI i) is j=i'+4. Furthermore, i=0 and 1.

A third manner: the timing reference starting point is subframe n, DL sTTI i. In such case, the timing reference ending point is determined through a function (j)=f(i) or (j)=f(k, i). If it is determined that the adopted function is j=f(i)=(4i+UL index)mod 7+4 or j=f(k, i)=(4i+UL index) mod 7+k, the timing relationship of the UL scheduling timing from the UL grant (DL sTTI i) to the sPUSCH (UL sTTI j) is j=(4i+UL index)mod 7+4. Furthermore, i=0 and 1.

Through the solution of the embodiment, a timing relationship determination method disclosed in the disclosure may be adopted to solve problems about accurate determination of the timing relationship when divided UL and DL sTTIs in an sTTI including relatively few OFDM symbols are not aligned, particularly solve the problem that the UL and DL sTTIs are not aligned by determining the closest DL sTTI meeting minimum timing in case of the fixed timing relationship, solve the problem of different UL and DL sTTI understandings and meet a low-delay communication requirement.

Specific Embodiment 11

FIG. 10 illustrates UL and DL sTTI division when a DL sTTI includes two OFDM symbols, a UL sTTI includes two OFDM symbols and they may be overlapped.

In such case, fixed scheduling timing is adopted. That is, seven DL sTTIs are required to schedule eighth UL sTTIs.

It is noted that a scheduling relationship is shown by solid arrowheads. A process is presented by two dotted arrowheads. That a minimum interval between the UL sTTIs scheduled by the DL sTTIs is 3 sTTIs. Since a UL RS is shared, in such case, there are at least five OFDM symbols between the UL grant and the sPUSCH. The scheduling relationship (including the process) may be embodied in a form of the following first or second or third manner.

That is, when DL sTTI=2, UL sTTI=2 and part of OFDM symbols of the UL sTTIs are overlapped, the timing relationship determined when the minimum interval is k UL sTTIs is shown in FIG. 10. Eight groups of timing relationships that DL sTTIs #3, 4, 5 and 6 in the subframe where the UL grant is located schedule the sPUSCH of the UL sTTIs #0, 1, 2 and 3 in the subframe n+1 respectively, the DL sTTI #0 in the subframe n+1 where the UL grant is located schedules the sPUSCH in the UL sTTI #4 in the subframe n+1, the DL sTTI #1 in the subframe n+1 where the UL grant is located schedules the sPUSCH in the UL sTTIs #5 and 6 in the subframe n+1 and the DL sTTI #2 in the subframe n+1 where the UL grant is located schedules the sPUSCH in the UL sTTI #7 in the subframe n+1 meet the minimum interval k=3 UL sTTIs between the UL grant and the sPUSCH. Correspondingly, when DL sTTI=UL sTTI=2 and there is no overlapping, the timing relationship meets the interval k=3 UL sTTIs, that is, the timing relationship meets sTTI j=i+4, where i is a timing starting point sTTI sequence number and j is a timing ending point sTTI sequence number.

A first manner: Table 27 is a timing relationship table between UL scheduling timing (subframe n, DL sTTI i) (UL grant) and (subframe m=n+k1, UL sTTI j=i+k2) (sPUSCH), as shown in Table 27.

TABLE 27

| i | 0 | 1 | 2 | 3 | 4 | 5 | 6 |
|---|---|---|---|---|---|---|---|
| (k1, k2) | (0, 4) | (0, 4) UL index = 0, (1, 5) UL index = 1, | (0, 5) | (1, −3) | (1, −3) | (1, −3) | (1, −3) |

Or, Table 28 is a timing relationship table of UL scheduling timing from (subframe n, DL sTTI i) (UL grant) to (subframe m=n+k1, UL sTTI j) (sPUSCH), as shown in Table 28.

TABLE 28

| i | 0 | 1 | 2 | 3 | 4 | 5 | 6 |
|---|---|---|---|---|---|---|---|
| (k1, j) | (0, 4) | (0, 5) UL index = 0, (1, 6) UL index = 1, | (0, 7) | (1, 0) | (1, 1) | (1, 2) | (1, 3) |

A second manner: a timing reference starting point is subframe n, DL sTTI i. In such case, (n, i) corresponds to a UL sTTI (n, i') in the same subframe at first, and then a timing reference ending point is determined by j=i'+k2. That is, a comparison table, as shown in Table 29, for the DL sTTI i and UL sTTI i' in the same subframe n is determined at first.

TABLE 29

| DL sTTI i | 0 | 1 | 2 | 3 | 4 | 5 | 6 |
|---|---|---|---|---|---|---|---|
| UL sTTI i' | 0 | 1 (UL index = 0) 2 (UL index = 1) | 3 | 4 | 5 | 6 | 7 |

The timing relationship of the UL scheduling timing from the UL grant (DL sTTI i) to the sPUSCH (UL sTTI i) is j=i'+4. Furthermore, i=0, 1, 2, 3, 4, 5 and 6.

A third manner: the timing reference starting point is subframe n, DL sTTI i. In such case, the timing reference ending point is determined through a function (j)=f(i) or (j)=f(k, i). If it is determined that the adopted function is $$j = f(i) = \begin{cases} i, & i = 0 \\ i + UL \text{ index}, & i = 1 \\ i + 1, & i = 2, 3, 4, 5, 6 \end{cases} + 4 \text{ or}$$

$$j = f(k, i) = \begin{cases} i, & i = 0 \\ i + UL \text{ index}, & i = 1 \\ i + 1, & i = 2, 3, 4, 5, 6 \end{cases} + k,$$

the timing relationship of the UL scheduling timing from the UL grant (DL sTTI i) to the sPUSCH (UL sTTI j) is $$j = \begin{cases} i, & i = 0 \\ i + UL \text{ index}, & i = 1 \\ i + 1, & i = 2, 3, 4, 5, 6 \end{cases} + 4.$$

Furthermore, i=0, 1, 2, 3, 4, 5 and 6.

Through the solution of the embodiment, a timing relationship determination method disclosed in the disclosure may be adopted to solve problems about accurate determination of the timing relationship when UL and DL sTTIs in an sTTI including relatively few OFDM symbols are equal but the divided sTTIs are not aligned when being overlapped, particularly solve the problem that the UL and DL sTTIs are not aligned by determining that minimum timing is met and the minimum interval is k UL sTTIs in case of the fixed timing relationship, solve the problem of different UL and DL sTTI understandings and meet a low-delay communication requirement is met.

Specific Embodiment 12

FIG. 11 illustrates UL and DL sTTI division when a DL sTTI includes two OFDM symbols, a UL sTTI includes two OFDM symbols and they may be overlapped.

In such case, fixed scheduling timing is adopted. That is, seven DL sTTIs are required to schedule eighth UL sTTIs.

It is noted that a scheduling relationship is shown by solid arrowheads. A process is presented by two dotted arrowheads. That a minimum interval between the UL sTTIs scheduled by the DL sTTIs is 2*k OFDM symbols is met, namely the interval is k non-overlapped UL sTTIs. That is, there are at least six OFDM symbols between the UL grant and the sPUSCH in such case. The scheduling relationship (including the process) may be embodied in a form of the following first or second or third manner.

That is, when DL sTTI=2, UL sTTI=2 and there is overlapping, the timing relationship determined when the minimum interval is 2k OFDM symbols is shown in FIG. 11. Eight groups of timing relationships that the DL sTTI #3 in the subframe n where the UL grant is located schedules the sPUSCH in the UL sTTI #0 in the subframe n+1, the DL sTTI #4 in the subframe #n where the UL grant is located schedules the sPUSCH in the UL sTTI #1 and 2 in the subframe n+1, the DL sTTIs #5 and 6 in the subframe n where the UL grant is located and the DL sTTIs #0, 1 and 2 in the subframe n+1 schedule the sPUSCH in the UL sTTIs #3, 4, 5, 6 and 7 in the subframe n+1 respectively meet the minimum interval 2k=2*3=6 OFDM symbols between the UL grant and the sPUSCH. Correspondingly, when DL sTTI=UL sTTI=2 and there is no overlapping, the timing relationship meets the interval k=3 UL sTTIs or 2k=6 OFDM symbols, that is, the timing relationship meets sTTI j=i+4, where i is a timing starting point sTTI sequence number and j is a timing ending point sTTI sequence number.

A first manner: Table 30 is a timing relationship table between UL scheduling timing (subframe n, DL sTTI i) (UL grant) and (subframe m=n+k1, UL sTTI j=i+k2) (sPUSCH), as shown in Table 30.

TABLE 30

| i | 0 | 1 | 2 | 3 | 4 | 5 | 6 |
|---|---|---|---|---|---|---|---|
| (k1, k2) | (0, 5) | (0, 5) | (0, 5) | (1, −3) | (1, −3) UL index = 0, (1, −2) UL index = 1, | (1, −2) | (1, −2) |

Or, Table 31 is a timing relationship table of UL scheduling timing from (subframe n, DL sTTI i) (UL grant) to (subframe m=n+k1, UL sTTI j) (sPUSCH), as shown in Table 31.

TABLE 31

| i | 0 | 1 | 2 | 3 | 4 | 5 | 6 |
|---|---|---|---|---|---|---|---|
| (k1, j) | (0, 5) | (0, 6) | (0, 7) | (1, 0) | (1, 1) UL index = 0, (1, 2) UL index = 1, | (1, 3) | (1, 4) |

A second manner: a timing reference starting point is subframe n, DL sTTI i. In such case, (n, i) corresponds to a UL sTTI (n, i') in the same subframe at first, and then a timing reference ending point is determined by j=i'+k2. That is, a comparison table, as shown in Table 32, for the DL sTTI i and UL sTTI i' in the same subframe n is determined at first, as shown in Table 32.

TABLE 32

| DL sTTI i | 0 | 1 | 2 | 3 | 4 | 5 | 6 |
|---|---|---|---|---|---|---|---|
| UL sTTI i' | 1 | 2 | 3 | 4 | 5 (UL index = 0) 6 (UL index = 1) | 7 | 0 in subframe n + 1 |

The timing relationship of the UL scheduling timing from the UL grant (DL sTTI i) to the sPUSCH (UL sTTI i) is j=i'+4. Furthermore, i=0, 1, 2, 3, 4, 5 and 6.

A third manner: the timing reference starting point is subframe n, DL sTTI i. In such case, the timing reference ending point is determined through a function (j)=f(i) or (j)=f(k, i). If it is determined that the adopted function is $$j = f(i) = \begin{cases} i+1, i = 0, 1, 2, 3 \\ i+1 + UL\ index, i = 4 \ +4\ or \\ (i+2)\bmod 8, i = 5, 6 \end{cases}$$

$$j = f(k, i) = \begin{cases} i+1, i = 0, 1, 2, 3 \\ i+1 + UL\ index, i = 4 \ +k, \\ (i+2)\bmod 8, i = 5, 6 \end{cases}$$

the timing relationship of the UL scheduling timing from the UL grant (DL sTTI i) to the sPUSCH (UL sTTI $$j)\ is\ j = \begin{cases} i+1, i = 0, 1, 2, 3 \\ i+1 + UL\ index, i = 4 \ +4. \\ (i+2)\bmod 8, i = 5, 6 \end{cases}$$

Furthermore, i=0, 1, 2, 3, 4, 5 and 6.

Through the solution of the embodiment, a timing relationship determination method disclosed in the disclosure may be adopted to solve problems about accurate determination of the timing relationship when UL and DL sTTIs in an sTTI including relatively few OFDM symbols are equal but the divided sTTIs are not aligned when being overlapped, particularly solve the problem that the UL and DL sTTIs are not aligned by determining that minimum timing is met and the minimum interval is k UL sTTIs in case of the fixed timing relationship, solve the problem of different UL and DL sTTI understandings and meet a low-delay communication requirement is met.

Specific Embodiment 13

FIG. 14 illustrates UL and DL sTTI division when a DL sTTI includes two OFDM symbols and a UL sTTI includes four OFDM symbols. It is to be noted that, in such case, a UL sTTI 1 also includes a last OFDM symbol of a UL sTTI 0. That is, a middlemost OFDM symbol, i.e., a fourth OFDM symbol, in a slot in case of a normal CP is shared by previous and next UL sTTIs.

For DL data feedback timing sPDSCH→ACK/NACK (sPUCCH), a relationship between the sPDSCH and the sPUCCH that a minimum interval is 3 DL sTTIs is met.

In such case, fixed scheduling timing is adopted. That is, a UL sTTI is required to be determined for feedback of an ACK/NACK for seven DL sTTIs.

It is noted that a feedback relationship is shown by solid arrowheads. A process is presented by two dotted arrowheads: a DL sTTI 0 corresponds to a DL sTTI 4 at an interval of three DL sTTIs, and a corresponding UL sTTI is selected to transmit the sPUCCH (a principle is a closest UL sTTI meeting the condition that the minimum interval between the DL sTTIs is 3 DL sTTIs). The scheduling relationship (including the process) may be embodied in a form of the following first or second or third or fourth manner.

That is, when DL sTTI=2 (OFDM symbols) and UL sTTI=4 (OFDM symbols), the timing relationship is shown in FIG. 12. Seven groups of timing relationships that the DL sTTIs #0 and 1 in the subframe n where the sPDSCH is located correspond to the UL sTTI #3 in the subframe n where the fed back ACK/NACK (sPUCCH) is located, the DL sTTIs #2 and 3 in the subframe n where the sPDSCH is located correspond to the UL sTTI #0 in the subframe n+1 where the fed back ACK/NACK (sPUCCH) is located, the DL sTTIs #4 and 5 in the subframe n where the sPDSCH is located correspond to the UL sTTI #1 in the subframe n+1 where the fed back ACK/NACK (sPUCCH) is located and the DL sTTI #6 in the subframe n where the sPDSCH is located corresponds to the UL sTTI #2 in the subframe n+1 where the fed back ACK/NACK (sPUCCH) is located meet the minimum interval k=3 DL sTTIs. Correspondingly, when DL sTTI=UL sTTI=2, the timing relationship meets the interval k=3 DL sTTIs, that is, the timing relationship meets sTTI j=i+4, where i is a timing starting point sTTI sequence number and j is a timing ending point sTTI sequence number.

A first manner: Table 33 is a timing relationship table for DL data feedback timing (subframe n, DL sTTI i) (sPDSCH) and (subframe n+k, UL sTTI i+j) (sPUCCH), as shown in Table 33.

TABLE 33

| i | 0 | 1 | 2 | 3 | 4 | 5 | 6 |
|---|---|---|---|---|---|---|---|
| (k1, k2) | (0, 3) | (0, 2) | (1, −2) | (1, −3) | (1, −3) | (1, −4) | (1, −4) |

Or, Table 34 is a timing relationship table for DL data feedback timing (subframe n, DL sTTI i) (sPDSCH) and (subframe n+k1, UL sTTI j) (sPUCCH), as shown in Table 34.

TABLE 34

| i | 0 | 1 | 2 | 3 | 4 | 5 | 6 |
|---|---|---|---|---|---|---|---|
| (k1, j) | (0, 3) | (0, 3) | (1, 0) | (1, 0) | (1, 1) | (1, 1) | (1, 2) |

A second manner: a timing reference starting point is subframe n, DL sTTI i. In such case, (n, i) corresponds to a UL sTTI (n, i') in the same subframe at first, and then a timing reference ending point is determined by j=i'+k2. That is, a comparison table, as shown in Table 35, for the DL sTTI i and UL sTTI i' in the same subframe n is determined at first.

TABLE 35

| DL sTTI i | 0 | 1 | 2 | 3 | 4 | 5 | 6 |
|---|---|---|---|---|---|---|---|
| UL sTTI i' | 0 | 0 | 1 | 1 | 2 | 2 | 3 |

The timing relationship of the DL data feedback timing from the sPDSCH (DL sTTI i) to the sPUCCH (UL sTTI j) is j=i'+3. Furthermore, i=0, 1, 2, 3, 4, 5 and 6.

A third solution: the DL sTTI is calculated at first according to the minimum timing interval n+4, and the DL sTTI i'=i+4 is calculated at first according to the timing relationship of the DL data feedback timing from the sPDSCH (DL sTTI i) to the sPUCCH (UL sTTI j) and with reference to the DL sTTI; and a comparison table, as shown in Table 4, for the DL sTTI i' and the UL sTTI j is determined.

j in the DL data feedback timing from the sPDSCH (DL sTTI i) to the sPUCCH (UL sTTI j) is obtained by table lookup. Furthermore, i=0, 1, 2, 3, 4, 5 and 6.

The fourth manner: the timing reference starting point is subframe n, DL sTTI i. In such case, the timing reference ending point is determined through a function (j)=f(i) or (j)=f(k, i). If it is determined that the adopted function is $j=f(i)=\lfloor i/2 \rfloor+4$ or $j=f(k, i)=\lfloor i/2 \rfloor+k$, the timing relationship of the DL data feedback timing from the sPDSCH (DL sTTI i) to the sPUCCH (UL sTTI j) is $j=\lfloor i/2 \rfloor+_4$. Furthermore, i=0, 1, 2, 4, 4, 5 and 6.

Through the solution of the embodiment, a timing relationship determination method disclosed in the disclosure may be adopted to solve problems about accurate determination of the timing relationship when divided UL and DL sTTIs in an sTTI including relatively few OFDM symbols are not aligned, particularly solve the problem that the UL and DL sTTIs are not aligned by determining the closest UL sTTI meeting minimum timing in case of the fixed timing relationship, solve the problem of different UL and DL sTTI understandings and meet a low-delay communication requirement.

Specific Embodiment 14

FIG. 15 illustrates UL and DL sTTI division when a DL sTTI includes two OFDM symbols and a UL sTTI includes four OFDM symbols. It is to be noted that, in such case, a UL sTTI 1 also includes a last OFDM symbol of a UL sTTI 0. That is, a middlemost OFDM symbol, i.e., a fourth OFDM symbol, in a slot in case of a normal CP is shared by previous and next UL sTTIs.

For DL data feedback timing sPDSCH→ACK/NACK (sPUCCH), a relationship between the sPDSCH and the sPUCCH that a minimum interval is 5 DL sTTIs is met.

In such case, fixed scheduling timing is adopted. That is, a UL sTTI is required to be determined for feedback of an ACK/NACK for seven DL sTTIs.

It is noted that a feedback relationship is shown by solid arrowheads. A process is presented by two dotted arrowheads: a DL sTTI 0 corresponds to a DL sTTI 4 at an interval of three DL sTTIs, and a corresponding UL sTTI is selected to transmit the sPUCCH (a principle is a closest UL sTTI meeting the condition that the minimum interval between the DL sTTIs is 5 DL sTTIs). The scheduling relationship (including the process) may be embodied in a form of the following first or second or third or fourth manner.

That is, when DL sTTI=2 (OFDM symbols) and UL sTTI=4 (OFDM symbols), the timing relationship is shown in FIG. 15. Seven groups of timing relationships that the DL sTTIs #0 and 1 in the subframe n where the sPDSCH is located correspond to the UL sTTI #3 in the subframe n+1 where the fed back ACK/NACK (sPUCCH) is located, the DL sTTI #2 in the subframe n where the sPDSCH is located corresponds to the UL sTTI #1 in the subframe n+1 where the fed back ACK/NACK (sPUCCH) is located, the DL sTTIs #3 and 4 in the subframe n where the sPDSCH is located correspond to the UL sTTI #2 in the subframe n+1 where the fed back ACK/NACK (sPUCCH) is located and the DL sTTIs #5 and 6 in the subframe n where the sPDSCH is located correspond to the UL sTTI #3 in the subframe n+1 where the fed back ACK/NACK (sPUCCH) is located meet the minimum interval k=5 DL sTTIs. Correspondingly, when DL sTTI=UL sTTI=2, the timing relationship meets the interval k=5 DL sTTIs, that is, the timing relationship meets sTTI j=i+6, where i is a timing starting point sTTI sequence number and j is a timing ending point sTTI sequence number.

A first manner: Table 36 is a timing relationship table for DL data feedback timing (subframe n, DL sTTI i) (sPDSCH) and (subframe n+k, UL sTTI i+j) (sPUCCH), as shown in Table 36.

TABLE 36

| i | 0 | 1 | 2 | 3 | 4 | 5 | 6 |
|---|---|---|---|---|---|---|---|
| (k1, k2) | (1, 0) | (1, -1) | (1, -1) | (1, -1) | (1, -2) | (1, -2) | (1, -3) |

Or, Table 37 is a timing relationship table for DL data feedback timing (subframe n, DL sTTI i) (sPDSCH) and (subframe n+k1, UL sTTI j) (sPUCCH), as shown in Table 38.

TABLE 37

| i | 0 | 1 | 2 | 3 | 4 | 5 | 6 |
|---|---|---|---|---|---|---|---|
| (k1, j) | (1, 0) | (1, 0) | (1, 1) | (1, 2) | (1, 2) | (1, 3) | (1, 3) |

A second manner: a timing reference starting point is subframe n, DL sTTI i. In such case, (n, i) corresponds to a UL sTTI (n, i') in the same subframe at first, and then a timing reference ending point is determined by j=i'+k2. That is, a comparison table, as shown in Table 38, for the DL sTTI i and UL sTTI i' in the same subframe n is determined at first.

TABLE 38

| DL sTTI i | 0 | 1 | 2 | 3 | 4 | 5 | 6 |
|---|---|---|---|---|---|---|---|
| UL sTTI i' | 0 | 0 | 1 | 2 | 2 | 3 | 3 |

The timing relationship of the DL data feedback timing from the sPDSCH (DL sTTI i) to the sPUCCH (UL sTTI j) is j=i'+4. Furthermore, i=0, 1, 2, 3, 4, 5 and 6.

A third solution: the DL sTTI is calculated at first according to the minimum timing interval n+4, and the DL sTTI i'=i+4 is calculated at first according to the timing relationship of the DL data feedback timing from the sPDSCH (DL sTTI i) to the sPUCCH (UL sTTI j) and with reference to the DL sTTI; and a comparison table, as shown in Table 39, for the DL sTTI i' and the UL sTTI j is determined.

TABLE 39

| DL sTTI i' | 0 | 1 | 2 | 3 | 4 | 5 | 6 |
|---|---|---|---|---|---|---|---|
| UL sTTI j | 0 | 1 | 2 | 2 | 3 | 3 | 0 in subframe n + 1 | j in the DL data feedback timing from the sPDSCH (DL sTTI i) to the sPUCCH (UL sTTI j) is obtained by table lookup. Furthermore, i=0, 1, 2, 3, 4, 5 and 6.

A fourth manner: the timing reference starting point is subframe n, DL sTTI i. In such case, the timing reference ending point is determined through a function (j)=f(i) or (j)=f(k, i). If it is determined that the adopted function is $$j = f(i) = \begin{cases} \lfloor i/2 \rfloor, i = 0, 1, 2 \\ \lceil 1/2 \rceil, i = 3, 4, 5, 6 \end{cases} + 4 \text{ or}$$

$$j = f(k, i) = \begin{cases} \lfloor i/2 \rfloor, i = 0, 1, 2 \\ \lceil 1/2 \rceil, i = 3, 4, 5, 6 \end{cases} + k,$$

the timing relationship of the DL data feedback timing from the sPDSCH (DL sTTI i) to the sPUCCH (UL sTTI j) is $$j = \begin{cases} \lfloor i/2 \rfloor, i = 0, 1, 2 \\ \lceil 1/2 \rceil, i = 3, 4, 5, 6 \end{cases} + 4.$$

Furthermore, i=0, 1, 2, 4, 4, 5 and 6.

Through the solution of the embodiment, a timing relationship determination method disclosed in the disclosure may be adopted to solve problems about accurate determination of the timing relationship when divided UL and DL sTTIs in an sTTI including relatively few OFDM symbols are not aligned, particularly solve the problem that the UL and DL sTTIs are not aligned by determining the closest UL sTTI meeting minimum timing in case of the fixed timing relationship, solve the problem of different UL and DL sTTI understandings and meet a low-delay communication requirement.

Specific Embodiment 15

FIG. 16 illustrates UL and DL sTTI division when a DL sTTI includes two OFDM symbols and a UL sTTI includes four OFDM symbols. It is to be noted that, in such case, a UL sTTI 1 also includes a last OFDM symbol of a UL sTTI 0. That is, a middlemost OFDM symbol, i.e., a fourth OFDM symbol, in a slot in case of a normal CP is shared by previous and next UL sTTIs. It is to be noted that a legacy PDCCH region is not included during DL sTTI division.

For DL data feedback timing sPDSCH→ACK/NACK (sPUCCH), a relationship between the sPDSCH and the sPUCCH that a minimum interval is 3 DL sTTIs is met.

In such case, fixed scheduling timing is adopted. That is, a UL sTTI is required to be determined for feedback of an ACK/NACK for sixth DL sTTIs.

In such case, the DL sTTIs are 0-5. The timing relationship DL sTTI i+k is analyzed and there are two conditions: a legacy PDCCH is not crossed and the legacy PDCCH is crossed. A closest UL sTTI meeting the condition that the minimum interval between the DL sTTIs is 3 DL sTTIs is determined. Then, the legacy PDCCH region is considered in the embodiment. That is, the timing relationship when the legacy PDCCH is not crossed is the DL sTTI i+k and the timing relationship when the legacy PDCCH is crossed is a DL sTTI i+k-1. (k-1 is considered for the timing relationship represented by the black chain dotted line and the right side thereof in FIG. 16). The scheduling relationship (including the process) may be embodied in a form of the following first or second or third or fourth manner.

Specifically, for example, when legacy PDCCH=2 (OFDM symbols), DL sTTI=2 (OFDM symbols) and UL sTTI=4 (OFDM symbols), as shown in FIG. 16, the legacy PDCCH region is excluded during DL sTTI division. In such case, DL sTTIs in a subframe are 0-5. The minimum interval is k DL sTTIs in the principle (a), and in such case, there are two conditions after a DL sTTI i+4: the legacy PDCCH is not crossed and the legacy PDCCH is crossed. In such case, the principle is the closest UL sTTI meeting the condition that the minimum interval between the DL sTTIs is k=3 DL sTTIs. Then, it is necessary to consider the legacy PDCCH region. That is, the timing relationship when the legacy PDCCH is not crossed is the DL sTTI i+4 and the timing relationship when the legacy PDCCH is crossed is a DL sTTI i+4-1. (k-1 is considered for the timing relationship represented by the black chain dotted line and the right side thereof in the figure).

A first manner: Table 40 is a timing relationship table for DL data feedback timing (subframe n, DL sTTI i) (sPDSCH) and (subframe n+k, UL sTTI i+j) (sPUCCH), as shown in Table 40.

TABLE 40

| i | 0 | 1 | 2 | 3 | 4 | 5 |
|---|---|---|---|---|---|---|
| (k1, k2) | (0, 3) | (1, −1) | (1, −2) | (1, −2) | (1, −3) | (1, −3) |

Or, Table 41 is a timing relationship table for DL data feedback timing (subframe n, DL sTTI i) (sPDSCH) and (subframe n+k1, UL sTTI j) (sPUCCH), as shown in Table 41.

TABLE 41

| i | 0 | 1 | 2 | 3 | 4 | 5 |
|---|---|---|---|---|---|---|
| (k1, j) | (0, 3) | (1, 0) | (1, 0) | (1, 1) | (1, 1) | (1, 2) |

A second manner: a timing reference starting point is subframe n, DL sTTI i. In such case, (n, i) corresponds to a UL sTTI (n, i') in the same subframe at first, and then a timing reference ending point is determined by j=i'+k2. That is, a comparison table, as shown in Table 42, for the DL sTTI i and UL sTTI i' in the same subframe n is determined at first.

TABLE 42

| DL sTTI i | 0 | 1 | 2 | 3 | 4 | 5 |
|---|---|---|---|---|---|---|
| UL sTTI i' | 0 | 1 | 1 | 2 | 2 | 3 |

The timing relationship of the DL data feedback timing from the sPDSCH (DL sTTI i) to the sPUCCH (UL sTTI j) is j=i'+3. Furthermore, i=0, 1, 2, 3, 4 and 5.

A third solution: the DL sTTI is calculated at first according to the minimum timing interval n+4, and the DL sTTI i'=i+4 (the legacy PDCCH is not crossed) or i'=i+4−1 (the legacy PDCCH is crossed) is calculated at first according to the timing relationship of the DL data feedback timing from the sPDSCH (DL sTTI i) to the sPUCCH (UL sTTI j) and with reference to the DL sTTI; and a comparison table, as shown in Table 43, for the DL sTTI i' and the UL sTTI j is determined.

TABLE 43

| DL sTTI i' | −1 (PDCCH) | 0 | 1 | 2 | 3 | 4 | 5 |
|---|---|---|---|---|---|---|---|
| UL sTTI j | 0 | 1 | 1 | 2 | — | 3 | 0 in subframe n + 1 | j in the DL data feedback timing from the sPDSCH (DL sTTI i) to the sPUCCH (UL sTTI j) is obtained by table lookup. Furthermore, i=0, 1, 2, 3, 4 and 5.

A fourth manner: the timing reference starting point is subframe n, DL sTTI i. In such case, the timing reference ending point is determined through a function (j)=f(i) or (j)=f(k, i). If it is determined that the adopted function is $$j = f(i) = \begin{cases} \lfloor i/2 \rfloor, i = 0, 1, 2 \\ \lceil i/2 \rceil, i = 3, 4, 5 \end{cases} + 4 \text{ or}$$

$$j = f(k, i) = \begin{cases} \lfloor i/2 \rfloor, i = 0, 1, 2 \\ \lceil i/2 \rceil, i = 3, 4, 5 \end{cases} + k,$$

the timing relationship of the DL data feedback timing from the PDSCH (DL sTTI i) to the sPUCCH (UL sTTI j) is $$j = \begin{cases} \lfloor i/2 \rfloor, i = 0, 1, 2 \\ \lceil i/2 \rceil, i = 3, 4, 5 \end{cases} + 3.$$

Furthermore, i=0, 1, 2, +3, 4 and 5.

Through the solution of the embodiment, a timing relationship determination method disclosed in the disclosure may be adopted to solve problems about accurate determination of the timing relationship when divided UL and DL sTTIs in an sTTI including relatively few OFDM symbols are not aligned, particularly solve the problem that the UL and DL sTTIs are not aligned and the legacy PDCCH region is not included during DL sTTI division by determining the closest UL sTTI meeting minimum timing in case of the fixed timing relationship, solve the problem of different UL and DL sTTI understandings and meet a low-delay communication requirement.

Specific Embodiment 16

Figure 17:
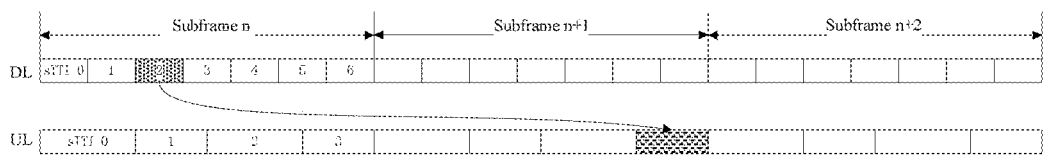
FIG. 17 is a schematic diagram of fixed timing for UL scheduling when DL sTTIs and UL sTTIs are unequal and are not aligned according to an embodiment of the disclosure.

FIG. 17 illustrates UL and DL sTTI division when a DL sTTI includes two OFDM symbols and a UL sTTI includes four OFDM symbols. It is to be noted that, in such case, a UL sTTI 1 also includes a last OFDM symbol of a UL sTTI 0. That is, a middlemost OFDM symbol, i.e., a fourth OFDM symbol, in a slot in case of a normal CP is shared by previous and next UL sTTIs.

When a fixed timing interval is adopted, from a timing reference starting point, the interval fixedly includes k sTTIs. When a UL grant schedules an sPUSCH, the timing reference starting point is determined at first, and a position of a UL sTTI corresponding to a DL sTTI where the UL grant is located is used. When the UL grant is located in a DL sTTI 2 in a subframe n, a required corresponding UL sTTI is determined in, for example, a second manner of determining by a UL sTTI m1 where an ending symbol of a DL sTTI m is located, and in such case, the DL sTTI 2 corresponds to a UL sTTI 1. Second, the UL sTTI where the scheduled sPUSCH is determined through a fixed timing interval. For example, if k=6, the sPUSCH is located in m1+6*sTTI, i.e., a UL sTTI 3 in a subframe n+1.

Through the solution of the embodiment, a timing relationship determination method disclosed in the disclosure may be adopted to solve problems about accurate determination of the timing relationship when divided UL and DL sTTIs in an sTTI including relatively few OFDM symbols are not aligned, particularly solve the problem that the UL and DL sTTIs are not aligned by determining the timing reference starting point in case of the fixed timing relationship, solve the problem of different UL and DL sTTI understandings and meet a low-delay communication requirement.

Specific Embodiment 17

Figure 18:
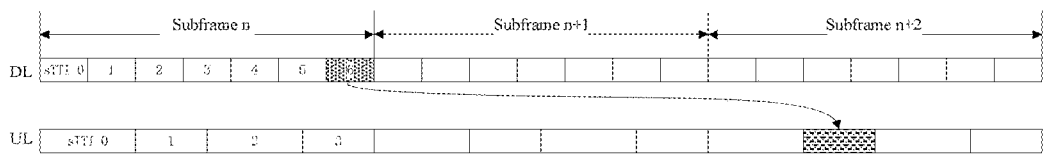
FIG. 18 is a schematic diagram of dynamic timing for UL scheduling when DL sTTIs and UL sTTIs are unequal and are not aligned according to an embodiment of the disclosure.

FIG. 18 illustrates UL and DL sTTI division when a DL sTTI includes two OFDM symbols and a UL sTTI includes four OFDM symbols. It is to be noted that, in such case, a UL sTTI 1 also includes a last OFDM symbol of a UL sTTI 0. That is, a middlemost OFDM symbol, i.e., a fourth OFDM symbol, in a slot in case of a normal CP is shared by previous and next UL sTTIs.

From a timing reference starting point, the timing interval is formed by k1 subframes and/or k2 sTTIs.

From the timing reference starting point, the timing interval is formed by the k1 subframes and/or the k2 sTTIs on the basis of a minimum timing interval. When the timing interval is a fixed timing interval, k1 and k2 are fixed values. When the timing interval is an unfixed timing interval, at least one of k1 and k2 is notified through physical-layer signaling or high-layer signaling.

When a dynamic timing interval is adopted, from the timing reference starting point, the timing interval is formed by the k1 subframes and/or the k2 sTTIs. When a UL grant schedules an sPUSCH, the timing reference starting point is determined at first. (Example 1) when the reference point selects a DL sTTI where the UL grant is located and the UL grant is located in a DL sTTI 6 in a subframe n, a required corresponding UL sTTI is determined in, for example, a second manner of determining by a UL sTTI m1 where an ending symbol of a DL sTTI m is located, and in such case, a DL sTTI 2 corresponds to a UL sTTI 3. Second, the timing interval is indicated only according to the UL sTTI. That is, in such case, k1=0 and k2 is indicated through DCI. The UL sTTI where the scheduled sPUSCH is determined. For example, if k=6, the sPUSCH is located in m1+6*sTTI, i.e., a UL sTTI 1 in a subframe n+2. (Example 2) when the reference point selects a starting position of a subframe where the UL grant is located, it is aligned with a boundary of a subframe where the UL sTTI is located. Second, the timing interval is indicated and the timing relationship is determined according to two time dimensions k1*subframe+k2*sTTI, i.e., the subframe and the UL sTTI. That is, in such case, k1 and k2 are indicated through the DCI. The UL sTTI where the scheduled sPUSCH is determined. For example, if k1=2 and k2=2, the sPUSCH is located in n+2*subframe+2*sTTI, i.e., a UL sTTI 2 in the subframe n+2. Or, the timing relationship k2*sTTI is determined only according to the UL sTTI, k2 is indicated through the DCI, and in such case, k2=10. (Example 3) when the reference point selects an ending position of the subframe where the UL grant is located, it is aligned with the boundary of the subframe where the UL sTTI is located. Second, the timing interval is indicated and the timing relationship is determined according to two time dimensions k1*subframe+k2*sTTI, i.e., the subframe and the UL sTTI. That is, in such case, k1 and k2 are indicated through the DCI. The UL sTTI where the scheduled sPUSCH is determined. For example, if k1=1 and k2=2, the sPUSCH is located in n+1+1*subframe+2*sTTI, i.e., the UL sTTI 2 in the subframe n+2. Or, the timing relationship k2*sTTI is determined only according to the UL sTTI, k2 is indicated through the DCI, and in such case, k2=6.

Or, when the dynamic timing interval is adopted, from the timing reference starting point, the timing interval is formed by the k1 subframes and/or the k2 sTTIs on the basis of the minimum timing interval. When the UL grant schedules the sPUSCH, the timing reference starting point is determined at first. (Example 1) when the reference point selects the DL sTTI where the UL grant is located and the UL grant is located in the DL sTTI 6 in the subframe n, the required corresponding UL sTTI is determined in, for example, the second manner of determining by the UL sTTI m1 where the ending symbol of the DL sTTI m is located, and in such case, the DL sTTI 2 corresponds to the UL sTTI 3. Second, an additional timing interval is indicated on the basis of the minimum timing interval only according to the UL sTTI. That is, in such case, k1=−0 and k2 is indicated through the DCI. The minimum timing interval is 4*sTTI, and the UL sTTI where the scheduled sPUSCH is indicated. For example, if k2=2, the sPUSCH is located in m1+(4+k2)*sTTI, i.e., the UL sTTI 1 in the subframe n+2. (Example 2) when the reference point selects the starting position of the subframe where the UL grant is located, it is aligned with the boundary of the subframe where the UL sTTI is located. Second, the additional timing interval is indicated on the basis of the minimum timing interval and the timing relationship is determined according to the two time dimensions k1*subframe+k2*sTTI, i.e., the subframe and the UL sTTI. That is, in such case, k1 and k2 are indicated through the DCI. The minimum timing interval is a subframe or four sTTIs, and the UL sTTI where the scheduled sPUSCH is indicated. For example, if k1=1 and k2=2, the sPUSCH is located in n+(1+k1)*subframe+k2*sTTI, i.e., the UL sTTI 2 in the subframe n+2. Or, the timing relationship (4+k2)*sTTI is determined only according to the UL sTTI, k2 is indicated through the DCI, and in such case, k2=6. (Example 3) when the reference point selects the ending position of the subframe where the UL grant is located, it is aligned with the boundary of the subframe where the UL sTTI is located. Second, the additional timing interval is indicated on the basis of the minimum timing interval and the timing relationship is determined according to the two time dimensions k1*subframe+k2*sTTI, i.e., the subframe and the UL sTTI. That is, in such case, k1 and k2 are indicated through the DCI. The minimum timing interval is a subframe or four sTTIs, and the UL sTTI where the scheduled sPUSCH is indicated. For example, if k1=1 and k2=2, the sPUSCH is located in n+1+(0+k1)*subframe+k2*sTTI, i.e., the UL sTTI 2 in the subframe n+2. Or, the timing relationship (4+k2)*sTTI is determined only according to the UL sTTI, k2 is indicated through the DCI, and in such case, k2=2.

Through the solution of the embodiment, a timing relationship determination method disclosed in the disclosure may be adopted to solve problems about accurate determination of the timing relationship when divided UL and DL sTTIs in an sTTI including relatively few OFDM symbols are not aligned, solve the problem that the UL and DL sTTIs are not aligned by determining the timing reference starting point, solve the problem of different UL and DL sTTI understandings by selecting multiple time units to determine the timing interval and meet a low-delay communication requirement.

Specific Embodiment 18

Figure 19:
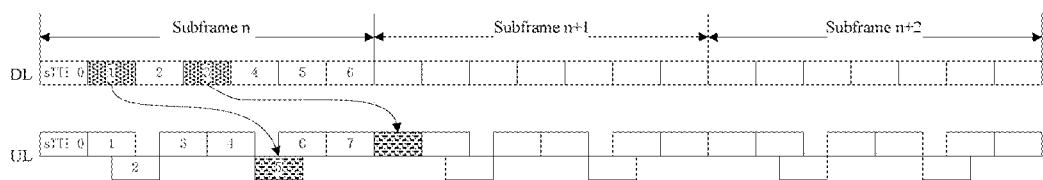
FIG. 19 is a schematic diagram of fixed timing for UL scheduling when DL sTTIs and UL sTTIs are equal but are not aligned according to an embodiment of the disclosure.

FIG. 19 illustrates UL and DL sTTI division when a DL sTTI includes two OFDM symbols, a UL sTTI includes two OFDM symbols and a UL RS is shared. It is to be noted that, in such case, UL sTTIs 1 and 2 and UL sTTIs 5 and 6 share an OFDM symbol. That is, a middlemost OFDM symbol, i.e., a fourth OFDM symbol, in a slot in case of a normal CP is shared by previous and next UL sTTIs.

A UL grant in a DL sTTI 1 in a subframe n schedules a UL sTTI 5 in the same subframe. When a fixed timing interval is adopted, from a timing reference starting point, the interval fixedly includes k sTTIs. When the UL grant schedules an sPUSCH, the timing reference starting point is determined at first, and a position of a UL sTTI corresponding to a DL sTTI where the UL grant is located is used. When the UL grant is located in a DL sTTI in the subframe n, a required corresponding UL sTTI is determined in, for example, a second manner of determining by a UL sTTI m1 where an ending symbol of a DL sTTI m is located, and in such case, the DL sTTI 2 corresponds to the UL sTTIs 1 and 2. One of them is required to be further determined. The unique corresponding UL sTTI m1 is determined to be the UL sTTI 1 by selecting the one aligned with the DL sTTI in the multiple UL sTTIs, or selecting the one which may include all OFDM symbols of the DL sTTI in the multiple UL sTTIs, or selecting the one which may include more of all the OFDM symbols of the DL sTTI in the multiple UL sTTIs or selecting the first one of the multiple UL sTTIs. Second, the UL sTTI where the scheduled sPUSCH is determined through a fixed timing interval. For example, if k=4, the sPUSCH is located in m1+4*sTTI, i.e., a UL sTTI 5 in the subframe n.

A UL grant in a DL sTTI 3 in the subframe n schedules a UL sTTI 0 in a next subframe. When the fixed timing interval is adopted, from the timing reference starting point, the interval fixedly includes k sTTIs. When the UL grant schedules the sPUSCH, the timing reference starting point is determined at first, and the position of the UL sTTI corresponding to the DL sTTI where the UL grant is located is used. When the UL grant is located in a DL sTTI 2 in the subframe n, the required corresponding UL sTTI is determined in, for example, a second manner of determining by a UL sTTI m1 where an ending symbol of a DL sTTI m is located or a third manner of determining by the next UL sTTI of the UL sTTI where a starting symbol of the DL sTTI is located, and in such case, the DL sTTI 3 corresponds to a UL sTTI 4. Second, the UL sTTI where the scheduled sPUSCH is determined through the fixed timing interval. For example, if k=4, the sPUSCH is located in m1+4*sTTI, i.e., the UL sTTI 5 in the subframe n.

Through the solution of the embodiment, a timing relationship determination method disclosed in the disclosure may be adopted to solve problems about accurate determination of the timing relationship when divided UL and DL sTTIs in an sTTI including relatively few OFDM symbols are not aligned, particularly solve the problem that the UL and DL sTTIs are not aligned by determining the timing reference starting point in case of the fixed timing relationship, ensure that the DL sTTI corresponds to a unique UL sTTI, solve the problem of different UL and DL sTTI understandings and meet a low-delay communication requirement.

Specific Embodiment 19

Figure 20:
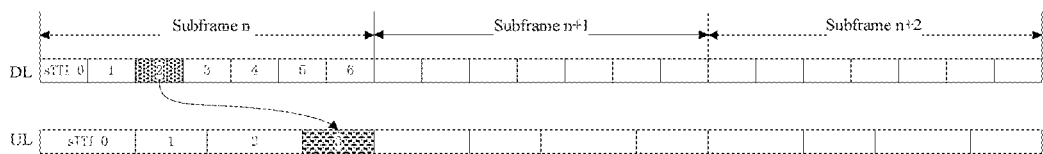
FIG. 20 is a schematic diagram of fixed timing for DL feedback when DL sTTIs and UL sTTIs are unequal and are not aligned according to an embodiment of the disclosure.

FIG. 20 illustrates UL and DL sTTI division when a DL sTTI includes two OFDM symbols and a UL sTTI includes four OFDM symbols. It is to be noted that, in such case, a UL sTTI 1 also includes a last OFDM symbol of a UL sTTI 0. That is, a middlemost OFDM symbol, i.e., a fourth OFDM symbol, in a slot in case of a normal CP is shared by previous and next UL sTTIs.

When the fixed timing interval is adopted, from the timing reference starting point, the interval fixedly includes k sTTIs. When an ACK/NACK (born through an sPUCCH) is fed back for an sPDSCH, the timing reference starting point is determined at first, and a position of a DL sTTI where the sPDSCH is located is used and is a DL sTTI 2 in a subframe n. Second, through a fixed timing interval, for example, k=4, the DL sTTI is determined to be 2+k*sTTI, i.e., a DL sTTI 6 in the subframe n. The DL sTTI is finally required to correspond to the UL sTTI in, for example, a first manner of determining a UL sTTI m1 where a starting symbol of a DL sTTI m is located or a second manner of determining the UL sTTI m1 where an ending symbol of the DL sTTI m is located, and in such case, the DL sTTI 2 corresponds to a UL sTTI 3, that is, the UL sTTI feeding back the ACK/NACK (born through the sPUCCH) is the UL sTTI 3 in the subframe n.

Through the solution of the embodiment, a timing relationship determination method disclosed in the disclosure may be adopted to solve problems about accurate determination of the timing relationship when divided UL and DL sTTIs in an sTTI including relatively few OFDM symbols are not aligned, particularly solve the problem that the UL and DL sTTIs are not aligned by determining the timing ending point in case of the fixed timing relationship, solve the problem of different UL and DL sTTI understandings and meet a low-delay communication requirement.

Specific Embodiment 20

Figure 21:
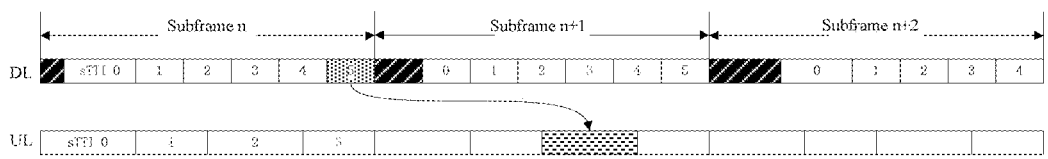
FIG. 21 is a schematic diagram of fixed timing for DL feedback when DL sTTIs do not include a legacy PDCCH region and are not aligned with UL sTTIs according to an embodiment of the disclosure.

FIG. 21 illustrates UL and DL sTTI division when a DL sTTI includes two OFDM symbols and a UL sTTI includes four OFDM symbols. It is to be noted that, in such case, a UL sTTI 1 also includes a last OFDM symbol of a UL sTTI 0. That is, a middlemost OFDM symbol, i.e., a fourth OFDM symbol, in a slot in case of a normal CP is shared by previous and next UL sTTIs.

When a fixed timing interval is adopted, from a timing reference starting point, the interval fixedly includes k sTTIs. When an ACK/NACK (born through an sPUCCH) is fed back for an sPDSCH, the timing reference starting point is determined at first, and a position of a DL sTTI where the sPDSCH is located is used and is a DL sTTI 5 in a subframe n. Second, through the fixed timing interval, for example, k=4, is adopted, but a legacy PDCCH region is required to be crossed in such case.

(1) When k DL sTTIs after the legacy PDCCH region are excluded, the determined DL sTTI is the DL sTTI 3 in a subframe n+1. The DL sTTI is finally required to correspond to the UL sTTI in, for example, a first manner of determining a UL sTTI m1 where a starting symbol of a DL sTTI m is located or a second manner of determining the UL sTTI m1 where an ending symbol of the DL sTTI m is located, and in such case, the DL sTTI 3 corresponds to a UL sTTI 2, that is, the UL sTTI feeding back the ACK/NACK (born through the sPUCCH) is the UL sTTI 2 in the subframe n+1.

(2) When the legacy PDCCH region and k2-1 DL sTTIs are included, the determined DL sTTI is the DL sTTI 2 in the subframe n+1. The DL sTTI is finally required to correspond to the UL sTTI in, for example, a second manner of determining a UL sTTI m1 where an ending symbol of a DL sTTI m is located or a third manner of determining the next UL sTTI m1 of a UL sTTI where a starting symbol of the DL sTTI m is located, and in such case, the DL sTTI 2 corresponds to a UL sTTI 3, that is, the UL sTTI feeding back the ACK/NACK (born through the sPUCCH) is the UL sTTI 2 in the subframe n2.

Through the solution of the embodiment, a timing relationship determination method disclosed in the disclosure may be adopted to solve problems about accurate determination of the timing relationship when divided UL and DL sTTIs in an sTTI including relatively few OFDM symbols are not aligned, particularly solve the problem of different UL and DL sTTI understandings by determining whether the timing interval includes the legacy PCCH region or not when the legacy PDCCH region is not included during sTTI division and meet a low-delay communication requirement.

Specific Embodiment 21

Figure 22:
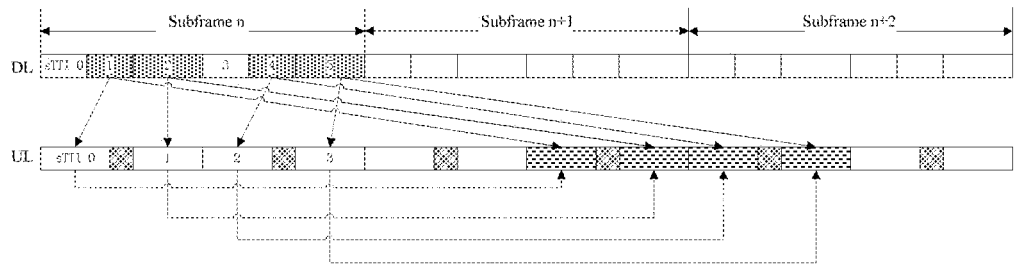
FIG. 22 is a schematic diagram of fixed timing for UL scheduling when DL sTTIs and UL sTTIs are unequal (DL sTTI=2 symbols and UL sTTI=4 symbols) and are not aligned according to an embodiment of the disclosure.

FIG. 22 illustrates UL and DL sTTI division when a DL sTTI includes two OFDM symbols, a subframe being specifically divided into six DL sTTIs including two, two, three, two, two and three OFDM symbols respectively, and a UL sTTI includes four OFDM symbols. It is to be noted that, in such case, a UL sTTI 1 also includes a last OFDM symbol of a UL sTTI 0. That is, a middlemost OFDM symbol, i.e., a fourth OFDM symbol, in a slot in case of a normal CP is shared by previous and next UL sTTIs. The same to a second slot.

For UL scheduling timing UL grant→sPUSCH, a relationship between UL sTTIs that a minimum interval is a number p of UL sTTIs is met. In the embodiment, for example, p=5, conditions in case of other p values are similar, and a value of p is In an embodiment 4, 5, 6, 7 and 8.

In such case, fixed scheduling timing is adopted. That is, only four DL sTTIs are selected from sixth DL sTTIs to schedule four UL sTTIs respectively.

It is noted that a scheduling relationship is shown by solid arrowheads. A process is presented by two dotted arrowheads: at first, a DL sTTI 1 corresponds to a UL sTTI 0. A closest DL sTTI meeting the condition that the minimum interval between the UL sTTIs is a number p of UL sTTIs is selected. In such case, for example, p=5. When the number p of UL sTTIs only include one of previous and next UL sTTIs of a shared RS symbol, the RS may not be counted in the number p of UL sTTIs. Then, subframe n+1, UL sTTI 2 is determined through UL sTTI timing 0+6. The scheduling relationship (including the process) may be embodied in a form of the following first or second or third manner.

That is, when DL sTTI=2 (OFDM symbols) and UL sTTI=4 (OFDM symbols), four groups of timing relationships that DL sTTIs #1, 2, 4 and 5 in a subframe n where a UL grant is located schedule UL sTTIs #2 and 3 in a subframe n3 where an sPUSCH is located and UL sTTIs #0 and 1 in a subframe n+2 respectively meet the minimum interval k=5 UL sTTIs.

A first manner: a timing relationship of UL scheduling timing from (subframe n, DL sTTI i) (UL grant) to (subframe m=n+k1, UL sTTI j=i+k2) (sPUSCH) is shown in Table 44.

TABLE 44

| i | 0 | 1 | 2 | 3 | 4 | 5 |
|---|---|---|---|---|---|---|
| (k1, k2) | — | (1, 1) | (1, 1) | — | (2, −4) | (2, −4) |

Or, the timing relationship of the UL scheduling timing from (subframe n, DL sTTI i) (UL grant) to (subframe m=n+k1, UL sTTI j) (sPUSCH) is shown in Table 45.

TABLE 45

| i | 0 | 1 | 2 | 3 | 4 | 5 |
|---|---|---|---|---|---|---|
| (k1, j) | — | (1, 2) | (1, 3) | — | (2, 0) | (2, 1) |

A second manner: a timing reference starting point is subframe n, DL sTTI i. In such case, (n, i) corresponds to a UL sTTI (n, i') in the same subframe at first, and then a timing reference ending point is determined by j=i'+k2. That is, as shown in Table 46 which is a comparison table for determining the DL sTTI i and UL sTTI i' in the same subframe n, the timing relationship of the UL scheduling timing from the UL grant (DL sTTI i) to the sPUSCH (UL sTTI j) is j=i'+6. Furthermore, i=1, 2, 4 and 5.

TABLE 46

| DL sTTI i | 0 | 1 | 2 | 3 | 4 | 5 |
|---|---|---|---|---|---|---|
| UL sTTI i' | 0 | 0 | 1 | 2 | 2 | 3 |

A third manner: the timing reference starting point is subframe n, DL sTTI i. In such case, the timing reference ending point is determined through a function (j)=f(i) or (j)=f(k, i). If it is determined that the adopted function is $$j = f(i) = \begin{cases} \lfloor i/2 \rfloor + 6, i = 0, 1, 2 \\ \lceil i/2 \rceil + 6, i = 3, 4, 5 \end{cases} \text{ or}$$

$$j = f(k, i) = \begin{cases} \lfloor i/2 \rfloor + k, i = 0, 1, 2 \\ \lceil i/2 \rceil + k, i = 3, 4, 5 \end{cases},$$

the timing relationship of the UL scheduling timing from the UL grant (DL sTTI i) to the sPUSCH (UL sTTI j) is j=. Furthermore, i=1, 2, 4 and 5.

Through the solution of the embodiment, a timing relationship determination method disclosed in the disclosure may be adopted to solve problems about accurate determination of the timing relationship when divided UL and DL sTTIs in an sTTI including relatively few OFDM symbols are not aligned, particularly solve the problem that the UL and DL sTTIs are not aligned by determining the closest DL sTTI meeting minimum timing in case of the fixed timing relationship, solve the problem of different UL and DL sTTI understandings and meet a low-delay communication requirement.

Specific Embodiment 22

Figure 23:
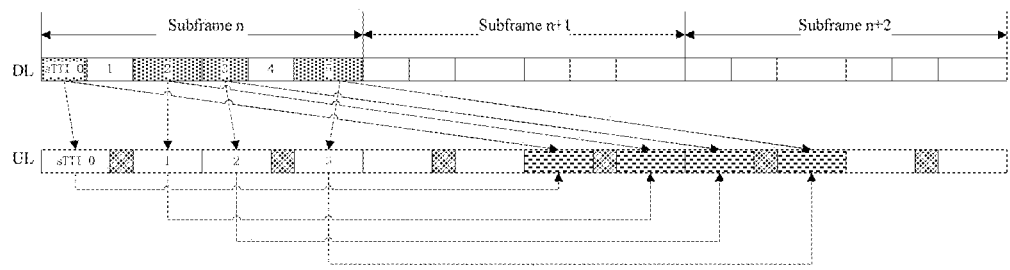
FIG. 23 is a schematic diagram of fixed timing for UL scheduling when DL sTTIs and UL sTTIs are unequal (DL sTTI=2 symbols and UL sTTI=4 symbols) and are not aligned according to an embodiment of the disclosure.

FIG. 23 illustrates UL and DL sTTI division when a DL sTTI includes two OFDM symbols, a subframe being specifically divided into six DL sTTIs including two, two, three, two, two and three OFDM symbols respectively, and a UL sTTI includes four OFDM symbols. It is to be noted that, in such case, a UL sTTI 1 also includes a last OFDM symbol of a UL sTTI 0. That is, a middlemost OFDM symbol, i.e., a fourth OFDM symbol, in a slot in case of a normal CP is shared by previous and next UL sTTIs. The same to a second slot.

For UL scheduling timing UL grant→sPUSCH, a relationship between UL sTTIs that a minimum interval is a number p of UL sTTIs is met. In the embodiment, for example, p=5, conditions in case of other p values are similar, and a value of p is In an embodiment 4, 5, 6, 7 and 8.

In such case, fixed scheduling timing is adopted. That is, only four DL sTTIs are selected from sixth DL sTTIs to schedule four UL sTTIs respectively.

It is noted that a scheduling relationship is shown by solid arrowheads. A process is presented by two dotted arrowheads: at first, a DL sTTI 0 corresponds to a UL sTTI 0. A closest DL sTTI meeting the condition that the minimum interval between the UL sTTIs is a number p of UL sTTIs is selected. In such case, for example, p=5. When the number p of UL sTTIs only include one of previous and next UL sTTIs of a shared RS symbol, the RS is required to be counted in the number p of UL sTTIs. Then, subframe n+1, UL sTTI 2 is determined through UL sTTI timing 0+6. The scheduling relationship (including the process) may be embodied in a form of the following first or second or third manner.

That is, when DL sTTI=2 (OFDM symbols) and UL sTTI=4 (OFDM symbols), four groups of timing relationships that DL sTTIs #0, 2, 3 and 5 in a subframe n where a UL grant is located schedule UL sTTIs #2 and 3 in a subframe n3 where an sPUSCH is located and UL sTTIs #0 and 1 in a subframe n+2 respectively meet the minimum interval k=5 UL sTTIs.

A first manner: a timing relationship of UL scheduling timing from (subframe n, DL sTTI i) (UL grant) to (subframe m=n+k1, UL sTTI j=i+k2) (sPUSCH) is shown in Table 47.

TABLE 47

| i | 0 | 1 | 2 | 3 | 4 | 5 |
|---|---|---|---|---|---|---|
| (k1, k2) | (1, 2) | — | (1, 0) | (2, −3) | — | (2, −4) |

Or, the timing relationship of the UL scheduling timing from (subframe n, DL sTTI i) (UL grant) to (subframe m=n+k1, UL sTTI j) (sPUSCH) is shown in Table 48.

TABLE 48

| i | 0 | 1 | 2 | 3 | 4 | 5 |
|---|---|---|---|---|---|---|
| (k1, j) | (1, 2) | — | (1, 3) | (2, 0) | — | (2, 1) |

A second manner: a timing reference starting point is subframe n, DL sTTI i. In such case, (n, i) corresponds to a UL sTTI (n, i') in the same subframe at first, and then a timing reference ending point is determined by j=i'+k2. That is, as shown in Table 49 which is a comparison table for determining the DL sTTI i and UL sTTI i' in the same subframe, the timing relationship of the UL scheduling timing from the UL grant (DL sTTI i) to the sPUSCH (UL sTTI j) is j=i'+6. Furthermore, i=0, 2, 3 and 5.

TABLE 49

| DL sTTI i | 0 | 1 | 2 | 3 | 4 | 5 |
|---|---|---|---|---|---|---|
| UL sTTI i' | 0 | 0 | 1 | 2 | 2 | 3 |

A third manner: the timing reference starting point is subframe n, DL sTTI i. In such case, the timing reference ending point is determined through a function (j)=f(i) or (j)=f(k, i). If it is determined that the adopted function is $$j = f(i) = \begin{cases} \lfloor i/2 \rfloor + 6, i = 0, 1, 2 \\ \lceil i/2 \rceil + 6, i = 3, 4, 5 \end{cases} \text{ or}$$

$$j = f(k, i) = \begin{cases} \lfloor i/2 \rfloor + k, i = 0, 1, 2 \\ \lceil i/2 \rceil + k, i = 3, 4, 5 \end{cases},$$

the timing relationship of the UL scheduling timing from the UL grant (DL sTTI i) to the sPUSCH (UL sTTI j) is $$j = \begin{cases} \lfloor i/2 \rfloor + 6, i = 0, 1, 2 \\ \lceil i/2 \rceil + 6, i = 3, 4, 5 \end{cases}.$$

Furthermore, i=0, 2, 3 and 5.

Through the solution of the embodiment, a timing relationship determination method disclosed in the disclosure may be adopted to solve problems about accurate determination of the timing relationship when divided UL and DL sTTIs in an sTTI including relatively few OFDM symbols are not aligned, particularly solve the problem that the UL and DL sTTIs are not aligned by determining the closest DL sTTI meeting minimum timing in case of the fixed timing relationship, solve the problem of different UL and DL sTTI understandings and meet a low-delay communication requirement.

Specific Embodiment 23

Figure 24:
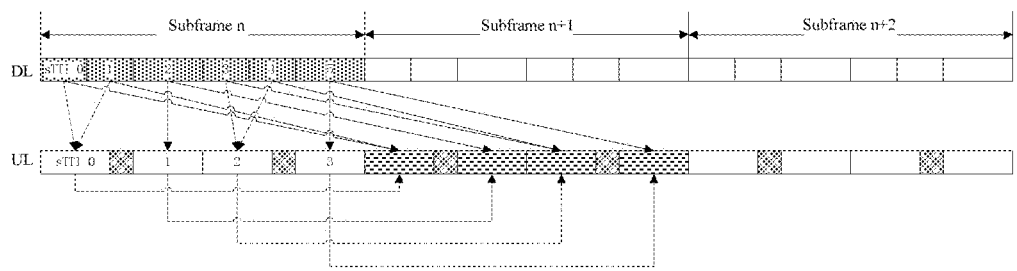
FIG. 24 is a schematic diagram illustrating that fixed timing is adopted for UL scheduling when DL sTTIs and UL sTTIs are unequal (DL sTTI=2 symbols and UL sTTI=4 symbols) and are not aligned and each DL sTTI may schedule UL data according to an embodiment of the disclosure.

FIG. 24 illustrates UL and DL sTTI division when a DL sTTI includes two OFDM symbols, a subframe being specifically divided into six DL sTTIs including two, two, three, two, two and three OFDM symbols respectively, and a UL sTTI includes four OFDM symbols. It is to be noted that, in such case, a UL sTTI 1 also includes a last OFDM symbol of a UL sTTI 0. That is, a middlemost OFDM symbol, i.e., a fourth OFDM symbol, in a slot in case of a normal CP is shared by previous and next UL sTTIs. The same to a second slot.

For UL scheduling timing UL grant→sPUSCH, a relationship between UL sTTIs that a minimum interval is a number p of UL sTTIs is met. In the embodiment, for example, p=3, conditions in case of other p values are similar, and a value of p is In an embodiment 3, 4, 5, 6 and 7.

In such case, fixed scheduling timing is adopted and each DL sTTI may schedule an sPUSCH.

It is noted that a scheduling relationship is shown by solid arrowheads. A process is presented by two dotted arrowheads: closest DL sTTIs meeting the condition that the minimum interval between the UL sTTIs is a number p of UL sTTIs are determined. In such case, for example, p=3. Each DL sTTI may schedule the sPUSCH. When the number p of UL sTTIs only include one of previous and next UL sTTIs of a shared RS symbol, the RS may not be counted in the number p of UL sTTIs. The scheduling relationship (including the process) may be embodied in a form of the following first or second or third manner.

That is, when DL sTTI=2 (OFDM symbols) and UL sTTI=4 (OFDM symbols), each group of timing relationship that the DL sTTI #0 or 1 in the subframe n where the UL grant is located schedules the UL sTTI #0 in the subframe n+1 where the sPUSCH is located, the DL sTTI #2 in the subframe n where the UL grant is located schedules the UL sTTI #1 in the subframe n+1 where the sPUSCH is located, the DL sTTI #3 or 4 in the subframe n where the UL grant is located schedules the UL sTTI #2 in the subframe n+1 where the sPUSCH is located and the DL sTTI #5 in the subframe n where the UL grant is located schedules the UL sTTI #3 in the subframe n+1 where the sPUSCH is located meets that the minimum interval is k=3 UL sTTIs and each DL sTTI is allowed to schedule the sPUSCH.

A first manner: Table 50 is a timing relationship table between UL scheduling timing (subframe n, DL sTTI i) (UL grant) and (subframe m=n+k1, UL sTTI j=i+k2) (sPUSCH).

TABLE 50

| i | 0 | 1 | 2 | 3 | 4 | 5 |
|---|---|---|---|---|---|---|
| (k1, k2) | (1, 0) | (1, −1) | (1, −1) | (1, −1) | (1, −2) | (1, −2) |

Or, Table 51 is a timing relationship table of UL scheduling timing from (subframe n, DL sTTI i) (UL grant) to (subframe m=n+k1, UL sTTI j) (sPUSCH).

TABLE 51

| i | 0 | 1 | 2 | 3 | 4 | 5 |
|---|---|---|---|---|---|---|
| (k1, j) | (1, 0) | (1, 0) | (1, 1) | (1, 2) | (1, 2) | (1, 3) |

A second manner: a timing reference starting point is subframe n, DL sTTI i. In such case, (n, i) corresponds to a UL sTTI (n, i') in the same subframe at first, and then a timing reference ending point is determined by j=i'+k2. That is, a comparison table, as shown in Table 52, for the DL sTTI i and UL sTTI i' in the same subframe n is determined at first.

TABLE 52

| DL sTTI i | 0 | 1 | 2 | 3 | 4 | 5 |
|---|---|---|---|---|---|---|
| UL sTTI i' | 0 | 0 | 1 | 2 | 2 | 3 |

The timing relationship of the UL scheduling timing from the UL grant (DL sTTI i) to the sPUSCH (UL sTTI i) is j=i'+4. Furthermore, i=0, 1, 2, 3, 4 and 5.

A third manner: the timing reference starting point is subframe n, DL sTTI i. In such case, the timing reference ending point is determined through a function (j)=f(i) or (j)=f(k, i). If it is determined that the adopted function is $$j = f(i) = \begin{cases} \lfloor i/2 \rfloor + 6, i = 0, 1, 2 \\ \lceil i/2 \rceil + 6, i = 3, 4, 5 \end{cases} \text{ or}$$

$$j = f(k, i) = \begin{cases} \lfloor i/2 \rfloor + k, i = 0, 1, 2 \\ \lceil i/2 \rceil + k, i = 3, 4, 5 \end{cases},$$

the timing relationship of the UL scheduling timing from the UL grant (DL sTTI i) to the sPUSCH (UL sTTI j) is $$j = \begin{cases} \lfloor i/2 \rfloor + 6, i = 0, 1, 2 \\ \lceil i/2 \rceil + 6, i = 3, 4, 5 \end{cases}.$$

Furthermore, i=0, 1, 2, 3, 4 and 5.

Through the solution of the embodiment, a timing relationship determination method disclosed in the disclosure may be adopted to solve problems about accurate determination of the timing relationship when divided UL and DL sTTIs in an sTTI including relatively few OFDM symbols are not aligned, particularly solve the problem that the UL and DL sTTIs are not aligned by determining the closest DL sTTIs meeting minimum timing, each DL sTTI being allowed to schedule the sPUSCH, in case of the fixed timing relationship, solve the problem of different UL and DL sTTI understandings and meet a low-delay communication requirement.

Specific Embodiment 24

Figure 25:
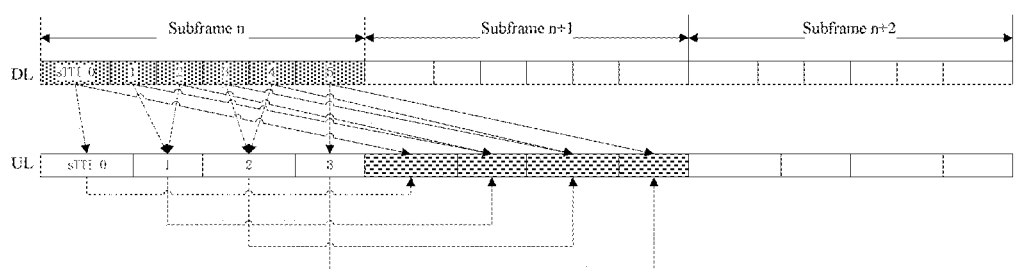
FIG. 25 is a schematic diagram illustrating that fixed timing is adopted for UL scheduling when DL sTTIs and UL sTTIs are unequal (DL sTTI=2 symbols and UL sTTI=4 symbols) and are not aligned and each DL sTTI may schedule UL data according to an embodiment of the disclosure.

FIG. 25 illustrates UL and DL sTTI division when a DL sTTI includes two OFDM symbols, a subframe being specifically divided into six DL sTTIs including three, two, two, two, two and three OFDM symbols respectively, and a UL sTTI includes four OFDM symbols. It is to be noted that, in such case, a UL sTTI 1 also includes a last OFDM symbol of a UL sTTI 0. That is, a middlemost OFDM symbol, i.e., a fourth OFDM symbol, in a slot in case of a normal CP is shared by previous and next UL sTTIs. The same to a second slot.

For UL scheduling timing UL grant→sPUSCH, a relationship between UL sTTIs that a minimum interval is a number p of UL sTTIs is met. In the embodiment, for example, p=3, conditions in case of other p values are similar, and a value of p is In an embodiment one of 3, 4, 5, 6 and 7.

In such case, fixed scheduling timing is adopted and each DL sTTI may schedule an sPUSCH.

It is noted that a scheduling relationship is shown by solid arrowheads. A process is presented by two dotted arrowheads: closest DL sTTIs meeting the condition that the minimum interval between the UL sTTIs is a number p of UL sTTIs are determined. In such case, for example, p=3. Each DL sTTI may schedule the sPUSCH. When the number p of UL sTTIs only include one of previous and next UL sTTIs of a shared RS symbol, the RS may not be counted in the number p of UL sTTIs. The scheduling relationship (including the process) may be embodied in a form of the following first or second or third manner.

That is, when DL sTTI=2 (OFDM symbols) and UL sTTI=4 (OFDM symbols), each group of timing relationship that the DL sTTI #0 in the subframe n where the UL grant is located schedules the UL sTTI #0 in the subframe n+1 where the sPUSCH is located, the DL sTTI #1 or 2 in the subframe n where the UL grant is located schedules the UL sTTI #1 in the subframe n+1 where the sPUSCH is located, the DL sTTI #3 in the subframe n where the UL grant is located schedules the UL sTTI #2 in the subframe n+1 where the sPUSCH is located and the DL sTTI #4 or 5 in the subframe n where the UL grant is located schedules the UL sTTI #3 in the subframe n+1 where the sPUSCH is located meets that the minimum interval is k=3 UL sTTIs and each DL sTTI is allowed to schedule the sPUSCH.

A first manner: Table 53 is a timing relationship table between UL scheduling timing (subframe n, DL sTTI i) (UL grant) and (subframe m=n+k1, UL sTTI j=i+k2) (sPUSCH).

TABLE 53

| i | 0 | 1 | 2 | 3 | 4 | 5 |
|---|---|---|---|---|---|---|
| (k1, k2) | (1, 0) | (1, 0) | (1, −1) | (1, −1) | (1, −2) | (1, −2) |

Or, Table 54 is a timing relationship table of UL scheduling timing from (subframe n, DL sTTI i) (UL grant) to (subframe m=n+k1, UL sTTI j) (sPUSCH).

TABLE 54

| i | 0 | 1 | 2 | 3 | 4 | 5 |
|---|---|---|---|---|---|---|
| (k1, j) | (1, 0) | (1, 1) | (1, 1) | (1, 2) | (1, 2) | (1, 3) |

A second manner: a timing reference starting point is subframe n, DL sTTI i. In such case, (n, i) corresponds to a UL sTTI (n, i') in the same subframe at first, and then a timing reference ending point is determined by j=i'+k2. That is, a comparison table, as shown in Table 55, for the DL sTTI i and UL sTTI i' in the same subframe n is determined at first.

TABLE 55

| DL sTTI i | 0 | 1 | 2 | 3 | 4 | 5 |
|---|---|---|---|---|---|---|
| UL sTTI i' | 0 | 1 | 1 | 2 | 2 | 3 |

The timing relationship of the UL scheduling timing from the UL grant (DL sTTI i) to the sPUSCH (UL sTTI i) is j=i'+4. Furthermore, i=0, 1, 2, 3, 4 and 5.

A third manner: the timing reference starting point is subframe n, DL sTTI i. In such case, the timing reference ending point is determined through a function (j)=f(i) or (j)=f(k, i). If it is determined that the adopted function is j=f(i)=[i/2]+4 or j=f(k, i)=[i/2+k, the timing relationship of the UL scheduling timing from the UL grant (DL sTTI i) to the sPUSCH (UL sTTI j) is j=i/2]+4. Furthermore, i=0, 1, 2, 3, 4 and 5.

Through the solution of the embodiment, a timing relationship determination method disclosed in the disclosure may be adopted to solve problems about accurate determination of the timing relationship when divided UL and DL sTTIs in an sTTI including relatively few OFDM symbols are not aligned, particularly solve the problem that the UL and DL sTTIs are not aligned by determining the closest DL sTTIs meeting minimum timing, each DL sTTI being allowed to schedule the sPUSCH, in case of the fixed timing relationship, solve the problem of different UL and DL sTTI understandings and meet a low-delay communication requirement.

Specific Embodiment 25

Figure 26:
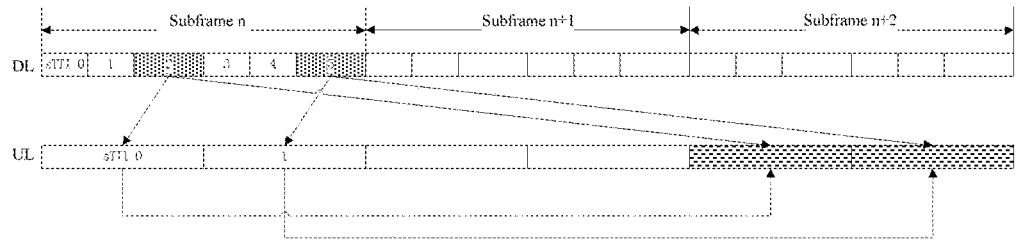
FIG. 26 is a schematic diagram of fixed timing for UL scheduling when DL sTTIs and UL sTTIs are unequal (DL sTTI=2 symbols and UL sTTI=7 symbols) and are not aligned according to an embodiment of the disclosure.

FIG. 26 illustrates UL and DL sTTI division when a DL sTTI includes two OFDM symbols, a subframe being specifically divided into six DL sTTIs including two, two, three, two, two and three OFDM symbols respectively, and a UL sTTI includes seven OFDM symbols. It is to be noted that this is a condition of a normal CP.

For UL scheduling timing UL grant→sPUSCH, a relationship between UL sTTIs that a minimum interval is a number p of UL sTTIs is met. In the embodiment, for example, p=3, and a value of p is In an embodiment one of 3, 4, 5, 6 and 7.

In such case, fixed scheduling timing is adopted. That is, only two DL sTTIs are selected from six DL sTTIs to schedule two UL sTTIs respectively.

It is noted that a scheduling relationship is shown by solid arrowheads. A process is presented by two dotted arrowheads: a DL sTTI 2 corresponds to the UL sTTI 0 at first (a principle is a closest DL sTTI meeting the condition that the minimum interval between the UL sTTIs is 3 UL sTTIs), and then subframe n+2, UL sTTI 0 is determined through UL sTTI timing 0+4. The scheduling relationship (including the process) may be embodied in a form of the following first or second or third manner.

That is, when DL sTTI=2 (OFDM symbols) and UL sTTI=7 (OFDM symbols), two groups of timing relationships that DL sTTIs #2 and 5 in a subframe n where a UL grant is located schedule UL sTTIs #0 and 1 in a subframe n+2 where an sPUSCH is located respectively meet the minimum interval k=3 UL sTTIs.

A first manner: Table 56 is a timing relationship table between UL scheduling timing (subframe n, DL sTTI i) (UL grant) and (subframe m=n+k1, UL sTTI j=i+k2) (sPUSCH).

TABLE 56

| i | 0 | 1 | 2 | 3 | 4 | 5 |
|---|---|---|---|---|---|---|
| (k1, k2) | — | — | (2, −2) | — | — | (2, −4) |

Or, Table 57 is a timing relationship table of UL scheduling timing from (subframe n, DL sTTI i) (UL grant) to (subframe m=n+k1, UL sTTI j) (sPUSCH).

TABLE 57

| i | 0 | 1 | 2 | 3 | 4 | 5 |
|---|---|---|---|---|---|---|
| (k1, j) | — | — | (2, 0) | — | — | (2, 1) |

A second manner: a timing reference starting point is subframe n, DL sTTI i. In such case, (n, i) corresponds to a UL sTTI (n, i') in the same subframe at first, and then a timing reference ending point is determined by j=i'+k2. That is, a comparison table, as shown in Table 58, for the DL sTTI i and UL sTTI i' in the same subframe n is determined at first.

TABLE 58

| DL sTTI i | 0 | 1 | 2 | 3 | 4 | 5 |
|---|---|---|---|---|---|---|
| UL sTTI i' | 0 | 0 | 0 | 1 | 1 | 1 |

The timing relationship of the UL scheduling timing from the UL grant (DL sTTI i) to the sPUSCH (UL sTTI i) is j=i'+4. Furthermore, i=2 and 5.

A third manner: the timing reference starting point is subframe n, DL sTTI i. In such case, the timing reference ending point is determined through a function (j)=f(i) or (j)=f(k, i). If it is determined that the adopted function is j=f(i)=⌊i/3⌋+4 or j=f(k, i)=⌊i/3⌋+k, the timing relationship of the UL scheduling timing from the UL grant (DL sTTI i) to the sPUSCH (UL sTTI j) is j=⌊i/3⌋+4. Furthermore, i=2 and 5.

Through the solution of the embodiment, a timing relationship determination method disclosed in the disclosure may be adopted to solve problems about accurate determination of the timing relationship when divided UL and DL sTTIs in an sTTI including relatively few OFDM symbols are not aligned, particularly solve the problem that the UL and DL sTTIs are not aligned by determining the closest DL sTTI meeting minimum timing in case of the fixed timing relationship, solve the problem of different UL and DL sTTI understandings and meet a low-delay communication requirement.

Specific Embodiment 26

Figure 27:
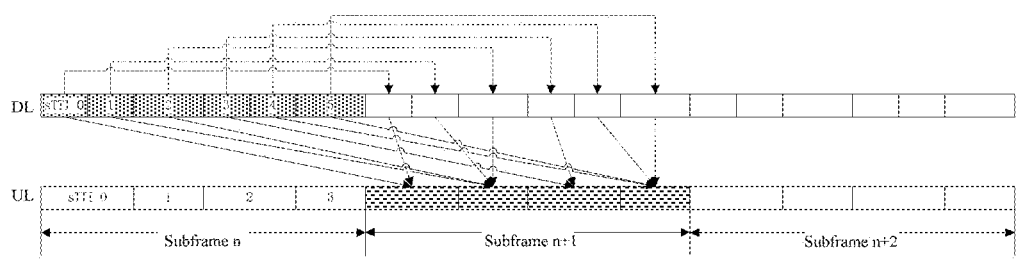
FIG. 27 is a schematic diagram of fixed timing for DL data feedback when DL sTTIs and UL sTTIs are unequal (DL sTTI=2 symbols and UL sTTI=4 symbols) and are not aligned according to an embodiment of the disclosure.

FIG. 27 illustrates UL and DL sTTI division when a DL sTTI includes two OFDM symbols, a subframe being specifically divided into six DL sTTIs including two, two, three, two, two and three OFDM symbols respectively, and a UL sTTI includes four OFDM symbols. It is to be noted that, in such case, a UL sTTI 1 also includes a last OFDM symbol of a UL sTTI 0. That is, a middlemost OFDM symbol, i.e., a fourth OFDM symbol, in a slot in case of a normal CP is shared by previous and next UL sTTIs. The same to a second slot.

For DL data feedback timing sPDSCH→ACK/NACK (sPUCCH), a relationship between an sPDSCH and an sPUCCH that a minimum interval is a number p of DL sTTIs is met. In the embodiment, for example, p=5, and a value of p is In an embodiment one of 3, 4, 5, 6 and 7.

In such case, fixed scheduling timing is adopted. That is, a UL sTTI is required to be determined for feedback of an ACK/NACK for seven DL sTTIs.

It is noted that a feedback relationship is shown by solid arrowheads. A process is presented by two dotted arrowheads: at first, a DL sTTI #0 in a subframe n corresponds to a DL sTTI #0 in a subframe n+1 through the interval of a number p of DL sTTIs. In such case, p=5, and a corresponding UL sTTI is selected to transmit the sPUCCH. In such case, a selection principle is a closest UL sTTI meeting the condition that the minimum interval between the DL sTTIs is a number p of DL sTTIs. That is, the UL sTTI #0 in the subframe n+1 is selected. When the closest UL sTTI is determined according to the minimum interval, a shared RS symbol of the UL sTTI may be included in the minimum interval. The scheduling relationship (including the process) may be embodied in a form of the following first or second or third or fourth manner.

That is, when DL sTTI=2 (OFDM symbols) and UL sTTI=4 (OFDM symbols), the timing relationship is shown in FIG. 27. Groups of timing relationships that the DL sTTI #0 in the subframe n where the sPDSCH is located correspond to the UL sTTI #3 in the subframe n+1 where the fed back ACK/NACK (sPUCCH) is located, the DL sTTIs #1 and 2 in the subframe n where the sPDSCH is located correspond to the UL sTTI #1 in the subframe n+1 where the fed back ACK/NACK (sPUCCH) is located, the DL sTTI #3 in the subframe n where the sPDSCH is located correspond to the UL sTTI #2 in the subframe n+1 where the fed back ACK/NACK (sPUCCH) is located and the DL sTTIs #4 and 5 in the subframe n where the sPDSCH is located corresponds to the UL sTTI #3 in the subframe n+1 where the fed back ACK/NACK (sPUCCH) is located meet the minimum interval k=5 DL sTTIs.

A first manner: Table 59 is a timing relationship table for DL data feedback timing (subframe n, DL sTTI i) (sPDSCH) and (subframe n+k1, UL sTTI i+k2) (sPUCCH).

TABLE 59

| i | 0 | 1 | 2 | 3 | 4 | 5 |
|---|---|---|---|---|---|---|
| (k1, k2) | (1, 0) | (1, 0) | (1, -1) | (1, -1) | (1, -1) | (1, -2) |

Or, Table 60 is a timing relationship table for DL data feedback timing (subframe n, DL sTTI i) (sPDSCH) and (subframe n+k1, UL sTTI j) (sPUCCH).

TABLE 60

| i | 0 | 1 | 2 | 3 | 4 | 5 |
|---|---|---|---|---|---|---|
| (k1, j) | (1, 0) | (1, 1) | (1, 1) | (1, 2) | (1, 3) | (1, 3) |

A second manner: a timing reference starting point is subframe n, DL sTTI i. In such case, (n, i) corresponds to a UL sTTI (n, i') in the same subframe at first, and then a timing reference ending point is determined by j=i'+k2. That is, a comparison table, as shown in Table 61, for the DL sTTI i and UL sTTI i' in the same subframe n is determined at first.

TABLE 61

| DL sTTI i | 0 | 1 | 2 | 3 | 4 | 5 |
|---|---|---|---|---|---|---|
| UL sTTI i' | 0 | 1 | 1 | 2 | 3 | 3 |

The timing relationship of the DL data feedback timing from the sPDSCH (DL sTTI i) to the sPUCCH (UL sTTI j) is j=i'+4. Furthermore, i=0, 1, 2, 3, 4 and 5.

A third solution: the DL sTTI is calculated at first according to the minimum timing interval p=5, i.e., the timing relationship n+6, and the DL sTTI i'=i+6 is calculated at first according to the timing relationship of the DL data feedback timing from the sPDSCH (DL sTTI i) to the sPUCCH (UL sTTI j) and with reference to the DL sTTI; and a comparison table, as shown in Table 62, for the DL sTTI i' and the UL sTTI j is determined.

TABLE 62

| DL sTTI i | 0 | 1 | 2 | 3 | 4 | 5 |
|---|---|---|---|---|---|---|
| UL sTTI i' | 0 | 1 | 1 | 2 | 3 | 3 | j in the DL data feedback timing from the sPDSCH (DL sTTI i) to the sPUCCH (UL sTTI j) is obtained by table lookup. Furthermore, i=0, 1, 2, 3, 4 and 5.

A fourth manner: the timing reference starting point is subframe n, DL sTTI i. In such case, the timing reference ending point is determined through a function (j)=f(i) or (j)=f(k, i). If it is determined that the adopted function is $$j = f(i) = \begin{cases} \lceil i/2 \rceil + 6, i = 0, 1, 2 \\ \lfloor i/2 \rfloor + 1 + 6, i = 3, 4, 5 \end{cases} \text{ or}$$

$$j = f(k, i) = \begin{cases} \lceil i/2 \rceil + k, i = 0, 1, 2 \\ \lfloor i/2 \rfloor + 1 + k, i = 3, 4, 5 \end{cases},$$

the timing relationship of the DL data feedback timing from the sPDSCH (DL sTTI i) to the sPUCCH (UL sTTI $$j) \text{ is } j = \begin{cases} \lceil i/2 \rceil + 6, i = 0, 1, 2 \\ \lfloor i/2 \rfloor + 1 + 6, i = 3, 4, 5 \end{cases}.$$

Furthermore, i=0, 1, 2, +3, 4 and 5.

Through the solution of the embodiment, a timing relationship determination method disclosed in the disclosure may be adopted to solve problems about accurate determination of the timing relationship when divided UL and DL sTTIs in an sTTI including relatively few OFDM symbols are not aligned, particularly solve the problem that the UL and DL sTTIs are not aligned by determining the closest UL sTTI meeting minimum timing in case of the fixed timing relationship, solve the problem of different UL and DL sTTI understandings and meet a low-delay communication requirement.

Specific Embodiment 27

Figure 28:
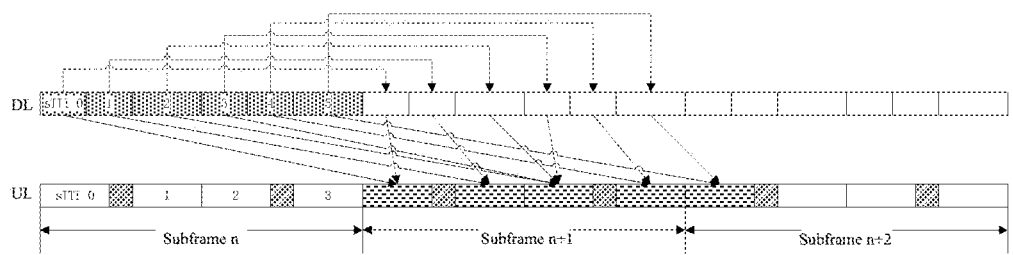
FIG. 28 is a schematic diagram of fixed timing for DL data feedback when DL sTTIs and UL sTTIs are unequal (DL sTTI=2 symbols and UL sTTI=4 symbols) and are not aligned according to an embodiment of the disclosure.

FIG. 28 illustrates UL and DL sTTI division when a DL sTTI includes two OFDM symbols, a subframe being specifically divided into six DL sTTIs including two, two, three, two, two and three OFDM symbols respectively, and a UL sTTI includes four OFDM symbols. It is to be noted that, in such case, a UL sTTI 1 also includes a last OFDM symbol of a UL sTTI 0. That is, a middlemost OFDM symbol, i.e., a fourth OFDM symbol, in a slot in case of a normal CP is shared by previous and next UL sTTIs. The same to a second slot.

For DL data feedback timing sPDSCH→ACK/NACK (sPUCCH), a relationship between an sPDSCH and an sPUCCH that a minimum interval is a number p of DL sTTIs is met. In the embodiment, for example, p=5, and a value of p is In an embodiment one of 3, 4, 5, 6 and 7.

In such case, fixed scheduling timing is adopted. That is, a UL sTTI is required to be determined for feedback of an ACK/NACK for seven DL sTTIs.

It is noted that a feedback relationship is shown by solid arrowheads. A process is presented by two dotted arrowheads: at first, a DL sTTI #0 in a subframe n corresponds to a DL sTTI #0 in a subframe n+1 through the interval of a number p of DL sTTIs. In such case, p=5, and a corresponding UL sTTI is selected to transmit the sPUCCH. In such case, a selection principle is a closest UL sTTI meeting the condition that the minimum interval between the DL sTTIs is a number p of DL sTTIs. That is, the UL sTTI #0 in the subframe n+1 is selected. When the closest UL sTTI is determined according to the minimum interval, a shared RS symbol of the UL sTTI is not included in the minimum interval. The scheduling relationship (including the process) may be embodied in a form of the following first or second or third manner.

That is, when DL sTTI=2 (OFDM symbols) and UL sTTI=4 (OFDM symbols), the timing relationship is shown in FIG. 28. Groups of timing relationships that the DL sTTI #0 in the subframe n where the sPDSCH is located correspond to the UL sTTI #3 in the subframe n+1 where the fed back ACK/NACK (sPUCCH) is located, the DL sTTI #1 in the subframe n where the sPDSCH is located corresponds to the UL sTTI #1 in the subframe n+1 where the fed back ACK/NACK (sPUCCH) is located, the DL sTTIs #2 and 3 in the subframe n where the sPDSCH is located correspond to the UL sTTI #2 in the subframe n+1 where the fed back ACK/NACK (sPUCCH) is located and the DL sTTIs #4 corresponds to the UL sTTI #3 in the subframe n+1 where the fed back ACK/NACK (sPUCCH) is located and the DL sTTI #5 in the subframe n where the sPDSCH is located corresponds to the UL sTTI #0 in the subframe n+2 where the fed back ACK/NACK (sPUCCH) is located meet the minimum interval k=5 DL sTTIs.

A first manner: Table 63 is a timing relationship table for DL data feedback timing (subframe n, DL sTTI i) (sPDSCH) and (subframe n+k1, UL sTTI i+k2) (sPUCCH).

TABLE 63

| i | 0 | 1 | 2 | 3 | 4 | 5 |
|---|---|---|---|---|---|---|
| (k1, k2) | (1, 0) | (1, 0) | (1, 0) | (1, −1) | (1, −1) | (2, −5) |

Or, Table 64 is a timing relationship table for DL data feedback timing (subframe n, DL sTTI i) (sPDSCH) and (subframe n+k1, UL sTTI j) (sPUCCH).

TABLE 64

| i | 0 | 1 | 2 | 3 | 4 | 5 |
|---|---|---|---|---|---|---|
| (k1, j) | (1, 0) | (1, 1) | (1, 2) | (1, 2) | (1, 3) | (2, 0) |

A second manner: a timing reference starting point is subframe n, DL sTTI i. In such case, (n, i) corresponds to a UL sTTI (n, i') in the same subframe at first, and then a timing reference ending point is determined by j=i'+k2. That is, a comparison table, as shown in Table 65, for the DL sTTI i and UL sTTI i' in the same subframe n is determined at first.

TABLE 65

| DL sTTI i | 0 | 1 | 2 | 3 | 4 | 5 |
|---|---|---|---|---|---|---|
| UL sTTI i' | 0 | 1 | 2 | 2 | 3 | 0 in subframe n + 1 |

The timing relationship of the DL data feedback timing from the sPDSCH (DL sTTI i) to the sPUCCH (UL sTTI j) is j=i'+4. Furthermore, i=0, 1, 2, 3, 4 and 5.

A third manner: the DL sTTI is calculated at first according to the minimum timing interval p=5, i.e., the timing relationship n+6, and the DL sTTI i'=i+6 is calculated at first according to the timing relationship of the DL data feedback timing from the sPDSCH (DL sTTI i) to the sPUCCH (UL sTTI j) and with reference to the DL sTTI; and a comparison table, as shown in Table 66, for the DL sTTI i' and the UL sTTI j is determined.

TABLE 66

| DL sTTI i | 0 | 1 | 2 | 3 | 4 | 5 |
|---|---|---|---|---|---|---|
| UL sTTI i' | 0 | 1 | 2 | 2 | 3 | 0 in subframe n + 1 | j in the DL data feedback timing from the sPDSCH (DL sTTI i) to the sPUCCH (UL sTTI j) is obtained by table lookup. Furthermore, i=0, 1, 2, 3, 4 and 5.

Through the solution of the embodiment, a timing relationship determination method disclosed in the disclosure may be adopted to solve problems about accurate determination of the timing relationship when divided UL and DL sTTIs in an sTTI including relatively few OFDM symbols are not aligned, particularly solve the problem that the UL and DL sTTIs are not aligned by determining the closest UL sTTI meeting minimum timing in case of the fixed timing relationship, solve the problem of different UL and DL sTTI understandings and meet a low-delay communication requirement.

Specific Embodiment 28

Figure 29:
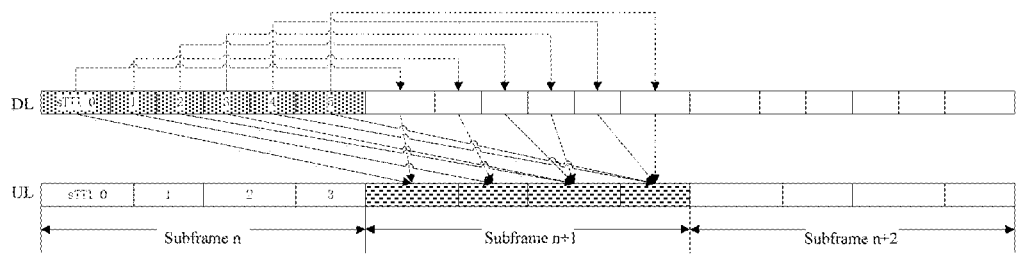
FIG. 29 is a schematic diagram of fixed timing for DL data feedback when DL sTTIs and UL sTTIs are unequal (DL sTTI=2 symbols and UL sTTI=4 symbols) and are not aligned according to an embodiment of the disclosure.

FIG. 29 illustrates UL and DL sTTI division when a DL sTTI includes two OFDM symbols, a subframe being specifically divided into six DL sTTIs including three, two, two, two, two and three OFDM symbols respectively, and a UL sTTI includes four OFDM symbols. It is to be noted that, in such case, a UL sTTI 1 also includes a last OFDM symbol of a UL sTTI 0. That is, a middlemost OFDM symbol, i.e., a fourth OFDM symbol, in a slot in case of a normal CP is shared by previous and next UL sTTIs. The same to a second slot.

For DL data feedback timing sPDSCH→ACK/NACK (sPUCCH), a relationship between an sPDSCH and an sPUCCH that a minimum interval is a number p of DL sTTIs is met. In the embodiment, for example, p=5, and a value of p is In an embodiment one of 3, 4, 5, 6 and 7.

In such case, fixed scheduling timing is adopted. That is, a UL sTTI is required to be determined for feedback of an ACK/NACK for seven DL sTTIs.

It is noted that a feedback relationship is shown by solid arrowheads. A process is presented by two dotted arrowheads: at first, a DL sTTI #0 in a subframe n corresponds to a DL sTTI #0 in a subframe n+1 through the interval of a number p of DL sTTIs. In such case, p=5, and a corresponding UL sTTI is selected to transmit the sPUCCH. In such case, a selection principle is a closest UL sTTI meeting the condition that the minimum interval between the DL sTTIs is a number p of DL sTTIs. That is, the UL sTTI #0 in the subframe n+1 is selected. When the closest UL sTTI is determined according to the minimum interval, a shared RS symbol of the UL sTTI may be included in the minimum interval. No more elaborations will be made to the condition that the RS is not included in the minimum interval. The scheduling relationship (including the process) may be embodied in a form of the following first or second or third or fourth manner.

That is, when DL sTTI=2 (OFDM symbols) and UL sTTI=4 (OFDM symbols), the timing relationship is shown in FIG. 29. Groups of timing relationships that the DL sTTI #0 in the subframe n where the sPDSCH is located correspond to the UL sTTI #3 in the subframe n+1 where the fed back ACK/NACK (sPUCCH) is located, the DL sTTI #1 in the subframe n where the sPDSCH is located corresponds to the UL sTTI #1 in the subframe n+1 where the fed back ACK/NACK (sPUCCH) is located, the DL sTTIs #2 and 3 in the subframe n where the sPDSCH is located correspond to the UL sTTI #2 in the subframe n+1 where the fed back ACK/NACK (sPUCCH) is located and the DL sTTIs #4 and 5 in the subframe n where the sPDSCH is located correspond to the UL sTTI #3 in the subframe n+1 where the fed back ACK/NACK (sPUCCH) is located meet the minimum interval k=5 DL sTTIs.

A first manner: Table 67 is a timing relationship table for DL data feedback timing (subframe n, DL sTTI i) (sPDSCH) and (subframe n+k1, UL sTTI i+k2) (sPUCCH).

TABLE 67

| i | 0 | 1 | 2 | 3 | 4 | 5 |
|---|---|---|---|---|---|---|
| (k1, k2) | (1, 0) | (1, 0) | (1, 0) | (1, −1) | (1, −1) | (1, −2) |

Or, Table 68 is a timing relationship table for DL data feedback timing (subframe n, DL sTTI i) (sPDSCH) and (subframe n+k1, UL sTTI j) (sPUCCH).

TABLE 68

| i | 0 | 1 | 2 | 3 | 4 | 5 |
|---|---|---|---|---|---|---|
| (k1, j) | (1, 0) | (1, 1) | (1, 2) | (1, 2) | (1, 3) | (1, 3) |

A second manner: a timing reference starting point is subframe n, DL sTTI i. In such case, (n, i) corresponds to a UL sTTI (n, i') in the same subframe at first, and then a timing reference ending point is determined by j=i'+k2. That is, a comparison table, as shown in Table 69, for the DL sTTI i and UL sTTI i' in the same subframe n is determined at first.

TABLE 69

| DL sTTI i | 0 | 1 | 2 | 3 | 4 | 5 |
|---|---|---|---|---|---|---|
| UL sTTI i' | 0 | 1 | 2 | 2 | 3 | 3 |

The timing relationship of the DL data feedback timing from the sPDSCH (DL sTTI i) to the sPUCCH (UL sTTI j) is j=i'+4. Furthermore, i=0, 1, 2, 3, 4 and 5.

A third solution: the DL sTTI is calculated at first according to the minimum timing interval p=5, i.e., the timing relationship n+6, and the DL sTTI i'=i+6 is calculated at first according to the timing relationship of the DL data feedback timing from the sPDSCH (DL sTTI i) to the sPUCCH (UL sTTI j) and with reference to the DL sTTI; and a comparison table, as shown in Table 70, for the DL sTTI i' and the UL sTTI j is determined.

TABLE 70

| DL sTTI i | 0 | 1 | 2 | 3 | 4 | 5 |
|---|---|---|---|---|---|---|
| UL sTTI i' | 0 | 1 | 2 | 2 | 3 | 3 | j in the DL data feedback timing from the sPDSCH (DL sTTI i) to the sPUCCH (UL sTTI j) is obtained by table lookup. Furthermore, i=0, 1, 2, 3, 4 and 5.

A fourth manner: the timing reference starting point is subframe n, DL sTTI i. In such case, the timing reference ending point is determined through a function (j)=f(i) or (j)=f(k, i). If it is determined that the adopted function is $$j = f(i) = \begin{cases} \lceil i/2 \rceil + 6, i = 0, 1 \\ \lfloor i/2 \rfloor + 1 + 6, i = 3, 4, 5 \end{cases} \text{ or}$$

$$j = f(k, i) = \begin{cases} \lceil i/2 \rceil + k, i = 0, 1 \\ \lfloor i/2 \rfloor + 1 + k, i = 2, 3, 4, 5 \end{cases},$$

the timing relationship of the DL data feedback timing from the sPDSCH (DL sTTI i) to the sPUCCH (UL sTTI j) is $$j = \begin{cases} \lceil i/2 \rceil + 6, i = 0, 1 \\ \lfloor i/2 \rfloor + 1 + 6, i = 2, 3, 4, 5 \end{cases}.$$

Furthermore, i=0, 1, 2, +3, 4 and 5.

Through the solution of the embodiment, a timing relationship determination method disclosed in the disclosure may be adopted to solve problems about accurate determination of the timing relationship when divided UL and DL sTTIs in an sTTI including relatively few OFDM symbols are not aligned, particularly solve the problem that the UL and DL sTTIs are not aligned by determining the closest UL sTTI meeting minimum timing in case of the fixed timing relationship, solve the problem of different UL and DL sTTI understandings and meet a low-delay communication requirement.

It is apparent that those skilled in the art should know that each module or each step of the disclosure may be implemented by a universal computing device, and the modules or steps may be concentrated on a single computing device or distributed on a network formed by a plurality of computing devices, and may In an embodiment be implemented by program codes executable for the computing devices, so that the modules or steps may be stored in a storage device for execution with the computing devices, the shown or described steps may be executed in sequences different from those described here in some circumstances, or may form each integrated circuit module respectively, or multiple modules or steps therein may form a single integrated circuit module for implementation. As a consequence, the disclosure is not limited to any specific hardware and software combination.

The above is only the preferred embodiment of the disclosure and not intended to limit the disclosure. For those skilled in the art, the disclosure may have various modifications and variations. Any modifications, equivalent replacements, improvements and the like made within the spirit and principle of the disclosure shall fall within the scope of protection of the disclosure.

INDUSTRIAL APPLICABILITY

Through the embodiments of the disclosure, when one timing interval is determined, the timing interval is a non-integral multiple of the TTI, when the group of timing intervals is determined, there is at least one timing interval which is a non-integral multiple of the TTI in the determined group of timing intervals, and UL scheduling or DL data feedback is performed according to the determined timing interval, so that a timing relationship when divided UL and DL sTTIs in sTTIs including relatively few OFDM symbols are not aligned may be determined.

The invention claimed is:

1. An Uplink (UL) and Downlink (DL) data processing method, comprising:
   determining a timing interval, wherein the timing interval comprises a DL data feedback timing interval, and in response to determining a group of timing intervals, the group of timing intervals comprising at least one timing interval which is a non-integral multiple of a Transmission Time Interval (TTI); and
   performing DL data feedback according to the determined timing interval;
   wherein the TTI comprises at least one of: a DL short (sTTI) or a UL sTTI;
   wherein when the timing interval is fixed timing, the timing interval is determined in a following manner: when a minimum interval between a short Physical Downlink Shared Channel (sPDSCH) in an sTTI and a channel bearing an Acknowledgement (ACK)/Negative Acknowledgement (NACK) fed back for the sPDSCH is a number p of DL sTTIs, the timing reference ending point of the timing interval is a complete UL sTTI, with a minimum interval from the timing reference starting point of the timing interval, among one or more UL sTTIs that enable the timing interval to be more than or equal to the minimum interval, and the timing reference starting point is a DL sTTI where the sPDSCH is located, wherein p is a natural number.

2. The method of claim 1, wherein the group of timing intervals is determined when the following condition is met: a boundary of a DL subframe n is aligned with a boundary of a UL subframe n, where n is a natural number.

3. The method of claim 1, wherein the timing reference ending point of the timing interval is determined in at least one of the following manners:
   a first determination manner: the timing reference ending point is determined according to a corresponding relationship table of (n, i) to (m, j);
   a second determination manner: the timing reference ending point (n+floor(j/x), j mod x) is determined according to a corresponding relationship between (n, i) and a UL sTTI (n, i') in the same subframe and to an expression j=i'+k, wherein the UL sTTI (n, i') represents a UL sTTI having a UL sTTI sequence number of i' in the subframe n;
   a third determination manner: after a DL sTTI r meeting the minimum interval is determined according to an expression r=i+k, the timing reference ending point (m, j) is determined according to a correspondence between (m, r) and a UL sTTI (m, j) in the same subframe, wherein the DL sTTI r represents a DL sTTI having a sequence number of r, i is a DL sTTI sequence number of the timing reference starting point, (m, r) represents a DL sTTI having a DL sTTI sequence number of r in a subframe m and the UL sTTI (m, j) is a UL sTTI having a UL sTTI sequence number of j in the subframe m; or a fourth determination manner: the timing reference ending point (n+floor(j/x), j mod x) is determined according to a function j=f(i) or j=f(k, i),
wherein (n, i) represents that the timing reference starting point is a DL sTTI having a DL sTTI sequence number of i in the subframe n, (m, j) represents that the timing reference ending point is a UL sTTI having a UL sTTI sequence number of j in the subframe m, (n+floor(j/x), j mod x) represents that the timing reference ending point is a UL sTTI having a UL sTTI sequence number of 'j mod x' in a subframe n+floor(j/x), x being the number of UL sTTIs in each subframe, floor( ) being a rounding function, mod being a remainder calculation function and i, j, n, m, i' and r being natural numbers.

4. The method of claim 1, wherein when the timing interval is dynamic timing, the timing interval is determined in the following manners:
   the timing interval is determined by at least one of: k1 subframes, k2 DL sTTIs or k3 UL sTTIs; and
   the timing interval is determined by a minimum interval and at least one of: the k1 subframes, the k2 DL sTTIs or the k3 UL sTTIs, the minimum interval being at least one of: a minimum interval between a UL grant and an sPUSCH or between a DL sTTI where the UL grant is located and the sPUSCH, or a minimum interval between the sPDSCH and a channel bearing the ACK/NACK fed back for the sPDSCH,
   wherein at least one of k1, k2 or k3 is indicated by physical-layer signaling or high-layer signaling, and k1, k2 and k3 are natural numbers.

5. The method according to claim 4, wherein the timing reference starting point of the timing interval is at least one of:
   an ending position of a subframe where the UL grant or the sPDSCH is located; a starting position of subframe where the UL grant or the sPDSCH is located; the DL sTTI where the UL grant or the sPDSCH is located; or a UL sTTI corresponding to the DL sTTI where the UL grant or the sPDSCH is located.

6. The method of claim 5, wherein the UL sTTI corresponding to the DL sTTI is determined in at least one of the following manners:
   a UL sTTI where a starting symbol or ending symbol of a DL sTTI m is located is determined as the UL sTTI corresponding to the DL sTTI; or
   a next UL sTTI of the UL sTTI where the starting symbol or ending symbol of the DL sTTI m is located is determined as the UL sTTI corresponding to the DL sTTI,
   wherein the DL sTTI m is a DL sTTI having a DL sTTI sequence number of m, m being a natural number.

7. The method of claim 6, wherein when there are multiple UL sTTIs where the starting symbol or ending symbol of the DL sTTI is located, the UL sTTI corresponding to the DL sTTI is determined in at least one of the following manners:
   a UL sTTI aligned with the DL sTTI m among multiple UL sTTIs where the ending symbol or starting symbol of the DL sTTI m is located or a next UL sTTI of the UL sTTI aligned with the DL sTTI m, is determined as, the UL sTTI corresponding to the DL sTTI;

a UL sTTI comprising all OFDM symbols of the DL sTTI m among the multiple UL sTTIs where the ending symbol or starting symbol of the DL sTTI m is located or a next UL sTTI of the UL sTTI comprising all the OFDM symbols of the DL sTTI m, is determined as, the UL sTTI corresponding to the DL sTTI;

a UL sTTI comprising a largest number of OFDM symbols of the DL sTTI m among the multiple UL sTTIs where the ending symbol or starting symbol of the DL sTTI m is located or a next UL sTTI of the UL sTTI comprising the largest number of OFDM symbols of the DL sTTI m, is determined as, the UL sTTI corresponding to the DL sTTI;

a first UL sTTI among the multiple UL sTTIs where the ending symbol or starting symbol of the DL sTTI m is located or a next UL sTTI of the first UL sTTI, is determined as, the UL sTTI corresponding to the DL sTTI; or a last UL sTTI among the multiple UL sTTIs where the ending symbol or starting symbol of the DL sTTI m is located or a next-to-last UL sTTI, is determined as, the UL sTTI corresponding to the DL sTTI.

8. The method of claim 4, wherein when the minimum interval comprises a legacy Physical Downlink Control Channel (PDCCH) region which is not divided into a DL sTTI, the minimum interval is determined in at least one of the following manners:

the minimum interval is a number p of DL sTTIs excluding the legacy PDCCH region; or the minimum interval comprises the legacy PDCCH region and a number (p-h) of DL sTTIs, h being a natural number, wherein a value of h is determined according to a size of the legacy PDCCH region and a size of the DL sTTI, when the size of the DL sTTI is 2, a magnitude of h is positively proportional to the size of the legacy PDCCH region; or when the size of the DL sTTI is 2, h is a fixed value, h being 0, 1 or 2; or when the size of the DL sTTI is 7, h is a fixed value, h being 0 or 1.

9. The method of claim 1, wherein when the minimum interval comprises a legacy Physical Downlink Control Channel (PDCCH) region which is not divided into a DL sTTI, the minimum interval is determined in at least one of the following manners:

the minimum interval is a number p of DL sTTIs excluding the legacy PDCCH region; or the minimum interval comprises the legacy PDCCH region and a number (p-h) of DL sTTIs, h being a natural number, wherein a value of h is determined according to a size of the legacy PDCCH region and a size of the DL sTTI, when the size of the DL sTTI is 2, a magnitude of h is positively proportional to the size of the legacy PDCCH region; or when the size of the DL sTTI is 2, h is a fixed value, h being 0, 1 or 2; or when the size of the DL sTTI is 7, h is a fixed value, h being 0 or 1.

10. The method of claim 1, wherein during DL data feedback, the complete UL sTTI that enables the timing interval to be more than or equal to the minimum interval is determined in at least one of the following manners:

when the complete UL sTTI that enables the timing interval to be more than or equal to the minimum interval is determined, the shared RS symbol of the UL sTTI is comprised in the minimum interval; or when the complete UL sTTI that enables the timing interval to be more than or equal to the minimum interval is determined, the shared RS symbol of the UL sTTI is not comprised in the minimum interval.

11. An Uplink (UL) and Downlink (DL) data processing device, comprising:

a memory storing processor-executable instructions; and a processor arranged to execute the stored processor-executable instructions to perform steps of:

determining a timing interval, wherein the timing interval comprises a DL data feedback timing interval, and in response to determining a group of timing intervals, the group of timing intervals comprising at least one timing interval which is a non-integral multiple of a Transmission Time Interval (TTI); and performing or DL data feedback according to the determined timing interval;

wherein the TTI comprises at least one of: a DL short (sTTI) or a UL sTTI;

wherein when the timing interval is fixed timing, the timing interval is determined in a following manner:

when a minimum interval between a short Physical Downlink Shared Channel (sPDSCH) in an sTTI and a channel bearing an Acknowledgement (ACK)/Negative Acknowledgement (NACK) fed back for the sPDSCH is a number p of DL sTTIs, the timing reference ending point of the timing interval is a complete UL sTTI, with a minimum interval from the timing reference starting point of the timing interval, among one or more UL sTTIs that enable the timing interval to be more than or equal to the minimum interval, and the timing reference starting point is a DL sTTI where the sPDSCH is located, wherein p is a natural number.

12. The device of claim 11, wherein the group of timing intervals is determined when the following condition is met: a boundary of a DL subframe n is aligned with a boundary of a UL subframe n, where n is a natural number.

13. The device of claim 11, wherein the timing reference ending point of the timing interval is determined in at least one of the following manners:

a first determination manner: the timing reference ending point is determined according to a corresponding relationship table of (n, i) to (m, j);

a second determination manner: the timing reference ending point (n+floor(j/x), j mod x) is determined according to a corresponding relationship between (n, i) and a UL sTTI (n, i') in the same subframe and to an expression j=i'+k, wherein the UL sTTI (n, i') represents a UL sTTI having a UL sTTI sequence number of i' in the subframe n;

a third determination manner: after a DL sTTI r meeting the minimum interval is determined according to an expression r=i+k, the timing reference ending point (m, j) is determined according to a correspondence between (m, r) and a UL sTTI (m, j) in the same subframe, wherein the DL sTTI r represents a DL sTTI having a sequence number of r, i is a DL sTTI sequence number of the timing reference starting point, (m, r) represents a DL sTTI having a DL sTTI sequence number of r in a subframe m and the UL sTTI (m, j) is a UL sTTI having a UL sTTI sequence number of j in the subframe m; or a fourth determination manner: the timing reference ending point (n+floor(j/x), j mod x) is determined according to a function j=f(i) or j=f(k, i), wherein (n, i) represents that the timing reference starting point is a DL sTTI having a DL sTTI sequence number of i in the subframe n, (m, j) represents that the timing reference ending point is a UL sTTI having a UL sTTI sequence number of j in the subframe m, (n+floor(j/x), j mod x) represents that the timing reference ending point is a UL sTTI having a UL sTTI sequence number of 'j mod x' in a subframe n+floor(j/x), x being the number of UL sTTIs in each subframe, floor( ) being a rounding function, mod being a remainder calculation function and i, j, n, m, i' and r being natural numbers.

14. A computer storage medium having stored thereon a set of instructions that, when executed, cause at least one processor to execute an Uplink (UL) and Downlink (DL) data processing method comprising:

determining a timing interval, wherein the timing interval comprises a DL data feedback timing interval, and in response to determining a group of timing intervals, the group of timing intervals comprising at least one timing interval which is a non-integral multiple of a Transmission Time Interval (TTI); and performing or DL data feedback according to the determined timing interval;

wherein the TTI comprises at least one of: a DL short (sTTI) or a UL sTTI;

wherein when the timing interval is fixed timing, the timing interval is determined in a following manner: when a minimum interval between a short Physical Downlink Shared Channel (sPDSCH) in an sTTI and a channel bearing an Acknowledgement (ACK)/Negative Acknowledgement (NACK) fed back for the sPDSCH is a number p of DL sTTIs, the timing reference ending point of the timing interval is a complete UL sTTI, with a minimum interval from the timing reference starting point of the timing interval, among one or more UL sTTIs that enable the timing interval to be more than or equal to the minimum interval, and the timing reference starting point is a DL sTTI where the sPDSCH is located, wherein p is a natural number.

* * * * *